US011021627B2

(12) United States Patent
Mozel et al.

(10) Patent No.: US 11,021,627 B2
(45) Date of Patent: Jun. 1, 2021

(54) INKJET COMPOSITIONS AND PROCESSES FOR STRETCHABLE SUBSTRATES

(71) Applicant: Kornit Digital Ltd., Rosh HaAyin (IL)

(72) Inventors: Jacob Mozel, Kfar-Saba (IL); Jacob Mann, Zoran (IL); Muhammad Iraqi, Tira (IL)

(73) Assignee: Kornit Digital Ltd., Rosh HaAyia (IL)

( * ) Notice: Subject to any disclaimer, the term of this patent is extended or adjusted under 35 U.S.C. 154(b) by 0 days.

(21) Appl. No.: 16/774,073

(22) Filed: Jan. 28, 2020

(65) Prior Publication Data

US 2020/0157371 A1    May 21, 2020

Related U.S. Application Data

(63) Continuation of application No. 16/558,356, filed on Sep. 3, 2019, now abandoned, which is a continuation
(Continued)

(51) Int. Cl.
*C09D 11/54* (2014.01)
*B41J 2/21* (2006.01)
(Continued)

(52) U.S. Cl.
CPC ............ *C09D 11/54* (2013.01); *B41J 2/2107* (2013.01); *B41J 2/2117* (2013.01); *B41J 3/4078* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2,123,638 A | 7/1938 | Steccone |
| 3,100,704 A | 8/1963 | Coles et al. |

(Continued)

FOREIGN PATENT DOCUMENTS

| CN | 1612919 | 5/2005 |
| CN | 1676547 | 10/2005 |

(Continued)

OTHER PUBLICATIONS

Official Action dated Jun. 5, 2020 from the US Patent and Trademark Office Re. U.S. Appl. No. 16/744,833. (44 Pages).
(Continued)

*Primary Examiner* — Manish S Shah

(57) ABSTRACT

Novel inkjet ink compositions for forming an image in a form of an elastic film attached to a surface of a stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed. The novel ink compositions comprise a first part, which contains a property-adjusting agent and a carrier, and a second part which contains an emulsified property-sensitive proto-elastomeric film-forming agent, a colorant and a carrier, such that the second part congeals upon contact with the property-adjusting agent. The second part is digitally applied to the substrate less than 1 second following the application of the first part to the substrate.

14 Claims, 15 Drawing Sheets
(3 of 15 Drawing Sheet(s) Filed in Color)

Related U.S. Application Data of application No. 15/424,943, filed on Feb. 6, 2017, now Pat. No. 10,472,533, which is a continuation of application No. 13/975,399, filed on Aug. 26, 2013, now Pat. No. 9,611,401, which is a continuation of application No. 12/853,389, filed on Aug. 10, 2010, now Pat. No. 8,540,358.

(60) Provisional application No. 61/272,436, filed on Sep. 24, 2009, provisional application No. 61/245,333, filed on Sep. 24, 2009, provisional application No. 61/232,494, filed on Aug. 10, 2009.

(51) Int. Cl.

| *D06P 1/00* | (2006.01) |
|---|---|
| *D06P 5/00* | (2006.01) |
| *D06P 5/02* | (2006.01) |
| *D06P 5/20* | (2006.01) |
| *D06P 5/30* | (2006.01) |
| *B41J 3/407* | (2006.01) |
| *B41J 11/06* | (2006.01) |
| *C09D 11/30* | (2014.01) |
| *C09D 11/102* | (2014.01) |
| *C09D 11/107* | (2014.01) |
| *C09D 11/322* | (2014.01) |

(52) U.S. Cl.
CPC ............ *B41J 11/06* (2013.01); *C09D 11/102* (2013.01); *C09D 11/107* (2013.01); *C09D 11/30* (2013.01); *C09D 11/322* (2013.01); *D06P 1/0032* (2013.01); *D06P 1/0096* (2013.01); *D06P 5/001* (2013.01); *D06P 5/02* (2013.01); *D06P 5/2011* (2013.01); *D06P 5/2077* (2013.01); *D06P 5/2083* (2013.01); *D06P 5/30* (2013.01); *B41J 2202/03* (2013.01); *Y10T 428/24802* (2015.01)

(58) Field of Classification Search
CPC ...... B41J 2/1755; B41J 2/2114; B41J 2/2117; B41J 2/2056; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/04588; B41J 2/04595; B41J 2/04586; B41J 3/4078; B41J 11/06; B41J 2/175; B41J 2/17563; B41J 2/21; B41J 2/14274; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; D06P 1/0032; D06P 1/0096; D06P 5/001; D06P 5/02; D06P 5/2011; D06P 5/2077; D06P 5/2083; D06P 5/30; Y10T 428/24802
See application file for complete search history.

(56) References Cited

U.S. PATENT DOCUMENTS

| 3,968,498 A | 7/1976 | Uchiyama |
|---|---|---|
| 3,990,363 A | 11/1976 | Vertegaal |
| 4,021,591 A | 5/1977 | De Vries et al. |
| 4,284,758 A | 8/1981 | North |
| 4,285,690 A | 8/1981 | North |
| 4,296,421 A | 10/1981 | Hara et al. |
| 4,312,007 A | 1/1982 | Winfield |
| 4,345,063 A | 8/1982 | North |
| 4,380,770 A | 4/1983 | Maruyama |
| 4,630,076 A | 12/1986 | Yoshimura |
| 4,702,742 A | 10/1987 | Iwata et al. |
| 4,888,093 A | 12/1989 | Dean et al. |
| 5,348,997 A | 9/1994 | Kato et al. |
| 5,349,021 A | 9/1994 | Rooney et al. |
| 5,360,933 A | 11/1994 | Imashiro et al. |
| 5,428,383 A | 6/1995 | Shields et al. |
| 5,432,229 A | 7/1995 | Aoki et al. |
| 5,501,902 A | 3/1996 | Kronzer |
| 5,510,415 A | 4/1996 | Zahrobsky et al. |
| 5,518,534 A | 5/1996 | Pearlstine et al. |
| 5,534,904 A | 7/1996 | Sheinman |
| 5,582,104 A | 12/1996 | Best et al. |
| 5,594,044 A | 1/1997 | Yang |
| 5,596,047 A | 1/1997 | Wu et al. |
| 5,631,684 A | 5/1997 | Takaide et al. |
| 5,645,888 A | 7/1997 | Titterington et al. |
| 5,757,407 A | 5/1998 | Rezanka |
| 5,798,179 A | 8/1998 | Kronzer |
| 5,820,661 A | 10/1998 | Gregory et al. |
| 5,835,116 A | 11/1998 | Sato et al. |
| 5,858,514 A | 1/1999 | Bowers |
| 5,866,638 A | 2/1999 | Shimomura |
| 5,885,335 A | 3/1999 | Adams et al. |
| 5,902,387 A | 5/1999 | Suzuki et al. |
| 5,981,113 A | 11/1999 | Christian |
| 5,988,791 A | 11/1999 | Miyashita et al. |
| 6,042,228 A | 3/2000 | Yamada et al. |
| 6,059,391 A | 5/2000 | Fulkerson et al. |
| 6,063,922 A | 5/2000 | Flood et al. |
| 6,087,061 A | 7/2000 | Hare et al. |
| 6,095,628 A | 8/2000 | Rhome |
| 6,117,921 A | 9/2000 | Ma et al. |
| 6,124,398 A | 9/2000 | Imashiro et al. |
| 6,126,281 A | 10/2000 | Shimoda et al. |
| 6,132,502 A | 10/2000 | Yatake |
| 6,140,391 A | 10/2000 | Zou et al. |
| 6,156,072 A | 12/2000 | Usui et al. |
| 6,161,929 A | 12/2000 | Erdtmann et al. |
| 6,183,079 B1 | 2/2001 | Meade et al. |
| 6,196,674 B1 | 3/2001 | Takemoto |
| 6,200,667 B1 | 3/2001 | Haruta et al. |
| 6,206,516 B1 | 3/2001 | Moriyama et al. |
| 6,262,796 B1 | 7/2001 | Loopstra et al. |
| 6,267,518 B1 | 7/2001 | Abe |
| 6,270,189 B1 | 8/2001 | Miyashita et al. |
| 6,277,183 B1 | 8/2001 | Johnson et al. |
| 6,281,269 B1 | 8/2001 | Schut |
| 6,291,023 B1 | 9/2001 | Nigam |
| 6,300,391 B2 | 10/2001 | Parazek et al. |
| 6,322,620 B1 | 11/2001 | Xiao |
| 6,326,419 B1 | 12/2001 | Smith |
| 6,335,140 B1 | 1/2002 | Miyazaki |
| 6,341,856 B1 | 1/2002 | Thompson et al. |
| 6,500,880 B1 | 3/2002 | Parazek |
| 6,416,923 B2 | 7/2002 | Miyazaki |
| 6,450,633 B1 | 9/2002 | Kronzer |
| 6,464,649 B1 | 10/2002 | Duchon et al. |
| 6,513,924 B1 | 2/2003 | Goldberg et al. |

(56) References Cited

U.S. PATENT DOCUMENTS

| | | | |
|---|---|---|---|
| 6,517,199 B1 | 2/2003 | Tomioka et al. | |
| 6,536,894 B1 | 3/2003 | Rasmussen | |
| 6,606,427 B1 | 8/2003 | Graves et al. | |
| 6,626,530 B2 | 9/2003 | Snow et al. | |
| 6,647,208 B1 | 11/2003 | Kirby | |
| 6,682,189 B2 | 1/2004 | May et al. | |
| 6,698,874 B2 | 3/2004 | Katsuki | |
| 6,755,518 B2 | 6/2004 | Codos | |
| 6,785,436 B2 | 8/2004 | Ravikanth et al. | |
| 6,840,992 B2 | 1/2005 | Glaum et al. | |
| 6,879,378 B2 | 4/2005 | Morita et al. | |
| 7,119,160 B2 | 10/2006 | Kodama et al. | |
| 7,134,749 B2 | 11/2006 | Ben Zur et al. | |
| 7,275,806 B2 | 10/2007 | Matsuzawa et al. | |
| 7,338,988 B2 | 3/2008 | Hesler et al. | |
| 7,381,347 B2 | 6/2008 | Jacobs, III et al. | |
| 7,425,062 B2 | 9/2008 | Bauer | |
| 7,607,745 B2 | 10/2009 | Ben-Zur | |
| 7,723,400 B2 | 5/2010 | Kobayashi et al. | |
| 7,748,838 B2 | 7/2010 | Oishi | |
| 8,540,358 B2 * | 9/2013 | Mozel | D06P 5/30 |
| | | | 347/100 |
| 8,569,397 B2 | 10/2013 | Ohzeki | |
| 8,926,080 B2 | 1/2015 | Mozel et al. | |
| 9,340,694 B2 | 5/2016 | Oura et al. | |
| 9,611,401 B2 * | 4/2017 | Mozel | B41J 11/06 |
| 9,616,683 B2 * | 4/2017 | Mozel | B41M 5/0011 |
| 2002/0009662 A1 | 1/2002 | Miyazaki | |
| 2002/0022120 A1 | 2/2002 | Katsuki et al. | |
| 2002/0044188 A1 | 4/2002 | Codos | |
| 2002/0060728 A1 | 5/2002 | Koizumi et al. | |
| 2003/0064206 A1 | 4/2003 | Koyano et al. | |
| 2003/0069329 A1 | 4/2003 | Kubota et al. | |
| 2003/0117473 A1 | 6/2003 | Smith | |
| 2003/0142167 A1 | 7/2003 | Nakamura et al. | |
| 2003/0157304 A1 | 8/2003 | Li et al. | |
| 2003/0172840 A1 | 9/2003 | Blank et al. | |
| 2003/0197750 A1 | 10/2003 | Iwatsuki et al. | |
| 2003/0197772 A1 | 10/2003 | Iwatsuki et al. | |
| 2003/0205159 A1 | 11/2003 | McNeil | |
| 2004/0024083 A1 | 2/2004 | Lee | |
| 2004/0100542 A1 | 5/2004 | Chen et al. | |
| 2004/0179077 A1 | 9/2004 | Samii et al. | |
| 2004/0252173 A1 | 12/2004 | Ben-Zur et al. | |
| 2005/0012798 A1 | 1/2005 | Adachi | |
| 2005/0098054 A1 | 5/2005 | Berndtsson et al. | |
| 2005/0174411 A1 | 8/2005 | Adachi et al. | |
| 2005/0179706 A1 | 8/2005 | Childers | |
| 2005/0179708 A1 | 8/2005 | Ben-Zur | |
| 2005/0203245 A1 | 9/2005 | Lee et al. | |
| 2005/0233097 A1 | 10/2005 | Tojo et al. | |
| 2006/0249039 A1 | 11/2006 | Feldman et al. | |
| 2006/0284929 A1 | 12/2006 | Matsuzawa et al. | |
| 2007/0103528 A1 | 5/2007 | Pearl et al. | |
| 2007/0103529 A1 | 5/2007 | Pearl et al. | |
| 2007/0104899 A1 * | 5/2007 | Pearl | B41J 11/002 |
| | | | 428/32.24 |
| 2007/0148128 A1 | 6/2007 | Kennedy et al. | |
| 2007/0218222 A1 | 9/2007 | Campbell et al. | |
| 2007/0229577 A1 | 10/2007 | Morimoto | |
| 2008/0006176 A1 | 1/2008 | Houjou | |
| 2008/0012884 A1 | 1/2008 | Ben-Zur et al. | |
| 2008/0095940 A1 | 4/2008 | Lee et al. | |
| 2008/0108746 A1 | 5/2008 | Waki et al. | |
| 2008/0241397 A1 | 10/2008 | Kato et al. | |
| 2008/0241436 A1 | 10/2008 | Kobayashi | |
| 2008/0268156 A1 | 10/2008 | Ueno et al. | |
| 2009/0122127 A1 | 5/2009 | Baker | |
| 2010/0073408 A1 | 3/2010 | Hale et al. | |
| 2010/0075045 A1 | 3/2010 | Kaimoto et al. | |
| 2011/0032304 A1 | 2/2011 | Mozel et al. | |
| 2011/0169901 A1 | 7/2011 | Pinto et al. | |
| 2011/0290127 A1 | 12/2011 | Biel et al. | |
| 2012/0081477 A1 | 4/2012 | Nagano | |
| 2012/0251795 A1 | 10/2012 | Okada et al. | |
| 2013/0155162 A1 | 6/2013 | Ohtsuka | |
| 2014/0036014 A1 | 2/2014 | Mozel et al. | |
| 2015/0077488 A1 | 3/2015 | Mozel et al. | |
| 2015/0152274 A1 | 6/2015 | Pearl et al. | |
| 2015/0284905 A1 | 10/2015 | Mozel | |
| 2016/0176201 A1 | 1/2016 | Kitagawa et al. | |
| 2017/0145239 A1 | 5/2017 | Mozel et al. | |
| 2019/0382608 A1 | 12/2019 | Mozel et al. | |
| 2020/0140708 A1 | 5/2020 | Shimoni et al. | |
| 2020/0157367 A1 | 5/2020 | Ben-Zur | |

FOREIGN PATENT DOCUMENTS

| | | | |
|---|---|---|---|
| CN | 1890111 | 1/2007 | |
| DE | 3121043 | 3/1982 | |
| EP | 0121083 | 10/1984 | |
| EP | 0277361 | 8/1988 | |
| EP | 709519 | 3/1996 | |
| EP | 1247890 | 10/2002 | |
| EP | 1281533 | 2/2003 | |
| EP | 1652895 | 5/2006 | |
| EP | 1853431 | 11/2007 | |
| EP | 2166046 | 3/2010 | |
| EP | 2405055 | 1/2012 | |
| EP | 3184692 | 6/2017 | |
| GB | 422488 | 1/1935 | |
| IL | 162231 | 5/2007 | |
| JP | 59-187029 | 10/1984 | |
| JP | 61-075870 | 4/1986 | |
| JP | 63-031593 | 6/1988 | |
| JP | 05-293954 | 11/1993 | |
| JP | 08-232176 | 9/1996 | |
| JP | 61-231285 | 10/1996 | |
| JP | 09-039365 | 2/1997 | |
| JP | 10-278379 | 10/1998 | |
| JP | 10-330661 | 12/1998 | |
| JP | 11-138768 | 5/1999 | |
| JP | 2000-103995 | 4/2000 | |
| JP | 2002-036644 | 2/2002 | |
| JP | 2002-332437 | 11/2002 | |
| JP | 2003-160455 | 3/2003 | |
| JP | 2003-312069 | 11/2003 | |
| JP | 2004-532750 | 10/2004 | |
| JP | 2005-320663 | 11/2005 | |
| JP | 2006-124843 | 5/2006 | |
| JP | 2006-124854 | 5/2006 | |
| JP | 2006-199498 | 8/2006 | |
| JP | 2006-256163 | 9/2006 | |
| JP | 2008-018664 | 1/2008 | |
| JP | 2009-061645 | 3/2009 | |
| JP | 2009-285877 | 12/2009 | |
| JP | 2010053357 A * | 3/2010 | B32B 27/40 |
| JP | 2012-008254 | 1/2012 | |
| JP | 2013-227414 | 11/2013 | |
| JP | 2014-173017 | 9/2014 | |
| JP | 2017-171907 | 9/2017 | |
| WO | WO 98/30749 | 7/1998 | |
| WO | WO 99/56948 | 11/1999 | |
| WO | WO 00/73570 | 12/2000 | |
| WO | WO 01/17792 | 3/2001 | |
| WO | WO 01/32974 | 5/2001 | |
| WO | WO 01/49504 | 7/2001 | |
| WO | WO 02/066565 | 8/2002 | |
| WO | WO 02/078958 | 10/2002 | |
| WO | WO 03/057787 | 7/2003 | |
| WO | WO 2005/076730 | 8/2005 | |
| WO | WO 2005/106109 | 11/2005 | |
| WO | WO 2005/115089 | 12/2005 | |
| WO | WO 2005/115761 | 12/2005 | |
| WO | WO 2011/018786 | 2/2011 | |
| WO | WO 2011/055639 | 5/2011 | |
| WO | WO 2011/078068 | 6/2011 | |
| WO | WO 2013/046884 | 4/2013 | |
| WO | WO 2015/152291 | 10/2015 | |
| WO | WO 2016/027835 | 2/2016 | |
| WO | WO 2017/109786 | 6/2017 | |
| WO | WO 2018/07834 | 5/2018 | |

(56) References Cited

FOREIGN PATENT DOCUMENTS

| WO | WO 2019/077603 | 4/2019 |
|---|---|---|
| WO | WO 2019/077615 | 4/2019 |

OTHER PUBLICATIONS

Official Action dated Sep. 24, 2020 from the US Patent and Trademark Office Re. U.S. Appl. No. 14/619,218. (20 pages).
Supplementary European Search Report and the European Search Opinion dated Jun. 24, 2020 From the European Patent Office Re. Application No. 17865042.0. (13 Pages).
Advisory Action Before the Filing of an Appeal Brief dated Apr. 18, 2019 From the US Patent and Trademark Office Re. U.S. Appl. No. 14/619,218. (4 pages).
Advisory Action Before the Filing of an Appeal Brief dated Dec. 29, 2017 From the US Patent and Trademark Office Re. U.S. Appl. No. 14/619,218. (6 pages).
Advisory Action dated May 21, 2020 from the US Patent and Trademark Office Re. U.S. Appl. No. 14/619,218. (4 pages).
Advisory Action dated May 27, 2014 From the US Patent and Trademark Office Re. U.S. Appl. No. 13/206,646.
Applicant-Initiated Interview Summary dated Aug. 8, 2018 From the US Patent and Trademark Office Re. U.S. Appl. No. 14/619,218. (3 pages).
Applicant-Initiated Interview Summary dated Oct. 9, 2013 From the US Patent and Trademark Office Re. U.S. Appl. No. 12/853,361.
Applicant-Initiated Interview Summary dated Feb. 13, 2014 From the US Patent and Trademark Office Re. U.S. Appl. No. 11/606,242.
Brief Communication dated Oct. 16, 2018 From the European Patent Office Re. Application No. 05745218.7. (4 Pages).
Communication Pursuant to Article 94(3) EPC dated Oct. 10, 2014 From the European Patent Office Re. Application No. 10754998.2.
Communication Pursuant to Article 94(3) EPC dated Nov. 12, 2009 From the European Patent Office Re. Application No. 05703208.8.
Communication Pursuant to Article 94(3) EPC dated Feb. 14, 2018 From the European Patent Office Re. Application No. 10754998.2. (5 Pages).
Communication Pursuant to Article 94(3) EPC dated Oct. 17, 2017 From the European Patent Office Re. Application No. 10754998.2. (3 Pages).
Communication Pursuant to Article 94(3) EPC dated Jan. 20, 2017 From the European Patent Office Re. Application No. 05745218.7. (5 Pages).
Communication Pursuant to Article 94(3) EPC dated Aug. 21, 2017 From the European Patent Office Re. Application No. 05745218.7. (3 Pages).
Communication Pursuant to Article 94(3) EPC dated Mar. 29, 2017 From the European Patent Office Re. Application No. 10754998.2. (3 Pages).
Communication Pursuant to Rule 114(2) EPC dated Nov. 22, 2017 From the European Patent Office Re. Application No. 05745218.7. (3 Pages).
Decision to Refuse a European Patent Application dated Nov. 5, 2018 From the European Patent Office Re. Application No. 05745218. 7. (12 Pages).
Examination Report Under Sections 12 & 13 of the Patents Act, 1970 and the Patents Rules, 2003 dated Dec. 13, 2017 From the Government of India, Intellectual Property India, Patents, Designs, Trade Marks, Geographical Indications Re. Application No. 185/MUMNP/2012. (6 Pages).
Final Official Action dated Apr. 15, 2020 from the US Patent and Trademark Office Re. U.S. Appl. No. 14/619,218. (16 pages).
Hearing Notice dated Dec. 7, 2018 From the Government of India, Patent Office, Intellectual Property Office Building Re. Application No. 185/MUMNP/2012. (3 Pages).
International Preliminary Report on Patentability dated May 7, 2020 From the International Bureau of WIPO Re. Application No. PCT/IL2018/051128. (8 Pages).
International Preliminary Report on Patentability dated May 9, 2019 From the International Bureau of WIPO Re. Application No. PCT/IL2017/051181. (7 Pages).
International Preliminary Report on Patentability dated Dec. 14, 2006 From the International Bureau of WIPO Re. Application No. PCT/il/2005/000558.
International Preliminary Report on Patentability dated Jul. 17, 2007 From the International Preliminary Examining Authoirty Re. Application No. PCT/IL05/00166.
International Preliminary Report on Patentability dated Feb. 23, 2012 From the International Bureau of WIPO Re. Application No. PCT/IL2010/000645.
International Preliminary Report on Patentability dated Nov. 26, 2007 From the International Preliminary Examining Authority Re. Application No. PCT/IL05/00559.
International Preliminary Report on Patentability dated Apr. 30, 2020 From the International Bureau of WIPO Re. Application No. PCT/IL2018/051107. (6 Pages).
International Preliminary Report on Patentability dated Feb. 8, 2007 From the International Preliminary Examining Authority Re.: Application No. PCT/IL05/00166.
International Preliminary Report on Patentabillity dated Nov. 29, 2011 From the International Preliminary Examining Authority Re.: Application No. PCT/IL05/00166.
International Search Report and the Written Opinion dated Jan. 8, 2019 From the International Searching Authority Re. Application No. PCT/IL2018/051107. (9 Pages).
International Search Report and the Written Opinion dated Jan. 18, 2018 From the International Searching Authority Re. Application No. PCT/IL2017/051181. (16 Pages).
International Search Report and the Written Opinion dated Dec. 21, 2010 From the International Searching Authority Re. Application No. PCT/IL2010/000645.
International Search Report and the Written Opinion dated Dec. 25, 2018 From the International Searching Authority Re. Application No. PCT/IL2018/051128. (14 Pages).
International Search Report dated Jan. 4, 2006 From the International Searching Authority Re. Application No. PCT/IL05/00559.
International Search Report dated Jan. 9, 2007 From the International Searching Authority Re. Application No. PCT/IL05/00166.
International Search Report dated Sep. 19, 2006 From the International Searching Authority Re. Application No. PCT/IL0500558.
Notification of Office Action and Search Report dated Sep. 16, 2015 From the State Intellectual Property Office of the People's Republic of China Re. Application No. 201410254004.2 and Its Translation Into English.
Notification of Office Action and Search Report dated Oct. 24, 2016 From the State Intellectual Property Office of the People's Republic of China Re. Application No. 201410254004.2 and Its Summary in English. (6 Pages).
Notification of Office Action and Search Report dated Feb. 25, 2015 From the State Intellectual Property Office of the People's Republic of China Re. Application No. 201410254004.2 and Its Translation Into English.
Notification of Office Action dated Feb. 26, 2016 From the State Intellectual Property Office of the People's Republic of China Re. Application No. 201410254004.2.
Office Action dated Jul. 3, 2006 From the Israeli Patent Office Re. Application No. 162231 and Its Translation Into English.
Office Action dated Dec. 7, 2010 From the Israel Patent Office Re. Application No. 179765 and Its Translation Into English.
Office Action dated Aug. 18, 2010 From the Israeli Patent Office Re. Application No. 163459 and Its Translation into English.
Office Action dated Feb. 21, 2006 From the Israeli Patent Office Re. Application No. 162231 and Its Translation Into English.
Office Action dated Mar. 24, 2011 From the Israeli Patent Office Re. Application No. 177323 and Its Translation Into English.
Office Action dated Aug. 26, 2009 From the Israeli Patent Office Re. Application No. 177323 and Its Translation Into English.
Office Action dated Jul. 28, 2010 From the Israeli Patent Office Re. Application No. 177323 and Its Translation Into English.
Official Action dated Jul. 1, 2016 From the US Patent and Trademark Office Re. U.S. Appl. No. 14/619,218.
Official Action dated Feb. 2, 2017 From the US Patent and Trademark Office Re. U.S. Appl. No. 111606,242. (11 pages).

(56) References Cited

OTHER PUBLICATIONS

Official Action dated Dec. 4, 2015 From the US Patent and Trademark Office Re. U.S. Appl. No. 14/619,218.
Official Action dated Dec. 6, 2010 From the US Patent and Trademark Office Re. U.S. Appl. No. 10/589,234.
Official Action dated May 7, 2009 From the US Patent and Trademark Office Re. U.S. Appl. No. 11/588,277.
Official Action dated Sep. 7, 2010 From the US Patent and Trademark Office Re. U.S. Appl. No. 10/589,234.
Official Action dated Apr. 8, 2016 From the US Patent and Trademark Office Re. U.S. Appl. No. 11/606,242.
Official Action dated Feb. 8, 2011 From the US Patent and Trademark Office Re. U.S. Appl. No. 11/606,242.
Official Action dated Oct. 8, 2015 From the US Patent and Trademark Office Re. U.S. Appl. No. 14/554,287.
Official Action dated Apr. 9, 2018 From the US Patent and Trademark Office Re. Application No. 111606,242. (16 pages).
Official Action dated Apr. 9, 2019 From the US Patent and Trademark Office Re. U.S. Appl. No. 15/424,943. (16 pages).
Official Action dated Sep. 9, 2016 From the US Patent and Trademark Office Re. U.S. Appl. No. 11/606,242.
Official Action dated Mar. 10, 2006 From the US Patent and Trademark Office Re. U.S. Appl. No. 10/461,414.
Official Action dated Aug. 11, 2017 From the US Patent and Trademark Office Re. Application No. 111606,242. (16 pages).
Official Action dated Jun. 11, 2014 From the US Patent and Trademark Office Re. U.S. Appl. No. 12/853,361.
Official Action dated May 11, 2007 From the US Patent and Trademark Office Re. U.S. Appl. No. 10/776,163.
Official Action dated Feb. 12, 2008 From the US Patent and Trademark Office Re. U.S. Appl. No. 10/776,163.
Official Action dated Jul. 12, 2013 From the US Patent and Trademark Office Re. U.S. Appl. No. 11/606,242.
Official Action dated Mar. 12, 2012 From the US Patent and Trademark Office Re. U.S. Appl. No. 12/853,369.
Official Action dated Jul. 14, 2016 From the US Patent and Trademark Office Re. U.S. Appl. No. 13/975,399.
Official Action dated May 14, 2009 From the US Patent and Trademark Office Re. U.S. Appl. No. 11/606,242.
Official Action dated May 14, 2012 From the US Patent and Trademark Office Re. U.S. Appl. No. 12/853,361.
Official Action dated Jan. 15, 2013 From the US Patent and Trademark Office Re. U.S. Appl. No. 12/853,361.
Official Action dated Jul. 15, 2016 From the US Patent and Trademark Office Re. U.S. Appl. No. 14/554,287.
Official Action dated Nov. 15, 2013 From the US Patent and Trademark Office Re. U.S. Appl. No. 12/853,361.
Official Action dated Jul. 17, 2008 From the US Patent and Trademark Office Re. U.S. Appl. No. 11/606,154.
Official Action dated Jul. 17, 2008 From US Patent and Trademark Office Re. U.S. Appl. No. 11/606,154.
Official Action dated May 17, 2018 From the US Patent and Trademark Office Re. U.S. Appl. No. 14/619,218. (21 pages).
Official Action dated Jul. 18, 2014 From the US Patent and Trademark Office Re. U.S. Appl. No. 11/606,242.
Official Action dated Jun. 18, 2013 From the US Patent and Trademark Office Re. U.S. Appl. No. 12/853,361.
Official Action dated Mar. 18, 2015 From the US Patent and Trademark Office Re. U.S. Appl. No. 11/606,242.
Official Action dated Feb. 19, 2014 From the US Patent and Trademark Office Re. U.S. Appl. No. 13/206,646.
Official Action dated Nov. 19, 2007 From the US Patent and Trademark Office Re. U.S. Appl. No. 10/776,163.
Official Action dated Oct. 19, 2010 From US Patent and Trademark Office Re. U.S. Appl. No. 90/009,646.
Official Action dated Aug. 20, 2008 From the US Patent and Trademark Office Re. U.S. Appl. No. 10/776,163.
Official Action dated Dec. 20, 2012 From the US Patent and Trademark Office Re. U.S. Appl. No. 12/853,389.
Official Action dated Aug. 21, 2012 From the US Patent and Trademark Office Re. U.S. Appl. No. 12/853,361.
Official Action dated Apr. 22, 2010 From the US Patent and Trademark Office Re. U.S. Appl. No. 90/009,646.
Official Action dated Nov. 22, 2016 From the US Patent and Trademark Office Re. U.S. Appl. No. 13/975,399. (15 pages).
Official Action dated Aug. 23, 2011 From the US Patent and Trademark Office Re. U.S. Appl. No. 11/606,242.
Official Action dated Feb. 23, 2017 From the US Patent and Trademark Office Re. U.S. Appl. No. 14/619,218. (16 pages).
Official Action dated May 23, 2012 From the US Patent and Trademark Office Re. U.S. Appl. No. 11/606,242.
Official Action dated Jan. 25, 2007 From the US Patent and Trademark Office Re. U.S. Appl. No. 10/776,163.
Official Action dated Feb. 26, 2009 From the United States Patent and Trademark Office Re. U.S. Appl. No. 10/776,163.
Official Action dated Jan. 26, 2010 From the US Patent and Trademark Office Re. U.S. Appl. No. 90/009,646.
Official Action dated Jul. 27, 2009 From the US Patent and Trademark Office Re. U.S. Appl. No. 11/606,242.
Official Action dated Nov. 27, 2019 From the US Patent and Trademark Office Re. U.S. Appl. No. 16/558,356. (22 pages).
Official Action dated Jul. 29, 2013 From the US Patent and Trademark Office Re. U.S. Appl. No. 13/206,646.
Official Action dated Aug. 30, 2017 From the US Patent and Trademark Office Re. U.S. Appl. No. 14/619,218. (19 pages).
Official Action dated Jan. 30, 2019 From the US Patent and Trademark Office Re. U.S. Appl. No. 14/619,218. (24 pages).
Official Action dated Jun. 30, 2006 From the US Patent and Trademark Office Re. U.S. Appl. No. 10/776,163.
Official Action dated Nov. 30, 2012 From the US Patent and Trademark Office Re. U.S. Appl. No. 11/606,242.
Official Action dated Nov. 30, 2018 From the US Patent and Trademark Office Re. U.S. Appl. No. 15/424,943. (56 pages).
Official Action dated Sep. 30, 2019 From the US Patent and Trademark Office Re. U.S. Appl. No. 14/619,218. (17 Pages).
Official Action dated Mar. 31, 2009 From the US Patent and Trademark Office Re. U.S. Appl. No. 11/606,154.
Official Action dated Mar. 31, 2010 From the US Patent and Trademark Office Re. U.S. Appl. No. 11/606,242.
Official Action dated Aug. 7, 2020 from the US Patent and Trademark Office Re. U.S. Appl. No. 16/341,069. (58 pages).
Provision of the Minutes in Accordance With Rule 124(4) EPC dated Nov. 5, 2018 From the European Patent Office Re. Application No. 05745218.7. (22 Pages).
Restriction Official Action dated Apr. 3, 2012 From the US Patent and Trademark Office Re. U.S. Appl. No. 12/853,361.
Restriction Official Action dated Aug. 6, 2012 From the US Patent and Trademark Office Re. U.S. Appl. No. 12/853,389.
Restriction Official Action dated Sep. 13, 2018 From the US Patent and Trademark Office Re. U.S. Appl. No. 15/424,943. (8 pages).
Restriction Official Action dated May 14, 2013 From the US Patent and Trademark Office Re. U.S. Appl. No. 13/206,646.
Restriction Official Action dated Oct. 24, 2019 From the US Patent and Trademark Office Re. U.S. Appl. No. 16/558,356. (8 pages).
Restriction Official Action dated Jan. 29, 2016 From the US Patent and Trademark Office Re. U.S. Appl. No. 13/975,399.
Summons to Attend Oral Proceedings Pursuant to Rule 115(1) EPC dated Jan. 30, 2018 From the European Patent Office Re. Application No. 05745218.7. (7 Pages).
Supplementary European Search Report dated Apr. 9, 2015 From the European Patent Office Re. Application No. 05745218.7.
Supplementary European Search Report dated Aug. 26, 2009 From the European Patent Office Re. Application No. 05703208.8.
Supplementary European Search Report dated Jun. 29, 2009 From the European Patent Office Re. Application No. 05744201.4.
Third Party Request for Ex Parte Reexamination dated Nov. 30, 2009 From the US Patent and Trademark Office Re. U.S. Pat. No. 7,134,749.
Translation dated Mar. 9, 2016 of Notification of Office Action dated Feb. 26, 2016 From the State Intellectual Property Office of the People's Republic of China Re. Application No. 201410254004.2.

(56) References Cited

OTHER PUBLICATIONS

Translation of Notice of Reason for Rejection dated Jun. 17, 2011 From the Japanese Patent Office Re. Application No. 2007-514324.
Translation of Notice of Reason for Rejection dated Nov. 18, 2011 From the Japanese Patent Office Re. Application No. 2007-514324.
Translation of Notice of Reason for Rejection dated Sep. 28, 2010 From the Japanese Patent Office Re. Application No. 2006-552776.
Translation of Notification of Office Action dated Jul. 29, 2013 From the State Intellectual Property Office of the People's Republic of China Re. Application No. 201080045541.6.
Translation of Search Report dated Jul. 29, 2013 From the State Intellectual Property Office of the People's Republic of China Re. Application No. 201080045541.6.
Written Opinion dated Jan. 4, 2006 From the International Searching Authority Re. Application No. PCT/IL05/00559.
Written Opinion dated Jan. 9, 2007 From the International Searching Authority Re. Application No. PCT/IL05/00166.
Written Opinion dated Sep. 19, 2006 From the International Searching Authority Re. Application No. PCT/IL0500558.
BASF Corporation "HPD User's Guide, Stronger Inks for a More Colorful World", 2013.
Kessel et al. "The Diacetone Acrylamide Crosslinking Reaction and Its Influence on the Film Formation of an Acrylic Latex", Journal of Coating Technology and Research, 5(3): 285-297, Sep. 2008.
Riesen et al. "The Glass Transition Temperature Measured by Different TA Techniques. Part 2: Determination of Glass Transition Temperatures", Mettler Toledo, UserCom, XP007918757, p. 1-20, Feb. 2003.
Wikipedia "Boehmite", Wikipedia, the Free Encyclopedia, Retrieved From the Internet, Dec. 11, 2007.
Interview Summary dated Oct. 27, 2020 from the US Patent and Trademark Office Re. U.S. Appl. No. 16/341,069. (3 pages).
Notice of Reason(s) for Rejection dated Mar. 12, 2021 From the Japan Patent Office Re. Application No. 2019-523628 and Its Translation Into English. (13 Pages).
Official Action dated Mar. 19, 2021 From the U.S. Patent and Trademark Office Re. U.S. Appl. No. 14/619,218. (24 Pages).

* cited by examiner

INKJET COMPOSITIONS AND PROCESSES FOR STRETCHABLE SUBSTRATES

RELATED APPLICATIONS

This application is a continuation of U.S. patent application Ser. No. 16/558,356 filed on Sep. 3, 2019, which is a continuation of U.S. patent application Ser. No. 15/424,943 filed on Feb. 6, 2017, now U.S. Pat. No. 10,472,533, which is a continuation of U.S. patent application Ser. No. 13/975,399 filed on Aug. 26, 2013, now U.S. Pat. No. 9,611,401, which is a continuation of U.S. patent application Ser. No. 12/853,389 filed on Aug. 10, 2010, now U.S. Pat. No. 8,540,358, which claims the benefit of priority under 35 USC 119(e) of U.S. Provisional Patent Application Nos. 61/272,436 and 61/245,333, both filed on Sep. 24, 2009, and of 61/232,494 filed on Aug. 10, 2009.

The contents of the above applications are hereby incorporated by reference as if fully set forth herein.

FIELD AND BACKGROUND OF THE INVENTION

The present invention, in some embodiments thereof, relates to inkjet printing techniques and, more particularly, but not exclusively, to improved processes and compositions for inkjet printing of high resolution color images on stretchable and/or flexible absorptive and non-absorptive substrates of all colors.

The ever growing market of printing complex designs and images on almost every type of surface, and especially on knitted, woven and non-woven textile surfaces, plasticized and laminated fabrics (soft signage) and the likes, creates demands for new and more versatile printing technologies and materials. One such demand is for ink compositions and technologies which will be suitable for printing long lasting, durable, abrasion resistant, water-, detergent- and chemical-fast color images on a variety of materials, which will not wear out rapidly upon use, handling, washing and exposure to the environment. The garment industry is possibly the most demanding in terms of printing high quality and durable prints of textile, adding some requirements from the product, such as pleasant hand-feel of the printed area, flexible (bendable without cracking), stretchable and aerated print area, as well as following the guidelines of internationally accepted standards such as the Oeko-Tex Standard 100 (an international testing and certification system for textiles, limiting the use of certain chemicals, which was developed in 1992) and GOTS (Global Organic Textile Standard).

One of the most promising technologies for printing high quality color images, particularly in small batches of varying contents (short runs of variable data), on a wide variety of types and shapes of substrates, such as textile surfaces, is inkjet printing. Inkjet printing is a wide-spread technique in which a stream of a specific liquid ink composition is ejected as droplets from a cluster of minute nozzles (printheads) in response to electrical signals generated by a microprocessor to record characters and patterns on the surface of a printing subject without making direct contact between the ink application apparatus and the surface of the subject (non-impact printing). A typical inkjet printing system includes methods and apparatus in which electric signals are converted to mechanical signals for a continuous or on-demand jetting of an ink composition which is continuously supplied and stored in a nozzle head portion, to thereby record characters, symbols and patterns on the surface of a subject.

Reviews of various aspects of inkjet printing can be found in publications such as Kuhn et al., *Scientific American*, April, 1979, 162-178; Keeling, *Phys. Technol.*, 12(5), 196-203 (1981); U.S. Pat. Nos. 3,060,429, 3,298,030, 3,373,437, 3,416,153, 3,673,601, 4,312,007 and 4,380,770; and numerous other publications.

The presently available ink compositions, including compositions that are suitable for inkjet printing, include aqueous-based ink compositions and non-aqueous solvent-based ink compositions. The more commonly used inkjet compositions are aqueous-based ink compositions, which typically include water and a colorant, usually a dye or pigment dispersion, and may further contain a number of additives for imparting certain attributes to the ink as it is being applied (jetted), e.g., improved stability and flow, anti-corrosiveness, and feather and bleeding resistance), as well as attributes to affect its final cured properties such as the capability to form chemical bonds with the substrate, improved adhesion to the substrate, flexibility, stretchability, softness and the like.

One of the challenges in printing on fabric is its absorbability, which is far more challenging than that of, for example, paper or non-adsorbent substrates.

To ensure high quality images by inkjet, the ink composition should be characterized by free passage through the nozzles, minimal bleeding, paddling and/or smearing, uniform printing on the surface of the subject, wash-fastness, simple system cleaning and other chemical and physical characteristics. To meet these requirements, the ink composition should be characterized, for example, by suitable viscosity, solubility, volatility, surface tension, compatibility with other components of the printing system and, in cases of continuous flow inkjet printing, electrical resistance, and further be applied using suitable apparati, techniques and processes.

In case of printed fabrics (e.g., printed garments), in order to sustain wear and tear due to frequent use and wash cycles, the printed image on the final product, as well as the final product itself, should exhibit the properties of an elastic yet aerated film, and therefore the ink composition should also contain components which can impart such compressibility (softness), plasticity, elasticity, flexibility and stretchability.

During the last decades, numerous techniques, compositions and apparati for inkjet printing in general, and particularly on textile and garments, have been developed. See, for example, U.S. Patent Application Nos. 2002/0022120, 2002/0060728, 2003/0142167, 2003/0157304 and 2005/0098054 and U.S. Pat. Nos. 4,702,742, 5,349,021, 5,594,044, 5,645,888, 5,988,791, 6,042,228, 6,117,921, 6,126,281, 6,140,391, 6,322,620, 6,326,419, 6,341,856, 6,513,924, 6,536,894, 6,606,427, 6,626,530 and 6,879,378.

U.S. Pat. Nos. 6,196,674 and 6,500,880 and U.S. Patent Application Nos. 20010008908 and 20010018472 teach inkjet compositions which are said to alleviate feathering and bleeding problems of inkjet printing on semi-absorptive substrates, mainly paper and stationeries which are not designed or expected to bend or stretch.

Typically the thickness and the absorbance in the vertical direction (depth), as oppose to its surface in the XY field or horizontal direction, of any untreated fabric, are many orders of magnitude higher as that of paper, and particularly when compared to inkjet paper media, which is pre-treated to exhibit specific ink-retention and absorption properties. While contemporary inkjet paper media is designed for inkjet print and therefore supplied after being pretreated to retain the liquid inkjet, for example, by coating the surface of the paper with fumed silica and alike. Typical textile pieces are not intended for digital print application and therefore must be either pretreated "off-line" prior to the printing process.

IL Patent No. 162231 and WO 2005/115089 by the present assignee, which are hereby incorporated by reference as if fully set forth herein, teach processes and systems for printing high quality, high resolution, multi-color images on fibrous or porous materials or other ink absorbing materials, or on materials having high surface tension with the ink liquid, and especially over garments, effected by applying a wetting composition prior to applying an ink composition and formation of the images. Specifically, the process of printing an image on a surface is effected by contacting at least a part of the surface, preferably covering slightly more than the area which is intended for the image, with a wetting composition so as to wet that part of the surface. The wetting composition is capable of interfering with the engagement of a liquid ink composition with material, such that when applying the liquid ink composition on the wetted surface, the ink is kept from smearing and absorbing in the material, allowing to form a high-quality image on the wet part of the absorptive surface. According to some embodiments disclosed in IL Patent No. 162231 and WO 2005/115089, the wetting solution is applied in a way so as to soak the textile media therewith.

IL Patent No. 162231, WO 2005/115089 and U.S. Patent Application Nos. 20070103528 and 20070104899, by present assignee, therefore teach methodologies involving pretreatment of textile pieces which are wetted "on the fly".

U.S. Pat. No. 7,134,749 by the present assignee, which is hereby incorporated by reference as if fully set forth herein, teaches a method and apparatus for color printing on a dark textile piece. According to the teachings of this patent, the method includes the steps of digitally applying a white opaque ink layer directly onto a dark textile piece, and digitally printing a colored image on the white ink layer. Specifically, the method for color printing on a dark textile piece is effected by digitally printing, by means of an inkjet printing head, an opaque white ink layer directly onto a dark textile piece; and digitally printing a colored image on the white ink layer. The digital printing of the white ink layer is performed such that the white ink layer substantially covers, without exceeding, the designed area of the colored image, and further such that the white ink layer and the colored image are substantially coextensive.

U.S. Patent Application Nos. 20070103528 and 20070104899, by the present assignee, which are hereby incorporated by reference as if fully set forth herein, teach individual and integrated processes, methods and compositions for printing high quality, high resolution, multi-color images on lightly and/or darkly colored fibrous or porous materials or other ink absorbing materials, which also provide a mechanism for drop immobilization aimed at inhibiting the adsorption by fabric, the bleeding, smearing, paddling and feathering of the jetted ink droplets. These integrated processes are effected by digitally printing a layer of an opaque, lightly colored ink composition, followed by digitally printing the colored image thereon, and optionally further involve applying a wetting composition prior to and/or subsequent to printing of these layers. These documents further provide multi-component compositions and processes utilizing wetting compositions and/or two-part liquid ink compositions which can interact therebetween as property-adjusting and property-sensitive pairs, so as to effect a chemical and/or physical change in one or more of these parts, and thus obtain improved binding and color perception of the resulting images on surfaces, particularly in cases of absorptive substrates.

SUMMARY OF THE INVENTION

The present inventors have now designed and successfully practiced novel processes for printing high-quality and physically durable and serviceable color images on various surfaces, including absorptive and non-absorptive substrates, which are especially suitable for inkjet printing on stretchable, flexible and bendable materials, and utilize inter-reactive agents which are capable of interacting upon contact therebetween on the surface of the substrate so as to effect immobilization of the liquid ink composition. To this effect, the present inventors have designed and successfully practiced, novel ink compositions, which are suitable for use in these and other inkjet printing processes.

The novel ink compositions disclosed herein are intended to produce in situ, during the printing process, an image which is formed from two or more separate and discrete parts, or components, of the ink composition, each of which is jetted or sprayed onto the surface of the substrate from a separate and discrete printhead or nozzle. Some of these parts are jetted by a digitally controlled process, while some may be sprayed by a less precise and repetitive manner. These components must be kept separately until used in the printing process since they are reactive therebetween. Once in contact therebetween on the surface of the substrate, the various components of the liquid ink composition are not absorbed into the substrate, as a result of the aforementioned reactivity which effects congelation of the composition upon formation, an effect which is referred to herein as immobilization. Thus, the congealed composition droplet is less fluid and hence less mobile and less free to wick into or spread over the substrate. The various components of the liquid ink composition are not absorbed into the substrate also as a result of particular printing process parameters, such as minimal time interval between the application of each component, and a small average volume of the jetted droplets while being applied on the substrate. Once the printing process is over in terms of applying the ink composition on the substrate, the composition undergoes curing which transforms it into a film which is durable and elastic, and affixed firmly to the substrate.

Thus, according to one aspect of embodiments of the present invention there is provided a proto-elastomeric film-forming inkjet composition which includes a first part and a second part, wherein the first part comprises a property-adjusting agent and a first carrier, and the second part comprises an emulsified property-sensitive proto-elastomeric film-forming agent, a colorant and a second carrier, whereas the second part congeals upon contact with the property-adjusting agent, the inkjet composition being for forming an image in a form of an elastic film attached to a surface of a stretchable and/or flexible substrate.

According to some embodiments of the invention, the second part further comprises a first metal oxide.

According to some embodiments of the invention, the first metal oxide is substantially transparent.

According to some embodiments of the invention, the composition further includes a third part, the third part includes the emulsified property-sensitive proto-elastomeric film-forming agent, a second metal oxide and a third carrier.

According to some embodiments of the invention, the composition further includes a fourth part, the fourth part includes the emulsified property-sensitive proto-elastomeric film-forming agent, a second metal oxide a colorant and a fourth carrier.

According to some embodiments of the invention, the second metal oxide is substantially opaque white.

According to some embodiments of the invention, a film formed by the property-sensitive proto-elastomeric film-forming agent is characterized by a glass transition temperature (Tg) that ranges from −35° C. to 0° C.

According to some embodiments of the invention, the first carrier, the second carrier, the third carrier if present and the fourth carrier if present are each independently selected from the group consisting of an aqueous carrier and a non-aqueous carrier.

According to some embodiments of the invention, each of the first carrier, the second carrier, the third carrier if present and the fourth carrier if present is an aqueous carrier.

According to some embodiments of the invention, the property is a chemical and/or physical property selected from the group consisting of acidity (pH), metal atom complexation, ionic strength, solubility, dispersibility, dispensability, hydrophobicity and electric charge.

According to some embodiments of the invention, the property-adjusting agent is selected from the group consisting of an acid, a base, a salt, a metal oxide, an organic solvent, a polymerization catalyst, a charged polymer, an oxidizing agent, a reducing agent, a radical-producing agent and a crosslinking agent.

According to some embodiments of the invention, the property is acidity (pH). According to some embodiments of the invention, a pH of the first part ranges from 3.5 to 5.5.

According to some embodiments of the invention, the property-adjusting agent is an organic acid.

According to some embodiments of the invention, the acid is a transitory organic acid.

According to some embodiments of the invention, the transitory organic acid is lactic acid.

According to some embodiments of the invention, the transitory organic acid is glycolic acid.

According to some embodiments of the invention, the property is metal atom complexation.

According to some embodiments of the invention, the property-adjusting agent is a third metal oxide.

According to some embodiments of the invention, the property-sensitive proto-elastomeric film-forming agent is selected from the group consisting of an alkyl-acrylic polymer, acrylic-styrene copolymer, an alkyl-acrylic copolymer and, an emulsified urethane polymer.

According to some embodiments of the invention, the property-sensitive proto-elastomeric film-forming agent is a self-crosslinking alkyl-acrylic copolymer.

According to some embodiments of the invention, the self-crosslinking alkyl-acrylic copolymer is an ethyl-acrylic/butyl-acrylic copolymer.

According to some embodiments of the invention, the first part further includes at least one agent selected from the group consisting of a binder, a film-forming binder, a polymerization catalyst, a crosslinking agent, an amine stabilizer, an alcohol stabilizer, a softener/plasticizer, a surface active agent, a surface tension modifying agent, a viscosity modifying agent, a thickener agent, an anticorrosion agent and any combination thereof.

According to some embodiments of the invention, each of the second part, the third part if present and the fourth part if present further includes independently a crosslinking agent.

According to some embodiments of the invention, the crosslinking agent is a formaldehyde-free crosslinking agent.

According to some embodiments of the invention, the formaldehyde-free crosslinking agent is selected from the group consisting of a polyaldehyde, a heteroaryl polycarbamate, a diacetone acrylamide/hydrazine and a carbodiimide.

According to some embodiments of the invention, the first part includes a transitory organic acid or a first metal oxide and water, and the second part includes an emulsion of a pH-sensitive and/or metal oxide-sensitive proto-elastomeric film-forming alkyl-acrylic copolymer, a colorant and water, whereas the second part congeals upon contact with the acid or the first metal oxide.

According to another aspect of embodiments of the present invention there is provided a process of printing an image on a stretchable and/or flexible substrate, the process is effected by digitally applying, by means of a plurality of inkjet printheads, onto at least a portion of a surface of the substrate, the proto-elastomeric film-forming ink composition according to some embodiments of the present invention, wherein the first part is applied by at least one first printhead of the plurality of inkjet printheads and the second part is applied by at least one second printhead of the plurality of inkjet printheads, thereby forming the image in a form of an elastic film attached to a surface of the substrate.

According to some embodiments of the invention, a time interval between an application of the first part of the ink composition and an application of the second part of the ink composition is less than 1 second.

According to some embodiments of the invention, the substrate is selected from the group consisting of an absorptive substrate and a non-absorptive substrate.

According to some embodiments of the invention, the absorptive substrate is selected from the group consisting of a knitted fabric, a woven textile fabric, a non-woven textile fabric, a cloth, a garment, paper, cardboard, and any combination thereof.

According to some embodiments of the invention, the process further includes, prior to digitally applying the ink composition, flattening protruding fibers if present in the substrate.

According to some embodiments of the invention, flattening protruding fibers is effected by:
a. wetting the surface by means of a wetting unit; and
b. exerting a flattening pressure on the surface after the wetting by means of a flattening unit head for exerting pressure on the surface.

According to some embodiments of the invention, the non-absorptive substrate is selected from the group consisting of a soft signage media, plastic, metal foil and any combination thereof.

According to some embodiments of the invention, the surface is substantially a dark surface.

According to some embodiments of the invention, the average jetted drop volume of each of the first part, the second part and the third part, if present, of the ink composition ranges independently from 40 pico liter to 90 pico liter.

According to some embodiments of the invention, the amount jetted of the first part ranges from 0.005 grams per square inch to about 0.040 grams per square inch.

According to some embodiments of the invention, the amount jetted of the second part ranges from 0.015 grams per square inch to about 0.085 grams per square inch.

According to some embodiments of the invention, the amount jetted of the third part, if present, ranges from 0.07 grams per square inch to about 0.15 grams per square inch.

According to some embodiments of the invention, the time interval between an application of the first part and an application of the second part, and a time interval between an application of the first part and an application of the third part, if present, are each less than 1 second.

According to some embodiments of the invention, the time interval between an application of the first part and an application of the second part, and the time interval between an application of the first part and an application of the third part, if present, are each less than 0.75 seconds.

According to some embodiments of the invention, the time interval between an application of the first part and an application of the second part, and the time interval between an application of the first part and an application of the third part, if present, are each less than 0.5 seconds.

According to some embodiments of the invention, the film formed by the proto-elastomeric film-forming agent is characterized by a glass transition temperature (Tg) that ranges from −35° C. to 0° C.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrase "substantially devoid of" a certain substance refers to a composition that is totally devoid of this substance or includes no more than 0.1 weight percent of the substance.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

It is expected that during the life of a patent maturing from this application many relevant methods, uses and compositions will be developed and the scope of the terms methods, uses, compositions and polymers are intended to include all such new technologies a priori.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 presents a schematic diagram illustrating a digital printing machine with a wetting unit, a flattening unit and a printing head, according to a first embodiment of the present invention;

FIGS. 2A-2B present schematic diagrams of an exemplary printing machine with a roller-flattening unit according to a further embodiment of the present invention (FIG. 2A), and an exemplary printing machine with a curtain-flattening unit, according to a further embodiment of the present invention (FIG. 2B);

FIG. 3 presents a schematic diagram of an exemplary carousel-printing machine using a flattening unit according to an embodiment of the present invention;

FIG. 4 presents a schematic diagram of an exemplary matrix-printing machine using a flattening unit, according to an embodiment of the present invention;

FIG. 5 presents a schematic diagram from the side, of a printing machine comprising a wetting unit, a roller type flattening unit and a printing unit;

FIG. 6 presents a simplified flow chart describing an exemplary printing procedure for printing on a dark garment using a digital printing machine with a flattening unit according to an embodiment of the present invention;

FIG. 7 presents a schematic side view of a digital printing machine comprising an exemplary flattening unit in operative state;

FIG. 8 presents a schematic side view of an exemplary digital printing machine comprising an exemplary flattening unit in non-operating state;

FIG. 9 presents a schematic view of an exemplary flattening unit in operative state;

FIG. 10 presents a schematic view of an exemplary flattening unit in non-operative state;

FIG. 11 presents a close up view of an exemplary digital printing machine comprising an exemplary flattening unit in operative state;

FIGS. 12A-12C present color photographs of three untreated black 100% cotton textile pieces having an opaque white part of an ink composition applied thereon by an inkjet printer, comprising opaque white titania as a pigment and as a metal oxide, and an acrylic emulsion as a property-sensitive proto-elastomeric film-forming agent emulsified in deionized water, printed in a pattern of about 65 mm stripes at a pre-designed drop-density levels, wherein FIG. 12A shows the results of printing the white part of the ink composition printed without any attempt to immobilize the ink before curing, FIG. 12B shows the results of printing the white part of the ink composition printed after spraying the cloth with a wetting composition (as disclosed in WO 2005/115089), and FIG. 12C shows the results of printing the ink composition, using a process according to embodiments of the present invention, as a first part (the immobilization part), which includes a transitory acid as a property-adjusting agent and other ingredients, together with an opaque white part (the third part) applied concomitantly therewith, demonstrating the inability to obtain reasonable results of inkjet printing without immobilizing the white layer on the garment prior to curing, the results obtained using a wetting composition, and the superb results obtained when using the process presented herein by an exemplary embodiment thereof;

FIGS. 13A-13B present color photographs of two untreated black 100% cotton textile pieces having colored (cyan, magenta, yellow and black, or CMYK pigments) ink compositions printed thereon in a pattern of squares, each square in a different combination of CMYK pigments (column-wise) and different drop-density (row-wise), printed on a white underbase, wherein FIG. 13A shows the results when the colored pigments are printed on a layer of white underbase after spraying the cloth with a wetting composition (as disclosed in WO 2005/115089), and FIG. 13B shows the results obtained when using a process according to embodiments of the present invention, where an immobilization part (first part) is printed concomitantly with the part containing the colored pigments (second part), and less than a second after an immobilization part (first part) was applied concomitantly with an opaque white part (third part) using a third of the amount of white underbase (0.11 grams per square inch) to accomplish the acceptable results, demonstrating the superb results obtained when using the inkjet printing process according to some embodiments of the present invention;

FIGS. 14A-14C present color photographs of three untreated white 100% cotton textile pieces having colored pattern as shown in FIG. 13 printed thereon, wherein FIG. 14A shows the results when the colored pigments are printed on the white cloth without any attempt to immobilize the ink before curing, FIG. 14B shows the results when the colored pigments are printed after spraying the cloth with a wetting composition (as disclosed in WO 2005/115089) based on 2% acetic acid and 0.1% wetting agent (BYK 348) in tap water, and FIG. 14C shows the results obtain when using a process according to embodiments of the present invention, where an immobilization part (first part) is printed concomitantly with the part containing the colored pigments (second part), demonstrating the superb results obtained when using the inkjet printing process according to some embodiments of the present invention;

FIGS. 15A-15C present color photographs of three white synthetic pieces that serve as media for soft signage, having a colored image of a pattern (as shown in FIG. 13 hereinabove) printed thereon, wherein FIG. 15A shows the color image printed without any attempt to immobilize the ink before curing, FIG. 15B shows the color image printed after spraying the cloth with a wetting composition (as disclosed in WO 2005/115089) based on 2% acetic acid and 0.1% wetting agent (BYK 348) in tap water, and FIG. 15C shows the color image obtained when using a process as presented herein, wherein the first part (the immobilization part) is applied concomitantly with the second part (colored part), demonstrating the superb results obtained when using the inkjet printing process according to some embodiments of the present invention;

FIGS. 16A-16B present color photographs of one color image printed on a highly stretchable black fabric (Lycra™), which was printed using an exemplary ink composition based on proto-elastomeric film-forming agents having Tg lower than 0° C., printed using an exemplary process, according to embodiments of the present invention, wherein FIG. 16A shows the image on the relaxed fabric which spans about 6 cm, and FIG. 16B shows the same image in the same piece of fabric, stretched to about 10.5 cm without causing any degradation to the appearance of the image due to stretching; and FIGS. 17A-17B present color photographs of two similar color images printed on a highly stretchable black fabric (Lycra™), which were printed using an ink composition with film-forming agents having Tg higher than 85° C., printed by an exemplary process according to embodiments of the present invention, wherein FIG. 17A shows a similar image as presented in FIG. 16 on the same type of fabric as shown in FIG. 16, stretched to about 10.5 cm, showing the cracks and the damaging effect of stretching the non-elastic image, and FIG. 17B where another image was printed with an extended opaque white underbase, showing the cracks and extensive degradation of the image due to stretching, as compared to the stretched image in FIG. 16B.

DESCRIPTION OF SPECIFIC EMBODIMENTS OF THE INVENTION

The present invention, in some embodiments thereof, relates to inkjet printing and, more particularly, but not exclusively, to improved compositions and processes of inkjet printing of high resolution color images on stretchable and flexible absorptive and non-absorptive substrates of all colors.

The principles and operation of the present invention may be better understood with reference to the figures and accompanying descriptions.

Before explaining at least one embodiment of the invention in detail, it is to be understood that the invention is not necessarily limited in its application to the details set fourth in the following description or exemplified by the Examples. The invention is capable of other embodiments or of being practiced or carried out in various ways.

As discussed in detail hereinabove, there is an ever-growing need for methods and compositions for improved performance of inkjet technologies, particularly on challenging substrates such as colored (non-white) highly absorptive materials, including knitted, woven or unwoven, textile and garments that are designed and expected to stretch and laundered regularly, as well as on non-woven fabrics, soft signage and other substrates which are substantially non-absorptive materials which are designed to bend and flex. Such non-absorptive materials require laborious pretreatment procedures which cannot be effected on the fly during the printing process, and are not suitable for some of the aforementioned art of pre-treatment, wetting and printing methods, or ink compositions. Similar limitations exist in the wide and large format roll to roll printed fabrics. It is therefore the reason why the teachings of documents such as, for example, U.S. Pat. Nos. 6,196,674 and 6,500,880 and U.S. Patent Application Nos. 20010008908 and 20010018472, cannot be applied for stretchable substrates.

Some of the problems of printing on absorptive surfaces can be mitigated by permanently augmenting the properties of the media, as in the case of high-quality paper for color inkjet prints, which is essentially pre-treated in order to optimize its liquid ink retention properties and its whiteness (enhancing its light reflectance). However, such augmentation of the physical and chemical properties of flexible and stretchable non-white media may be impractical to apply off-line (before the printing process), namely the pre-treatment step renders the entire process a cost-ineffective part of the technique, particularly in cases of printing on stretchable and flexible absorptive and/or colored materials, such as textile. Furthermore, in cases of fabrics and garments, whose absorption depth, contrary to paper, is many orders of magnitude greater, such pre-treatments may prove ineffective and destructive to the media.

Modern research and development in the field of inkjet printing is aimed mostly at improving the ability to form a high-resolution color images on absorptive and non-adsorptive substrates at low costs of environmental implications, time, equipment and chemicals, which will still be characterized by improved color-space coverage (color-depth), and still possess the physical properties which are required from the finished printed image, namely the durability, flexibility, stretchability, fastness, pleasant hand-feel and breathability of the printed area and also be acceptable under the "Oeko-Tex Standard 100" and other regulatory requirements. For example, one of the standards required in modern garment and textile products is the absence of formaldehyde and phenol derivatives as well as other components that are not suitable for direct contact with skin, and hence the inks utilized in the production of such printed products must be free of any such harmful chemicals.

Some improvements of color inkjet printing on textile have been disclosed by the present assignee, as discussed hereinabove, and include wetting the garment on-the-fly with a layer of a wetting composition before applying the layers of colored inks thereon, which can be combined with applying a layer of a white and opaque layer on the garment so as to improve the light reflectance of the surface, and further combined with the use of multifunctional and multi-component compositions that can effect a chemical and/or physical change in the combined inkjet liquid ink composition so as to limit or abolish pre-curing absorption of the ink droplets. Thus, the wetting composition and the multi-component compositions are all aimed at causing the jetted ink droplets to stay on-top and affixed to the surface of the material without extensive absorption, smearing and bleeding before they dry and cure.

While practicing the above-described methodologies, the present inventors have recognized that in order to further obviate the obstacles posed by printing on absorptive substrates, one should consider the factors which govern the absorption of the liquid inks into the substrate, mostly due to intrinsic surface tension of the materials, and the capillary action, also known as wicking, which stem therefrom. As the amount of ink delivered by a printhead is typically very small, the present inventors have recognized that the jetted droplet must be kept as visible as possible on the substrate.

On the other hand, the present inventors have recognized that when the substrate is completely non-absorptive (impregnable, non-permeable), such as high surface tension and impervious substrates that do not interact with a liquid ink composition so as to restrict the movement of the jetted droplets, the liquid ink droplets may sputter, spread and smear, and droplets of different colors may flow into one another and thus greatly reduce the quality of the resulting image. In addition, the present inventors have recognized that the high surface tension of some non-absorptive substrates may cause de-wetting of the surface by the ink, thus preventing the formation of continuous covered areas as the ink droplets tend to coalesce, leaving uncoated areas. Hence, the present inventors have recognized that instant immobilization of the ink droplets on the surface of such substrate will prevent this phenomenon from occurring. Thus, the present inventors have recognized that factors which govern the localization and confinement of the liquid ink droplets on top of impregnable substrates, such as surface tension, texture (grain) and the imperviousness of the materials, should be considered and mitigated as well the requirement for flexible and sustainable print-work.

The present inventors envisioned that utilizing a multi-component (having multiple parts, also referred to as multi-part) ink composition which comprises an immobilization part and one or more coloring parts that are immobilized by the immobilization part, while controlling and minimizing the time which passes between applying the various parts of the multi-component ink composition, the capillary action can be mitigated so as to minimize and substantially eliminate the undesirable absorption of the ink into the substrate. The present inventors have further envisioned that selecting suitable printheads so as to control the size of the jetted droplets of each part and using each part sparingly, bleeding of droplets one into another would be minimized or eliminated, affording a high-quality color image on such substrates. The aforementioned phenomenon of intermixing of different colored droplets applied on non-absorptive substrates can also be mitigated or abrogated by an almost instantaneous immobilization of the colored ink droplets.

Furthermore, the present inventors have envisioned that this instantaneous immobilization of inkjet compositions on absorptive and non-absorptive substrates can be utilized on stretchable and flexible media by the selection of particular formulations for the multi-parts ink composition, such that will enable the formation of a stretchable, soft and flexible color prints that would not crack, flake or peel-off.

As known in the art, some inkjet compositions designed for paper and other non-stretchable substrates are based on dispersed pigment colorants, wherein the dispersants are sensitive to the intrinsic or added acidity of the substrate, hence cause dispersing agents of the pigments to stop acting as dispersants, thereby lowering the flowability of the pigment. These systems are designed to attenuate the capacity of the pigments in these ink compositions to bleed into the substrate. Such ink compositions are disclosed, for example, in U.S. Pat. Nos. 6,196,674 and 6,500,880.

While reducing the present invention to practice, the present inventors have surprisingly found that emulsions of some acrylic polymers and copolymers, which are used as binders to treat knitted, woven and non-woven textile, break when exposed to acidity in the presence of some metal oxides, or break when exposed to other metal oxides even without lowering the pH of the medium. Such acrylic polymers can be selected to have useful cloth binding properties and form elastic films on textile and other stretchable substrates even after drying and curing.

While further reducing the present invention to practice, the present inventors have formulated several ink compositions, which are intended specifically for printing color images on stretchable and flexible absorptive substrates such as woven and non-woven fabrics, as well as on stretchable and flexible non-absorptive (impervious) substrates, and which, when utilized in inkjet printing processes, produce durable color images that exhibit resistance to water and other chemicals, as well as to stretching and flexing, and yet are of high-quality in terms of resolution and color-depth and have a pleasant/soft hand-feel. These formulations may further employ the optional use of substances that can flatten the protruding fibers of fabrics so as to afford sharper images.

The processes and compositions provided herein are designed to produce uncompromising high-quality color images on all sorts of substrates, and particularly on some of the most challenging substrates for inkjet technology in the industry, namely substrates which are not kept flat, dry and relaxed, but rather used in a variety of environments, chemical conditions and physical impact. Such substrates are stretchable and flexible in all directions to some extent, and therefore any image printed thereon must also be co-stretchable and co-flexible to the same extent with the substrate, as can be achieved according to the embodiments provided in the present invention.

Thus, the processes according to some embodiments of the present invention utilize specifically formulated multi-component ink compositions having compatible agents which are capable of interacting therebetween on the surface of the substrate to form an elastic film while not being absorbed into the substrate due to the combination of specific chemical formulation and particular printing process parameters, as detailed hereinbelow.

Hence, according to an aspect of the present invention, there is provided a proto-elastomeric film-forming inkjet composition which includes a first part and a second part, wherein the first part comprises an emulsified property-adjusting agent and a first carrier, and the second part comprises a property-sensitive proto-elastomeric film-forming agent, a colorant and a second carrier, whereas the second part congeals or coagulates upon contact with the property-adjusting agent.

The inkjet composition, according to embodiments of the present invention, is formulated for forming an image in a form of an elastic film attached to a surface of a stretchable and/or flexible substrate.

Once all the parts of the ink composition converge on the substrate and the printing process is complete, a thin elastic film, which constitutes the image, is formed on the substrate. As used herein, the phrase "elastic film" refers to the mechanical property and form of the image, as it is formed on the substrate from a polymerizable ink composition. This film is said to be elastic since it is formed substantially from elastomeric substances. The film, according to some embodiments of the present invention, is at least as elastic as the substrate it is affixed to.

The term "elastomeric", as used herein, refers to the mechanical properties of a rubber-like polymeric substance, which can deform under stress exerted by external forces, and can return to its original shape when the stress is removed. The elasticity of an elastomer may depend on external conditions such as temperature. Hence, according to some embodiments, the term "elastomeric" refers to mechanical properties at temperatures which are normal for human habitats, and particularly at room temperature.

Hence, the elastomeric film which constitutes the image is characterized by a low glass transition temperature (Tg), which allows it to form a stretchable image on a stretchable substrate at ambient conditions. The glass transition temperature (Tg) is the temperature below which amorphous materials, such as polymers, become stiff (glassy), and above which become pliable and elastic (rubbery).

"Thermoplastic" is another term which is used to describe polymeric substances which can reversibly go from a stiff state to an elastic state.

As used herein, the term "thermoplastic" refers to a polymer which is sufficiently soft above a certain temperature so as to readily allow plastic deformation of the polymer, and which is sufficiently stiff below a certain temperature so as to retain a desired shape. The softening of a thermoplastic polymer often occurs at temperatures near and/or above a transition temperature (e.g., a glass transition temperature, a melting point) of the polymer. Such a transition temperature may be determined, for example, by calorimetry.

The phrase "softening temperature", as used herein, refers to the lowest temperature among the glass transition temperature range of a thermoplastic polymer. Other terms used in the art for such temperature-dependent characteristic, include the melting point of the thermoplastic resin, the temperature which brings the viscosity of the thermoplastic resin to about $10^{11}$ to $10^{12}$ poises, the pour point of the thermoplastic polymer, and the minimum film-forming temperature (MFT) in the form of an emulsion of the thermoplastic polymer.

In the context of embodiments of the present invention, the relatively low Tg of the finished image film attached to the substrate is lower than 0° C., or alternatively it ranges from about −35° C. to about 0° C., or from about −35° C. to about −5° C.

The property of Tg of the film is determined by the properties of its constituents, therefore a film which is elastic at relatively low temperatures, is formed from elastomers having a relatively low Tg. Hence, according to some embodiments of the present invention, the ink composition which forms can form a film which is affixed to the substrate comprises proto-elastomeric film forming constituents.

The elasticity of the elastomeric film which constitutes the image can be determined by its ability not to crack or tear when the substrate on which it is applied on is stretched. For example, an image is defined as elastic in the context of embodiments of the present invention, if maintains its shape, color composition and overall integrity (no cracks, tears or other permanent deformations) upon stretching the substrate in one direction by 30% of its original length. Alternatively, an image is defined as elastic when maintaining integrity after substrate is stretched by 50%, 75%, 100%, 150%, 200% and up to 300% for highly stretchable substrates.

Alternatively, the image is defined as characterized by an elongation percentage and a recovery percentage of elongation, when it maintains its original shape and color composition and is fully recoverable after stretching when applied on a given substrate. The elongation percentage and a recovery percentage of elongation are as defined in U.S. Pat. No. 5,874,372. Hence, the elastic image afforded according to some embodiments of the present invention, is characterized by an elongation percentage of 30% to 200% and a recovery percentage of elongation of at least 70%.

As used herein, the term "proto-elastomeric" refers to a substance which becomes elastomeric, as defined herein, under certain conditions, such as setting, polymerizing, drying, heating, curing, crosslinking and the likes. For example, crude natural rubber becomes elastomeric upon vulcanization, which is a chemical process involving heat and crosslinking with sulfur. In the context of embodiments of the present invention, a proto-elastomeric substance may be found in a dispersed form, a dissolved form or as an emulsion, and in the process of polymerization, self-crosslinking, crosslinking via a crosslinking agent, drying and/or curing, becomes the elastomeric substance which is left attached on the surface of the substrate.

The phrase "film-forming agent", as used herein, refers to a bonding/binding agent (binder) which polymerizes, crosslinks to itself or crosslinks via a crosslinking agent, and affords a film or a layer upon application, optionally upon drying and curing thereof on a surface. As known in the art, film-forming agents are a group of chemicals that afford a pliable, stretchable, cohesive, and continuous or semi-continuous covering film or layer over a surface when applied thereon and allowed to undergo a chemical or physical transition. The chemical or physical transition may be setting, polymerizing, drying, heating, curing, crosslinking and the likes. The phrase "film-forming agent", encompasses coating agents, binders, adhesives, adhesion-promoting agents, resins, polymers, co-polymers and the like collectively.

Non-limiting families of film-forming agents include monomers, oligomers (short chains of about 10-100 monomers), polymers and copolymers of acrylates, acrylamides and other derivatives of acrylic acid, acryl/styrene, polyethylene-glycols, urethanes and polyvinylpyrrolidones, and the likes also in the form of resin emulsions and co-emulsions. These film-forming agents can also be selected to have a relatively low Tg.

In order to obtain a sharp and vivid image in the form of an elastic film, the film should be made from fine and distinct points of colors, corresponding to pixels of a digital image or the grain of a photographic paper coated with light-sensitive chemicals. The distinct points of colors stem from very fine droplets of colored ink which are jetted onto the substrate during the printing process, and the finer the droplets remain on the substrate after ejection, the finer the image would be. The droplets will remain fine if feathering, bleeding and smearing can be limited.

As discussed hereinabove, the way to afford a sharp image film on the substrate is to "freeze" or immobilize the droplets on contact with the substrate. Thus, a chemical and/or physical change takes effect in the ink composition upon contacting thereof with the substrate, and this chemical and/or physical change is effected by combining agents in the composition which are designed to afford the immobilization of the inkjet droplets on the substrate, which will eventually lead to better and sharper images.

The term "immobilization", as used in the context of embodiments of the present invention, refers to the act of restriction or substantial limitation of flowability of a liquid, namely substantial reduction of the capability of a liquid to move by flow. For example, immobilization of a liquid can be effected by congelation of the liquid or solutes therein. Immobilization of droplets of liquid ink can be achieved, for example, by elevating the viscosity of the liquid ink composition such that the droplets are restricted from flowing once in contact with the substrate. As used herein, the term "immobilization" is not meant to include final polymerization and print fixation by crosslinking and curing reactions.

Quantitatively, "immobilization" in the context of embodiment of the present invention is defined as elevating the viscosity of the color-bearing parts of the ink composition by 10-folds, 50-folds, 100-folds, 500-folds 1000-folds or 2000-folds and more. For example, when a given color-bearing part is characterized by having a viscosity of 10-13 cp, it is defined as immobilized when its viscosity is elevated to about 2000 cp or higher as a result of congelation.

Hence the chemical and/or physical change, according to some embodiments of the present invention, is congelation. The term "congelation", as used herein, is synonymous to the terms "coagulation", "thickening" or "gelation", and refer to the sharp decrease in fluidity of a formerly fluid liquid. Congelation can be effected also by sedimentation, precipitation, partial solidification and partial polymerization of soluble constituents in the composition.

Thus, according to some embodiments of the present invention, the inkjet compositions include an emulsified proto-elastomeric film-forming agent that can congeal on a stretchable substrate controllably so as to avoid bleeding of the ink composition. The ink composition then polymerizes during drying/curing on the surface of the substrate without being absorbed therein, and becomes affixed to the substrate, thereby affording an image in the form of a flexible film, which can stay pliable and extendable as the stretchable substrate at normal temperatures of everyday life.

A flexible film-shaped image in the context of the present is defined by having a Young's modulus of less than 2 GPa, less than 1 GPa or less than 0.5 GPa.

In order to effect congelation upon contact with the substrate and not before, the proto-elastomeric film-forming ink composition is formed from at least two separate parts which combine only upon contact with the substrate. The two parts cross-react with each other since one part contains a property-sensitive proto-elastomeric film-forming agent and the other contains a property-adjusting agent, and the cross-reaction between the two parts effects the congelation.

In general, the objective of using a multi-part ink composition containing property-sensitive proto-elastomeric film-forming agent in one part and property-adjusting agent in a separate part, is to provide the means to congeal and thereby immobilize the ink composition only on the surface of the substrate and not beforehand, thus avoiding clogging of the delicate elements of the printheads. The property-adjusting agent is selected such that it effects a change in the property-sensitive film-forming agent only upon allowing contact therebetween, and thereby effects congelation in the combined ink composition.

The term "property-sensitive" refers to a component of a composition which is sensitive to a change in a particular chemical and/or physical property of the composition and as a result of such a change undergoes a chemical and/or physical change which effects the entire composition. Such sensitivity can manifest itself by, for example, the loss of its ability to stay as an emulsion, an event that leads to congelation.

The term "property" as used herein refers to a chemical and/or physical property of the ink composition, namely, a characteristic of the composition that is reflected by the chemical composition and/or a physical parameter of the composition. Representative examples include, without limitation, acidity (pH), metal atom complexation, dispensability, dispersibility, solubility, ionic strength, hydrophobicity, electric charge and the likes.

The term "pH" refers to the quantitative measure of the acidity or alkalinity (basicity) of liquid solutions. As will be discussed hereinbelow, the present inventors have found that some proto-elastomeric film-forming agents become pH-sensitive only in the presence of certain metal oxides.

The phrase "metal ion complexation", as used herein, refers to the ability of some functional groups in certain substances, to act as ligands which bind to some metal atoms in a coordinative manner so as to form a metal-ligand complex. Such complexation may alter the chemical characteristics of these substances and render them more or less susceptible to chemical changes in their environment. As will be discussed hereinbelow, the present inventors have found that some proto-elastomeric film-forming agents are sensitive to this property without the need of a change in the pH of the medium.

The phrase "ionic strength" as used herein refers to the charge-weighted concentration of ions in solutions.

The term "hydrophobicity" as used herein refers to a quality of a non-polar molecule or group that has little affinity to water or other polar solvents. Hydrophobic groups on molecules in a polar solution tend to turn in on them or clump together with other hydrophobic groups.

The term "dispersibility" as used herein refers to the amount of a dispersed or emulsified species that will disperse in a specific carrier under given conditions. The reduction of dispersibility may be effected by a change in another chemical property such as pH, ionic strength, hydrophobicity or otherwise causing collapse of the dispersion or emulsion.

The aforementioned properties may be inter-dependent, namely a change in one property effects a change in another property, thereby constituting inter-dependency therebetween. An example of such inter-dependency is a pH-dependent dispersibility and ionic-strength-dependent dispersibility, wherein the change in pH (the aforementioned acidity or alkalinity property) or the ionic-strength of a solution changes the dispersibility of one or more of its dispersed species.

Similarly, there exist inter-dependency between metal ion complexation combined with pH, and the capacity to stay emulsified (dispersed), and such interdependency is discussed in detailed hereinbelow.

The phrase "property-adjusting agent" as used herein refers to a component in a part of a multi-part ink composition and can effect the level of one or more chemical or physical properties of other parts of the composition when these compatible parts come in contact and combine, such as a pH level, metal-ion-ligand complexation, dispersibility, the ionic strength, the hydrophobicity or the electric charge/valency of the combined composition. By effecting a change in one or more such properties, the property-adjusting agent is causing the property-sensitive proto-elastomeric film-forming agent to undergo a chemical and/or physical change (such as congelation), as discussed herein.

According to some embodiments of the present invention, the first part of the multi-parts ink composition is formulated with a first carrier (solvent) and used to carry and deliver a property-adjusting agent, and does not contain a colorant and is thus substantially transparent and colorless, and intended not to leave a distinguishable mark on the substrate. It is the property-adjusting agent that affects a property-sensitive proto-elastomeric film-forming agent in a second color-bearing part and other optional parts of the ink composition, thereby effecting congelation of the combined parts. Hence, the first part of the ink composition, which includes a property-adjusting agent, is also referred to herein interchangeably as the immobilization part. The second part of the ink composition, comprises a colorant, a second carrier and a property-sensitive proto-elastomeric film-forming agent in the form of, for example, an emulsified resin, which will congeal on the surface of the substrate due to an interaction between the parts (e.g., an interaction induced by the property-adjusting agent). According to some embodiments of the invention, an ingredient of the ink composition which imparts elastic stretchability, is the property-sensitive proto-elastomeric film-forming agent. Optionally or additionally, the elastic stretchability is imparted by an additional binder which is not necessarily property-sensitive. As discussed hereinabove, when these constituents co-polymerize, crosslink and cure and thereby affix to the substrate, a soft, flexible and stretchable elastic film is formed which is characterized by a relatively low Tg.

The present inventors have found that emulsions of some proto-elastomeric film-forming agent will be stable in various conditions, such as low pH, but will break and congeal if a certain metal oxide is present in the emulsion. Hence according to some embodiments of the present invention, the second part of the ink composition further includes a first metal oxide, as this phrase is defined hereinbelow.

According to some embodiments of the present invention, the proto-elastomeric film-forming agent can be a polymerizable agent, which is soluble/dispersible/emulsifiable when present in the ink composition and may also act as a proto-elastomeric film-forming dispersing agent for the various pigment colorants which are included in some parts of the ink composition. This proto-elastomeric film-forming colorant dispersing agent, can be the property-sensitive agent that congeals when, for example, a transition metal oxide is added and/or the pH or the ionic strength of the media it is dissolved in crosses a certain level. Hence, according to some embodiments of the present invention, the proto-elastomeric film-forming attribute, and the property-sensitive attribute are combined in a dispersant of colorants. However, according to other embodiments of the present invention the proto-elastomeric film-forming agent is not required to disperse the colorant(s) or be associated therewith in any form.

The term "colorant" as used herein describes a substance which imparts the desired color to the printed image. The colorant may be a pigment or a dye. Pigments are solid colorants with are typically suspended in the carrier of the ink composition as dispersed particles, whereby dyes are colorants which are dissolved in the carrier of the ink composition. Some dyes may be insoluble liquids which form emulsions with the carrier.

A typical colorant in inkjet ink compositions is a dispersed pigment. As found by the present inventors, the property-sensitive proto-elastomeric film forming agent according to embodiments of the present invention, is not necessarily involved with the colorant, may it be a dispersed pigment, a dissolved dye or combinations thereof. Therefore this property-sensitive proto-elastomeric film forming agent can serve its purpose in the context of embodiments of the present invention without reference to the colorant, as opposed to some ink compositions known in the art, where the colorant in a dispersed pigment and the pigment's dispersant is sensitive to pH or other effectors. For example, according to some embodiments of the present invention, such dispersant are acrylic salts (salts of an acrylic acid monomer), which lose their dispersing attribute and become immiscible or insoluble as a result of a pH-shift.

For example, a property-sensitive proto-elastomeric film-forming agent, such as a pH/metal-ion-sensitive acrylic polymer or copolymer, can lose its ability to stay in an emulsified form, possibly due to formation of metal-complexation species when the pH of the liquid formulation drops below a certain level and/or when a certain metal ion or metal oxide is introduced, thus effecting congelation of the combined ink composition and in practice effects the immobilization of the colorant which is present therein.

Hence, according to some embodiments, the property-sensitive proto-elastomeric film-forming agent does not serve as a dispersant for the pigments, but rather affects the dispersability of the pigments in an indirect fashion by congealing and thus immobilizing the pigments as well.

The basic process colorants in liquid ink compositions are required to be transparent or translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer is printed on the substrate before the translucent colored part (second part) is printed. This opaque underbase layer is afforded by a third part of the ink composition, according to some embodiments of the present invention.

Hence, according to some embodiments of the present invention, the ink composition further includes a third part which comprises an emulsified property-sensitive proto-elastomeric film-forming agent, an opaque colorant in the form of a second metal oxide, as this phrase is defined hereinbelow, and a third carrier. The third part therefore includes an opaque and lightly-colored pigment colorant. According to some embodiments, the opaque and lightly-colored opaque pigment colorant is white, affording an opaque white layer when jetted on a darkly-colored or non-white surface. According to some embodiments, the white opaque pigment is suitable-sized particles of a second metal oxide, such as, for example, titania. In order to serve as an underbase for a stretchable and flexible image, the opaque underbase should also be stretchable, with a high elongation factor that enables the image printed thereon to maintain its background when stretched with the substrate, without having the (colored) substrate to be seen therethrough and without having the image or the underbase crack under physical pull and tug.

The ink composition, according to some embodiments of the present invention, is suitable for inkjet printing of "spot" colorants, which are substantially opaque colored inks. Spot colorant can be jetted like any other transparent "process" colorants, and are typically used to generate special effects in order to afford highlights and emphases over the image usually in pre-defined coloration.

Hence, according to some embodiments of the present invention, the multi-part ink composition further includes a fourth part which comprises an emulsified property-sensitive proto-elastomeric film-forming agent, a second metal oxide which is substantially opaque, a colorant and a fourth carrier. The table below presents the various parts of the ink composition, according to some embodiments of the present invention, and lists their alternative names used herein, their function and some of their principle ingredients. It is noted that the wetting composition, which is discussed in details hereinbelow in the context of a process for printing the image, may be regarded as another part of the composition albeit it is not necessarily applied on the substrate by digital means or an inkjet printhead.

Multi-Part Ink Composition

| Term in claims | Alternative term and characteristics | Function | Principal ingredients |
|---|---|---|---|
| Wetting composition | Typically applied by massive spraying and can further be manipulated mechanically by squeegee or roller | To flatten protruding fibers, smooth and even the surface before fine droplets are printed thereon | Water |
| First part | Immobilization part; Generally transparent/colorless; Typically printed before or concurrently with the other parts and after the wetting composition | Provides the property-adjusting agent, namely the constituent that causes the ink part that contains the property-sensitive agent to congeal on contact Optionally provides some of the proto-elastomeric film forming agent(s) | A property-adjusting agent (e.g. an acid); A carrier (e.g. water); An optional polymerizable resin (e.g. an acrylic mixture) |

-continued

Multi-part ink composition

| Term in claims | Alternative term and characteristics | Function | Principal ingredients |
|---|---|---|---|
| Second part | Colored part; Translucent color part; Generally transparent and colored by CMYK basic colors; Typically printed after and over the first part | Provides the colorants for the design/image which are dispersed in a property-sensitive dispersant that congeals upon contact with the first part; Provides some of the proto-elastomeric film forming agent(s) | A dispersed translucent colorant; A carrier (e.g. water); A property-sensitive polymerizable dispersant (e.g. an acrylate); An optional additional polymerizable resin (e.g. an acrylic mixture); A polymerization catalyst; A crosslinking agent; |
| Third part | Underbase part; Opaque white part; Generally opaque and white; Typically printed after and over the first part and before the second part. | Provides a solid opaque white background to the translucent colors when printed on a non-white substrate; Provides some of the proto-elastomeric film forming agent(s) | A dispersed opaque colorant (e.g. a metal oxide); A carrier (e.g. water); A property-sensitive polymerizable dispersant (e.g. an acrylate); An optional additional polymerizable resin (e.g. an acrylic mixture); A polymerization catalyst; A crosslinking agent; |
| Fourth part | Spot color part; Opaque colored part; Typically printed after and over the second part | Provides a "non-process" solid opaque colored highlights of color over the design/image; Provides some of the proto-elastomeric film forming agent(s) | A dispersed opaque colorant (e.g. a metal oxide); A dispersed translucent colorant; A carrier (e.g. water); A property-sensitive polymerizable dispersant (e.g. an acrylate); An optional additional polymerizable resin (e.g. an acrylic mixture); A polymerization catalyst; A crosslinking agent; |

The action of immobilization by congelation of the ink composition is effected upon the abovementioned chemical or physical property change caused by the property-adjusting agent that is delivered concomitantly with the property-sensitive proto-elastomeric film-forming agent. This instant immobilization by congelation of the jetted droplets subsequently promotes improved color and detail resolution of the image, as well as improved contact between the colorant(s) in the ink composition and the substrate, which is effected by better adhesion of the medium containing the colorant (pigment and/or dye) therein to the substrate. The binding and adhesion of the medium containing the colorant may be effected by, for example, direct heat-activated chemical crosslinking or entanglement of the proto-elastomeric polymerizable components in the ink composition with functional groups in the substrate.

In general, the content of the various parts of the ink composition, according to embodiments of the present invention, may vary according to the type of substrate and the specific requirements of the final printed product, yet each serve the same principles as follows. The carrier is selected to provide a medium for mixing, suspending and/or dissolving the other components of the ink composition, and is required to be volatile and benign. The colorant is selected to achieve the desirable color and other physical and chemical properties, and be suitable for a given printing machine, printheads and printing technology. The various proto-elastomeric film-forming binders and adhesion promoting agents as well as their activating and catalyzing counterparts, when needed, are selected so as to afford the adhesion of the colorants to the surface of the substrate in a substantially irreversible manner, at least in the sense of normal use of the final product as well as capable of forming an elastic film, and therefore should provide sustainability, stretchability and flexibility of the image on the product in wash, dry and reasonable wear and tear.

The inkjet ink composition according to some embodiments of the present invention, are formulated so as to be suitable for use in an inkjet printing process. Hence, the ink compositions presented herein are formulated so as to exhibit general attributes for each of its parts, other than color and chemical composition. Thus, in some embodiments, the ink composition is further characterized by attributes such as dynamic viscosity (standardized 35° C.), surface tension, sonic velocity, pH, maximal dispersed particle size, carrier volatility, chemical stability, bacteriostatic and anti-corrosive attributes, as well as other characteristics which are more particular to certain inkjet techniques such as electric resistance/conductance, polarizability, irradiation sensitivity and electrostatic, piezoelectric and magnetic attributes, as these terms are known to any artisan skilled in the art.

Each of the parts of the ink compositions used in the process presented herein therefore exhibits, among other properties, the following physicochemical properties which render it suitable for inkjet printing, namely:

Dynamic viscosity that ranges from about 1 centipoise (cP) to about 150 cP, or from about 8 cP to about 25 cP, or from about 8 cP to about 20 cP, or from about 8 cP to about 15 cP at typical working (jetting) temperature that ranges from about 30° C. to about 45° C.;

Surface tension that ranges from about 25 N/m to about 41 N/m;

Maximal particle size lower than about 1 micron (μm);

Electrical resistance that ranges from about 50 ohms per centimeter to about 2000 ohms per centimeter; and Sonic velocity that ranges from about 1200 meters per second to about 1800 meters per second.

As a typical printhead is resistant to pH of 4-10, the final pH of any part of the ink composition should be within these limits.

According to some embodiments, each part of the ink composition exhibits a dynamic viscosity at room temperature of about 11 centipoises, a surface tension of about 31 dynes per centimeter and a maximal particle size lower than 1 micron.

The ink compositions, according to some embodiments of the present invention, are formulated so as to polymerize and adhere to the substrate, preferably upon curing by heat.

Following are descriptions and examples of various ingredients of the various part of the ink composition.

Exemplary property-sensitive proto-elastomeric film forming agents include, without limitation, non-ionic water-emulsifiable resins such as acrylic polymers and copolymers, alkyl-acrylic polymers and copolymers, acrylic-styrene copolymers, polyurethanes, polyethers, polyesters, polyacrylates and some combinations thereof.

According to some embodiments of the present invention, the property-sensitive proto-elastomeric film-forming agent is a self-crosslinking alkyl-acrylic copolymer, and according to some embodiments, the self-crosslinking alkyl-acrylic copolymer is an ethyl-acrylic/butyl-acrylic copolymer.

Some acrylic-based polymers and copolymers are emulsifiable self-crosslinking polymers which are used in the garment industry to bestow physical and chemical resistance to the cloth, knitted, woven or non-woven, against physical wear and tear due to frequent use and repeated washing, as well as against alcohol, organic solvents and water.

When selected to have a low Tg, according to embodiments of the present invention, suitable property-sensitive proto-elastomeric film forming agents which are commercially available, include without limitation, TEXICRYL™ 13-216 (Tg −14° C.), TEXICRYL™ 13-290 (Tg −30° C.), TEXICRYL™ 13-297 (Tg −9° C.) and TEXICRYL™ 13-326 (Tg −25° C.) which are commercially available from Scott Bader Ltd., and APPRETAN™ E 2100 (Tg −30° C.), APPRETAN™ E 6200 (Tg −20° C. and APPRETAN™ E 4250 (Tg −15° C.) which are commercially available from Clariant.

Other non-limiting examples of commercially available property-sensitive proto-elastomeric film-forming agent which do not serve as pigment dispersants include ACRYSOL™ series, commercially available from Rhome and Hass Ltd., and ACRONAL™ series, commercially available from BASF Inc.

Other binders, dispersants and adhesion promoters which are useful in the context of a proto-elastomeric film-forming agent according to embodiments of the present invention include, without limitation, commercially available and widely used families of products, known under names such as Alkydal™, Desmodur™ and Desmophen™ (from Bayer); Beckopox™, Macrynal™, Maprenal™, Viacryl™ and Vialkyd™ (from Vianova Resins); Cythane™ (from Cytec); Dynapol™ and Vestanat™ (from Hiils); Johncryl™ (from Johnson); K-Flex™ (from King Industries); Synocure™ and Synolac™ (from Cray Valley); Synthalat™ (from Synthopol); Tolonate™ (from Rhone Poulenc); Uracron™ and Uralac™ (from DSM); Worleecryl™ and Worleekyd™ (from Worlee) and the likes.

It is noted that any exemplary ingredient disclosed herein is given for exemplifying purposes only, and should not be regarded as limiting to that particular ingredient or commercially available product, but rather regarded as a representative member of a wider group of alternatives, all of which are meant to be encompassed in the context of other embodiments of the present invention.

Another purpose of using film-forming agents is overcoming loose and protruding fibers during the printing process on knitted, woven and non-woven fabrics. Flattening these fibers, even only for the duration of the printing process, ultimately affords a sharper image altogether. This additional effect is readily afforded since most of the suitable proto-elastomeric film-forming agents according to some embodiments of the present invention, are sticky binders.

Typically, the concentration of the property-sensitive proto-elastomeric film-forming agent can range from about 10 weight percentage to about 50 weight percentages of the total weight of the relevant part of the multi-part ink composition.

The abovementioned property-sensitive agents can be readily affected by adding a chemical substance (the property-adjusting agent) which lowers or elevates the level of the properties listed under the term "property" hereinabove. For example, adding an acid (H+ ions) will elevate the acidity while adding a base will lower the acidity level, and thus affect a pH-sensitive agent such as acrylic resin thickeners (e.g., carbomers and other rheology modifiers such as members of the CARBOPOL series, or PEG-based thickeners (e.g., members of the ACRYSOL RM™ series) and the likes.

Similarly adding a salt (ions of a particular valency) will elevate the ionic strength, adding a precipitating agent will lower the solubility, adding a hydrophilic agent will lower the hydrophobicity, adding a charged species will elevate the electric charge, and so on, each property can be lowered or elevated by use of a suitable adjusting agent.

Exemplary property-adjusting agents which may be use in context of embodiments of the present invention, include acids and/or bases that adjust the pH property; metal oxides, salts that adjust the ionic strength and electrical charge; or oxidizing agents, reducing agents, radical-producing agents and crosslinking agents which change the chemical reactivity of certain chemical groups present in one or more components of the other part of the ink composition and thereby effect the solubility thereof by promoting crosslinking and/or polymerization of these components. The crosslinking agent may also promote the adhesion of the colorant to the substrate by chemically interacting with functional groups on the surface, as these terms are defined hereinbelow.

The following describes a few representative and non-limiting examples, which present how the objective of using the property-sensitive proto-elastomeric film-forming agent and property-adjusting agent is met:

An acid-base interaction can cause a dispersing agent or a proto-elastomeric film-forming agent that is soluble in a basic or neutral composition to precipitate once it comes in contact with an acid. Similarly, an emulsified film-forming agent may no longer hold an emulsion as a result of a decrease in pH. In any such occurrence, the composition experiences a sharp increase in the viscosity, or congelation.

The presence of a metal oxide, such as titanium dioxide or silicon dioxide, affects a family of non-ionic acrylic polymers so as to become sensitive to a drop in the pH of the medium they are emulsified in. Hence, according to some embodiments of the present invention, such class of metal oxides is referred to herein as a first and a second metal oxide. Such metal oxides do not cause the breakage of the emulsion by themselves, but rather bestow pH-sensitivity to the emulsified species. It is a matter of mechanistic theory to regard such metal oxides as direct property-adjusting agents, however in the context of embodiments of the present invention this assignment can be made or avoided without being bound to any particular theory.

Thus, the phrase "first metal oxide" and/or "second metal oxide", as used herein, refer to metal oxides that is capable of affecting a proto-elastomeric film forming agent so as to become property-sensitive. Such metal oxides include titanium dioxide (also referred to herein as titania, $TiO_2$) and silicon dioxide (also referred to herein as silica, fumed silica, $SiO_2$).

Metal oxides are solids that can be grinded into particular particle size. In the case of titania, the particle size will determine its ability to reflect light, where larger particles will reflect light and thus appear as opaque white, and very small particles thereof, namely in the order of magnitude of nanometer scale, will be substantially transparent to light. Other metal oxide particles can be made positively charged, and in the case of fumed silica, positively charged silica particles also appear substantially transparent to light. These light reflecting qualities differentiate the first and second metal oxide classes into substantially transparent for the first metal oxide class, and substantially opaque white for the second metal oxide class.

A third metal oxide class is regarded as a direct and independent property-adjusting agent, since it effects the chemical/physical change in the property-sensitive agent without the presence of another effector, such as an acid. Thus, the phrase "third metal oxide" refers herein to a class of metal oxides that can directly effect congelation of the ink composition.

Addition of a small amount of an amphiphilic solvent, such as acetone or water miscible ketone, may cause emulsion collapse and/or congelation and/or otherwise taking the colorant out of the dispersed state.

A property-sensitive agent being soluble in an aqueous solution will precipitate once it comes in contact with calcium and/or aluminum ions and other di- and tri-valent cations, whereupon it will precipitate and will effect a sharp increase in the viscosity of the combined parts of the composition.

A salt (ionic) interaction between anions and cations can cause a suspension or an emulsion to break, namely effect precipitate of its particulate components. Preferred salts for effecting an increase on the ionic strength include calcium salts such as calcium chloride and calcium acetate, and aluminum salts such as aluminum chloride and aluminum sulfate, and any combination thereof.

Quaternary cationic surfactants are suitable candidates for effecting congelation of the emulsified or dispersed polymers and pigments. Non-limiting examples for quaternary cationic surfactants include flocking products such as PAM (polyacrylamine), SUPERTFLOC™ C440 series (by Cytec), and benzalkonium salts such as benzalkonium chloride.

A hydrophilic-hydrophobic interaction between various solvents such as acetone alcohol, acetone, isopropyl alcohol, ethyl alcohol, and polymeric latex resin that causes the resin to swell and precipitate and effect an overall rise in the viscosity of the combined composition.

For example, adding polyvinyl alcohol with a low molecular weight to one part of the ink composition and adding borax (sodium tetra borate) to the other part of the composition will cause the formation of a gel upon contacting these two parts. A similar effect will be achieved when using calcium acetate and isopropanol or ethanol, however higher alcohols do not afford the same result.

According to some embodiments of the present invention, the chemical property is pH, and the corresponding property-adjusting agent is a base. An exemplary basic property-adjusting agent is an amine, such as, without limitation, DEA, ammonia, TEA and alike, that may react with a corresponding property-sensitive proto-elastomeric film-forming agent, such as a thickener or a dispersing agent.

According to other embodiments of the present invention, the chemical property is pH, and the corresponding property-adjusting agent is an acid. Although most acids will cause a pH-sensitive proto-elastomeric film-forming agent to congeal, only some acids will be suitable for the ink composition presented herein, which is formulated for inkjet printing, particularly on textile application.

One exemplary acidic property-adjusting agent is an organic acid. According to some embodiments, the organic acid is a carboxylic acid. Suitable organic acids include, but are not limited to a carbonic acid, a formic acid, an acetic acid, a propionic acid, a butanoic acid, an α-hydroxy acid such as glycolic acid and lactic acid, a halogenated derivative thereof and any combination thereof.

The selection of a suitable property-adjusting agent in the form of an acid should take into account several factors, namely the corrosive nature of acids on the fabric as well as on the delicate parts of the printing apparatus and particularly the printheads and other metallic and otherwise delicate parts of the printing machine which corrode easily, as well as the tendency of acids to scorch and degrade certain substrate materials over time. Hence, the acid should be effective enough to cause the desired property-adjusting effect, mild enough so as not to generate damage to the machinery and/or garment, and transitory so as not to degrade the finished product. According to some embodiments of the present invention, acids which may be neutralized by heat are jointly referred to herein as transitory acids. Hence, the phrase "transitory acid", as used herein, refers to an acid which can be rid of by the virtue of being volatile or intra/cross-reactive to form essentially neutral species.

While evaporation is one mechanism by which heat can reduce the presence of a volatile acid, heat can also reduce acidity in other ways. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

It is noted herein that in general alpha-hydroxy acids are suitable as a transitory acid according to some embodiments of the present invention.

For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie know as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione.

Transitoriness is required when it is desirable to have little or no traces of an acid in the final product. Therefore acid traces should be reduced before or during the curing step of the process (effected typically at 140-160° C.), and can no longer damage the substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the workers health which may be adversely effected by highly volatile acid such as formic acid. In addition, some volatile acids cause noxious or unpleasant odor even if minute reminiscence thereof is left in the finished product. Some volatile acids leave a distinct and mostly unpleasant odor, and therefore should be disfavored as noxious odor may affect the work place as well as cause malodor of the product at the end-user side. Hence, an odorless volatile or otherwise transitory organic acid should be selected when possible.

Exemplary transitory organic acids which can provide all the above advantages with minimal disadvantages include, but are not limited to, lactic acid and glycolic acid.

Hence according to some embodiments, the acid is glycolic acid or lactic acid. The acid may be buffered by a weak amine such as tris(hydroxymethyl aminomethane), also referred to as Tris or THAM.

According to some embodiments, an acidic immobilization part may be buffered by a suitable salt or weak base, such as ammonia/ammonium base or another volatile amine, to ensure full extraction of any traces of acid or base in the printed image.

According to some embodiments of the present invention, the chemical property is metal-ion complexation, and an exemplary corresponding chemical property-adjusting proto-elastomeric film-forming agent is an emulsified nonionic polymer. An exemplary metal-atom complexation property-adjusting agent is nano-sized particles of titania (nano-titania), fumed silica or alumina, as discussed hereinabove in context of the third metal oxide.

Other property-adjusting agents suitable for this application are water immiscible solvents such as alcohols. While using these inflammable liquids great care must be taken to avoid fire hazards, especially during the initial drying period when high concentration of alcohol fumes are present in the vicinity of a heat source. Hence, low alcohols, such as ethanol and isopropyl alcohol, react fast enough in the ink (so as to affect the emulsion and/or dispersion) to obtain acceptable immobilization. These reagents affect the emulsion stability, thus causing the above-described opaque and colored parts to congeal on the substrate's surface.

The concentration of the property-adjusting agent should correspond adequately to the type and amount of the property-sensitive proto-elastomeric film-forming agent, and can range from about 0.5% to about 20% of the total weight of the composition.

According to some embodiments of the present invention, the colorant can be a liquid dye dissolved or otherwise mixed in the carrier of the ink composition, or solid pigment particles dispersed in the ink composition. According to some embodiments, the colorant content in the ink composition used in the process present herein ranges from about 0.2 weight percentage to about 40 weight percentage of the total weight of the ink composition. According to other embodiments, the colorant content ranges from 1 to 10 weight percentages of the total weight of the ink composition. One of the main components of the ink composition is the carrier.

According to some embodiments, the carrier in each of the parts of the ink composition, namely the first carrier, the second carried, the third carrier and the fourth, is an aqueous carrier (e.g., water). However, non-aqueous carriers are also contemplated. The carriers of the various parts of the ink composition may be identical or different, depending on their function and solutes used in each formulation. According to some embodiments of the present invention, the carrier of all the parts of the ink composition is an aqueous carrier, namely consisting essentially of water, tap water or deionized water. According to some embodiments the aqueous carrier may further include one or more organic, including solvents acting as humectants, such as propylene glycol, diethylene glycol and such glycols and/or glycerin.

The ink compositions can be designed such that the polymerization reaction between the film-forming agents and the substrate would be effected in the presence of a catalyst, also referred to as a polymerization initiator.

The term "catalyst" as used herein describes a chemical substance which is capable of promoting, initiating and/or catalyzing the chemical polymerization reaction between polimerizable ingredients of the ink composition, and to some extent also with the functional groups in the substrate directly or via a crosslinking agent. The catalyst, or polymerization catalyst/initiator, is selected so as to promote, initiate and/or catalyze the reaction upon contact of the ink composition with the substrate, optionally in combination with an external heat or other forms of radiation that is applied during the curing of the image.

Hence, according to some embodiments of the present invention the catalyst is a blocked (salt) acid catalyst or an unblocked (free) acid catalyst. Exemplary blocked acid catalyst include, without limitation, blocked dinonylnaphthalene sulfonic acid, blocked dinonylnaphthalene disulfonic acid, blocked dodecylbenzene sulfonic acid, blocked toluene sulfonic acid, a blocked alkyl phosphate acid and a blocked aryl phosphate acid.

Exemplary commercially available catalysts include without limitations blocked acids such as, for example, members of the NACURE™ series, commercially available from King Industries, Inc, Norwalk, Conn., USA, or CYCAT™ series available from Cytec Industries Inc.

An ingredient which can promote the formation of a continuous and stretchable polymeric/co-polymeric film, as well as promote binding and affixation of the film to the substrate, is a crosslinking agent.

As used herein, the phrase "crosslinking agent" refers to a substance that promotes or regulates intermolecular covalent, ionic, hydrophobic or other form of bonding between polymer chains, linking them together to create a network of chains which result in a more elastic and/or rigid structure. Crosslinking agents, according to some embodiments of the present invention, contain at least two reactive groups that can interact with respective groups present in the polymerizable constituents of the ink composition and/or the substrate. Exemplary such reactive groups include, but are not limited to, amine groups, carboxyl groups, hydroxyl groups, double bonds, and sulfhydryl groups. Crosslinking agents include homo-bifunctional crosslinking agents that have two identical reactive end groups, and hetero-bifunctional crosslinking agents which have two different reactive end groups.

These two classes of crosslinking agents differ primarily in the chemical reaction which is used to effect the crosslinking step, wherein homo-bifunctional crosslinking agents will require a one step reaction, and hetero-bifunctional crosslinking agents may require two steps to effect the same. While homo-bifunctional crosslinking agents have the tendency to result in self-conjugation, polymerization, and intracellular crosslinking, hetero-bifunctional agents allow more controlled two step reactions, which minimizes undesirable intramolecular cross reaction and polymerization. Crosslinking agents are further characterized by different spacer arm lengths. A crosslinking agent with a longer spacer arm may be used where two target groups are further apart and when more flexibility is desired.

The type of bonding between the film and the substrate depends substantially on the type of substrate, or more specifically, on the physical micro-structure of the surface, and the availability of reactive functional groups on the surface of the substrate, namely its chemical composition. Cellulosic materials, such as many fabrics made at least a partially from natural fibers (cotton, hemp), wool, silk and even skin and leather, offer a variety of available and reactive functional groups such as hydroxyl, carboxyl, thiol and amine groups, which can be tethered to the film via the crosslinking agent. Alternatively, in cases on some substrates such as synthetic polymeric substrates, the scarcity of reactive functional groups means that the bonding of the film to the substrate is afforded by mechanical properties and micro-structure of the surface, namely affixation by polymeric adhesion and physical interweaving and entanglement.

The crosslinking agent also has an effect on the elasticity of the resulting film. The resulting modification of mechanical properties of the polymeric film formed on the substrate depends on the crosslink density, i.e., low crosslink densities raise the viscosities of semi-fluid polymers, intermediate crosslink densities transform gummy polymers into materials that have elastomeric properties and potentially high strengths, and highly crosslink densities can cause materials to become rigid, glassy and even brittle. The crosslink density of the cured polymer, which in the case of the present invention constitutes the colorants-containing elastic film, stems primarily from the concentration of the crosslinking agent in the pre-polymerization mixture, which in the case of the present invention constitute the ink composition once all its parts are adjoined on the substrate.

Hence, according to some embodiments of the present invention, the level of crosslink density of the cured ink composition is an intermediate level which affords a highly pliable, stretchable and elastic film.

The type of crosslinking agent also influences the level of crosslink density, whereas the chemistry of the crosslinking reactions determines the strength and frequency (density) thereof. However, a substantial factor that affects the choice of a crosslinking agent is its chemical mechanism of action and the type of by-products which are emitted during the polymerization, crosslinking and/or curing reactions.

For example, some of the most prevalent and industrially used crosslinking agents in the general polymer and inkjet specific industries are amino resins, or polyamines, such as melamine-formaldehyde resins. Other families of widely used crosslinking agents include the methylated melamine family, the methylated high imino melamine family, the highly alkylated mixed ether melamine family, the highly n-butylated melamine family, the highly alkylated urea family, the partially iso-butylated urea family, the benzoguanamine family and the glycoluril family.

Amino resins are thermosetting plastics formed from the reaction of formaldehyde and an amino group on a polyamine compound such as urea or melamine. They are used per-se as bonding agents in plywood and particle board and wrinkle-resistance agents in textiles. They are also molded for electrical devices and various commercial and home applications, and used in paper towels and textile finishing to increase water resistance. In the context of embodiments of the present invention, amino resins are used primarily as crosslinking agents, with melamine-formaldehyde resin (MFR) as an exemplary representative of this group.

Listed below are some additional exemplary crosslinking agents from the amino/formaldehyde resin family.

Methylated melamine crosslinking agents react by general acid catalysis with a high tendency for self-condensation reactions that improve the reaction speed but limit the flexibility of the cured films. Exemplary commercially available members of this group include CYMEL® 301, CYMEL 303 ULF, CYMEL 350 and CYMEL 3745.

Methylated high imino melamine crosslinking agents exhibit low methylol and a high imino content and can be described as oligomeric in nature with methoxymethyl and imino as main reactive functionalities. These reagents react according to general acid catalysis with a high tendency towards self-condensation reactions that improve the polymerization reaction speed but limit the flexibility of the cured films. Exemplary commercially available members of this group include CYMEL® 323, CYMEL 325, CYMEL 327 and CYMEL 328.

Highly alkylated mixed ether melamine crosslinking agents are monomeric in nature with alkoxymethyl as the main functionality. These agents react according to specific acid catalysis with a low tendency for self-condensation that enhances the flexibility of the cured film. Exemplary commercially available members of this group include CYMEL® 1116, CYMEL 1130 and CYMEL 1133.

Highly n-butylated melamine crosslinking agents exhibit improved adhesion to relatively unclean substrates than methylated melamine resins, and provide better intercoat adhesion and adhesion to metal substrates. Exemplary commercially available members of this group include CYMEL® 1156 and CYMEL MB-98.

Highly alkylated urea crosslinking agents exhibit high solubility in polar solvents and limited solubility in hydrocarbon solvents. Exemplary commercially available members of this group include CYMEL®UM-15 and CYMEL-U-80.

Partially iso-butylated urea crosslinking agents exhibit high compatibility with organic solvents and many polymer backbone resins, including epoxy resins. Exemplary commercially available members of this group include CYMEL® U-646, CYMEL U-662, CYMEL UI-19-I and CYMEL UI-19-IE.

Benzoguanamine crosslinking agents provides improved adhesion to metal substrates, with good chemical and detergent resistance properties, compared with melamine and urea crosslinking agents. Exemplary commercially available members of this group include CYMEL®1123 and CYMEL 659.

Glycoluril crosslinking agents are used as high performance crosslinking agents with improved properties over existing melamine and benzoguanamine resins. These crosslinking agents differ primarily in the nature of their alkylation alcohols and consequently in their hydrophobicity. Exemplary commercially available members of this group include CYMEL 1170 and CYMEL 1172.

While the aforementioned amino resin crosslinking agents are effective, they contain between 1000 ppm up to 2.5% formaldehyde, and further emit more formaldehyde during the crosslinking reaction.

The growing awareness among consumers, workers and manufacturers, has pushed the consumer-products market in general and the polymer industries in particular to search for compositions and processes which minimize of altogether nullify the use of harmful ingredients and the production of harmful by-products. One such by product is formaldehyde, which is a bi-product emitted during the polymerization and curing process of polymers using crosslinking agents belonging to the aforementioned families.

These days, any textile ink containing formaldehyde is restricted for use in certain applications, based on formaldehyde content of the garment according to Öko-Tex Standard 100 (Oeko-Tex). Although formaldehyde, which forms upon use of amino resin crosslinking agents, may evaporate from the garment at high temperatures, the levels of formaldehyde can never reach the allowed values according to the widely accepted Oko-Tex Standard 1000.

Presently many manufacturers in the garment and consumer product industries prefer to refrain from using ink compositions containing or emitting formaldehyde to protect their employees and customers from exposure to formaldehyde.

To cater to this emerging need, the present inventors have studied alternatives to the aforementioned crosslinking agents with the objective of providing a water-based formaldehyde-free, pigmented ink for direct print on garments. While reducing the present invention to practice, the inventors have successfully used different classes of crosslinking agents in the context of embodiments of the present invention, which do not use or emit formaldehyde, and can therefore be used as ink compositions in inkjet printing processes that comply with the strictest standards of the industry. Hence, according to some embodiments of the present invention, a crosslinking agent which does not comprise or emit formaldehyde, is referred to herein as "formaldehyde-free crosslinking agent".

One alternative family of formaldehyde-free crosslinking agents includes dialdehydes, other polyaldehydes or dialdehyde acid analogues having at least one aldehyde group, such as, for example, $C_2$-$C_8$ dialdehydes. A widely used dialdehyde, which is used in diapers, is the shortest dialdehyde glyoxal. U.S. Pat. Nos. 4,285,690, 4,345,063 and 4,888,093 describe alkylated glyoxal/cyclic urea condensates that serve as crosslinkers for cellulosic fibers for high water retention pads. A non-limiting example of such crosslinking agents includes glyoxal.

Another alternative family of formaldehyde-free crosslinking agents includes heteroaryl polycarbamate crosslinking agents which are based on a moiety derived from the group consisting of linear or cyclic ureas, cyanuric acid, substituted cyanuric acids, linear or cyclic amides, glycolurils, hydantoins, linear or cyclic carbamates and mixtures thereof. Exemplary crosslinking agents that belong to this family and are suitable in the context of crosslinker agents suitable for crosslinking the ink composition to cellulosic fabrics according to some embodiments of the present invention, are disclosed, for example, in U.S. Pat. Nos. 6,063,922, 5,596,047 and 7,381,347 and U.S. Patent Application No. 20040116558. A non-limiting example of such crosslinking agents includes CYLINK®2000 by Cytec Technology Corp.

Another alternative family of formaldehyde-free crosslinking agents is based on diacetone acrylamide/hydrazine (polyalkenyl ether resins). These crosslinking agents, some of which are commercially available, are disclosed in, for example, in U.S. Pat. Nos. 5,348,997, 5,432,229 and 7,119, 160. A non-limiting example of such crosslinking agents includes N-(1,1-dimethyl-3-oxobutyl)-acrylamide (DAAM)/hydrazine by Kyowa Hakko Chemical Co., Ltd., Japan.

Another alternative family of formaldehyde-free crosslinking agents is based on carbodiimides. The term "carbodiimide" refers to the functional group having of the formula —[N═C═N]$_n$— which can react readily with amine and carboxyl groups. Carbodiimide crosslinking agents are disclosed in, for example, in Japanese Patent Application Kokai (Laid-Open) No. 187029/1984, U.S. Patent Application No. 20070148128, U.S. Pat. Nos. 5,360,933, 6,124,398 and 7,425,062 and EP0277361. A non-limiting example of such crosslinking agents includes CARBODILITE® by Nashinbo, Japan.

Exemplary ink compositions comprising formaldehyde-free crosslinking agents, according to some embodiments of the present, have been prepared and successfully used, as demonstrated in the Examples section that follows hereinbelow.

The ink composition optionally contain one or more other ingredients according to some embodiments of the present invention, such as, for example, surfactants, humectants, wetting agents, binders, buffering/neutralizing agents, adhesion promoters, bactericides, fungicides, algicides, sequestering agents, softeners, thickeners, anti-foaming agents, corrosion inhibitors, light stabilizers, anti-curl agents, thickeners, non-reactive agents, softeners/plasticizers, specialized dispersing agents, specialized surface active agents, irradiation sensitive agents, conductivity agents (ionizable materials) and/or other additives and adjuvants well-known in the relevant art.

Humectants are typically used for adjusting surface tension and viscosity as well as for avoiding nozzle blockage due to formation of a dried film. These include, without limitation, polyethylene glycol and other polyalcohol mixtures.

Non-limiting examples of anti-foaming agents (defoamer) include BYK 024, BYK 012; BYK 31 (commercially available from Byk-Chemie), FOAMEX 810, AIREX 901, AIREX 902 (commercially available from Evonik Tego Chemie GmbH, Essen, Germany), SURFYNOL DF 37, SURFYNOL DF 210, SURFYNOL DF 75 (commercially available from Air Products Ltd.), and more.

Non-limiting examples wetting agents include BYK 307, BYK 348 and BYK 3410 (commercially available from Byk-Chemie), TWIN 4000, WET 260 and WET 510 (commercially available from Evonik Tego Chemie GmbH, Essen, Germany), and more.

Exemplary softeners/plasticizers include, without limitation, an adipate ester, a phthalate ester, an aryl phosphate, a trimellitate ester and a plastisol, and many other commercially available softeners/plasticizers which are offered by such companies as ExxonMobil, Morflex and Byk-Chemie. The content of the softener/plasticizer ranges from about 0.01 weight percentage to 2.5 weight percentages of the total weight of the ink composition.

Exemplary surface active agents include, without limitation, soap, a detergent, a syndet, an emulsifier, an anti-foaming agent, a polyalkylsiloxane, an anionic surface active agent, a cationic surface active agent and a non-ionic surface active agent. The content of the surface active agent ranges from about 0.01 weight percentage to about 5 weight percentages of the total weight of the ink composition.

An exemplary buffering agent is tris(hydroxymethyl aminomethan).

Following are exemplary general formulation for each of the parts of the ink composition according to some embodiments of the present invention.

Exemplary formulations of the first part (the immobilization part), according to some embodiments are based on the following percentage of content and attribute ranges:

| | |
|---|---|
| A property-adjusting agent | 4-20%; |
| A proto-elastomeric binder (optional) | 0-40%; |
| Humectants | 45-55%; |
| Neutralizing/buffering agent | 1-4%; |
| Anti-corrosion agent for iron | 0.1-2%; |
| Copper/Aluminum anti corrosive agent | 0.1-2% |
| Other additives | 0-5%; |
| Deionized water | to 100%; |
| Viscosity at 34° C. | 9-12 cp; |
| pH | 4.2-5.0; and |
| Surface tension | 25-40 N/m. |

The property-adjusting agent can be, for example, a transitory organic acid acting as a pH-adjusting agent. In such cases, the organic acid content in the immobilization part ranges from 4% to 20%, and the water content of the immobilization part ranges respectively to the content of the acid.

For another example, since it was found that some proto-elastomeric film-forming agents are stable in the presence of an acid but congeal upon the addition of a metal oxide, the acid will be added to the formulation containing the colorant, and the property-adjusting agent can be transparent nano-titania, acting as a first metal oxide, or a metal ion complexing agent. In these cases, the nano-titania content in the immobilization part ranges from 10% to 15%, and the water content of the immobilization part ranges respectively to the content of the metal oxide.

Other examples of property-adjusting agents and volatile agents include isopropanol (20-40%), acetone and/or hydroxyl acetone (20-40%).

The optional proto-elastomeric binder (which is not property-sensitive) may be an acrylic emulsion, styrene acrylic emulsion, urethane emulsion, PVP or PVA included in the formulation in an amount of 4-40% to achieve better adherence of the pigments and also to assist in flattening the loose fibers of a textile substrate.

According to some embodiments, in cases where the property-adjusting agent is a transitory organic acid it is present in the formulation of the first part in 6-12%, a proto-elastomeric acrylic binder is present in about 5-15% humectants 10-30% and deionized water make up to 100%. The organic acid is a volatile organic (formic acid or acetic acid) acid such as lactic, glycolic or propionic acid (otherwise transitory), with the latter used in the Examples section below as a suitable odorless and transitory organic acid.

Following the exemplary first part, an exemplary and corresponding formulation of the second part of the ink composition (the colored part) is based on the following percentage of content ranges:

| | |
|---|---|
| A colorant mixture | 10-20% |
| Property-sensitive proto-elastomeric film forming agent | 25-30%; |
| Tg of the film-forming agent | −35 to 0° C. |
| A first metal oxide (optional if using a third metal oxide) | 10-20% |
| Humectants (glycol mixture) | 20-40%; |
| Amino resin crosslinking agent | 2-4%; |
| B actericide/Fungicide | 0.1-1%; |

-continued

| | |
|---|---|
| Blocked acid catalyst | 1-1.5%; |
| Neutralizing/buffering agent | 0.2-0.6%; |
| Defoamer | 0.1-0.6%; |
| Wetting agent/surfactant | 0.1-2%; |
| Organic solvent | 0-5%; |
| Other additives | 0-2%; |
| Deionized water | to 100%; |
| Viscosity at 34° C. | 10-13 cp; |
| pH | 8-8.5; and |
| Surface tension | 25-36 N/m. |

An amino resin crosslinking agent, such as melamine or urea resin, or a formaldehyde-free crosslinking agent, according to some embodiments of the present invention, can be used as a crosslinking agent.

The colorant is typically a dispersion of 20% pigment in water and a suitable dispersant. The viscosity is measured for shear force range at 1-4000 $sec^{-1}$.

The second part of the ink composition may be buffered to be alkaline (basic) or neutral, so as to maintain the property-sensitive agent in its emulsified form.

The third part of the ink composition (the underbase part) is similar to the formulation of the second part with some variations with respect to the dispersant, the pigment and the proto-elastomeric binder which together can be regarded as a property-sensitive proto-elastomeric film-forming system, and is therefore based on the following percentage of content ranges:

| | |
|---|---|
| Second metal oxide (acting also as colorant) | 15-20% |
| Property-sensitive proto-elastomeric film-forming agent | 25-45% |
| Proto-elastomeric film-forming agent (optional) | 15-25% |
| Tg of the film-forming agent(s) | −35 to −0° C. |
| Dispersant | 1-6% |
| Bacteriocide/Fungicide | 0.1-0.5%; |
| Humectants | 30-45%; |
| Defoamer | 0.2-0.4%; |
| Neutralizing agent | 0.1-0.2%; |
| Wetting agent/surfactant | 0.1-0.5%; |
| Organic solvent | 0-5%; |
| Other additives | 0-10%; |
| Deionized water | to 100%; |
| Viscosity at 34° C. | 12-14 cp; |
| pH | 8-8.5; and |
| Surface tension | 25-36 N/m. |

The ink compositions, according to embodiments of the present invention, are utilized most effectively by a unique process as presented in details hereinbelow. The process presented herein was practiced successfully with outstanding results, as demonstrated in the Examples section that follows.

Since the immobilization effect occurs instantaneously upon contact between the first and the second or third parts, each of the parts of the multi-parts ink composition should be dispensed and jetted from completely separated and designated printhead systems, so as to prevent premature immobilization of the ink composition and keep it substantially liquid at all steps of the process before curing, at least up to the point where the composition is positioned desirably on the surface of the substrate.

Hence, according to one aspect of embodiments of the present invention, there is provided a process of printing an image on a stretchable and/or flexible substrate. The process, according to some embodiments of the present invention, is effected by digitally applying, by means of a plurality of inkjet printheads, onto at least a portion of a surface of the substrate, the multi-part ink composition presented herein, which is formulated to be suitable for use in inkjet printheads.

As presented hereinabove the ink composition includes a first part, applied by at least one first printhead, and a second part applied by at least one second printhead, namely each part is jetted from one or more different designated printheads, wherein the first part includes a property-adjusting agent, and the second part includes a property-sensitive proto-elastomeric film-forming agent and a colorant, whereas a time interval between the application of the first part and the application of the second part is less than 1 second, thereby forming the image in a form of an elastic film attached to a surface of the substrate on the substrate.

The printing process is designed and programmed such that the various parts of the ink composition will be applied concomitantly (or essentially simultaneously) on the surface of the substrate by a digitally controlled precise mechanism, and that every drop in the color/pigment-containing parts of the ink composition (second, third and fourth) will come in contact with at least a drop of the immobilization (first) part.

The term "concomitantly", as used herein, refers to the timing of one or more occurrences which take place concurrently, or almost concurrently, namely within a short time interval. According to embodiments of the present invention, this short time interval is less than one second, less than 3 seconds, less than 5 seconds or less than 10 seconds.

The process, according to embodiments of the present invention, is based on the use of multi-components (parts) ink compositions, wherein all of the components (parts) are formulated and selected to be suitable also for the main inkjet printing techniques, such as the "drop-on-demand" technique and the likes, as these techniques are familiar to any artisan skilled in the art. Therefore, according to embodiments of the present invention, the ink composition used in the processes presented herein is for use in an inkjet printing machine, wherein each part of a multi-parts ink composition is applied (jetted, printed) from at least one different designated printhead.

The process presented herein is directed at a typical inkjet technique, as known in the art, which is performed using standard or proprietary printheads and other printing machinery.

Since each of the various parts of the ink composition used in the process presented herein is jetted by a digitally-control manner, the areas onto which each part is applied can essentially overlap, covering substantially the same area of the image (coextensive areas). In particular, the first part of the ink composition, which is essentially colorless and transparent in some embodiments, is applied onto the surface as a silhouette of the image, namely as a solid outline and featureless interior of the image. This effect further contributes to the reduction in the amount needed to effect immobilization of the ink composition, as the first part does not form extending margins peripheral to the image. This effect also widens the scope of suitable substances which can be used to formulate the immobilization part, as staining of unprinted areas of the substrate which are not covered by colorants, is no longer a problem.

While reducing the present invention to practice, it was observed that a droplet of any part of the multi-part liquid ink composition, according to some embodiments, is absorbed by a 100% cotton fabric over a time period that ranges from about 20 seconds to 5 minutes, depending on wetting properties of the various parts. This time rage for soaking in 100% cotton fabric was observed also for tap water. When synthetic components are blended into the fabric, the fabric becomes less wettable and the absorption (soaking) time increases. The process settings and results also depend on the finish of the fabric.

One factor that accomplishes satisfactory immobilization is the speed at which the congelation is accomplish. It is accomplish best when a single droplet of any of the pigment-containing parts of the multi-parts ink composition (opaque or colored parts) comes in contact with a droplet (one droplet of the immobilization part can affect more the one colored droplets) of the immobilization part prior to accumulation of many additional droplets of any part. The time (speed) factor may determine if a large drop is formed or not, taking into account that larger drops may soak faster into the substrate in cases of absorptive substrates, or coalesce (joining with other droplets) as a result of partial dewetting, leading to the formation of non-uniform and poor coverage of a non-absorptive substrate.

The process presented herein, according to some embodiments thereof, is effected by applying all the various parts of the multi-parts ink composition by means of separate inkjet printheads concurrently, substantially concomitantly, or very near concomitant application thereof, namely at a time gap or interval that is shorter than about 1-10 seconds between the time a droplet of a part containing a property-adjusting agent or property-sensitive proto-elastomeric film-forming agent contacts the substrate, and the time a droplet of the counterpart component contacts the same region of the substrate. According to some embodiments of the present invention, this time interval can be shorter than 0.75 second, shorter than 0.50 seconds and even shorter than 0.25 seconds.

Another factor which governs the wicking of a liquid droplet into an absorptive substrate is the size of the droplet. A small and light-weight droplet will tend to stay atop the surface rather than be smear and soaked into it. Small drop-size is also advantageous in case of an impervious/impregnable substrate, as small drops are less prone to spreading and smearing. Hence, according to some embodiments of the present invention, the average jetted drop volume of each of the parts of the ink composition ranges independently from 50 pico liter to 100 pico liter (pL). At this size, the plurality of jetted droplets, stipulating they are discreet, are small enough to stay atop the surface but large enough to flatten loose and protruding fibers of textile substrates. Being substantially small and spaced not too densely prior to the congelation reaction between the droplets of the pigment-containing parts and the droplets of the immobilization part, a plurality of such droplets can cover an area without compromising on its coverage and its newly-applied color perception.

Exemplary substrates of flexible absorptive materials include, without limitation, paper, cardboard, textile fabrics, cloths and garments of all sorts and types including woven and non-woven materials and fabrics.

Exemplary substrates of stretchable and flexible absorptive materials include, without limitation, cellulosic or synthetic textile fabrics, cloths and garments of all sorts and types including knitted, woven and non-woven materials and fabrics.

Exemplary substrates of flexible non-absorptive materials include, without limitation, soft signage media and other composite synthetic impervious materials, laminated, coated and plasticized surfaces of various materials, as well as other substrates which are substantially impregnable to liquids, such as high surface tension and impervious substrates that do not interact with a liquid ink composition so as to restrict the movement of the jetted droplets, including metal foil, plastic and other natural and man-made flexible polymeric materials.

The term "surface", as used herein, refers to the exterior or upper boundary, the external part or layer or the outward appearance of a substrate. This term is also used to describe any area of a surface, including specific parts of the surface. According to embodiments of the present invention, the image can be printed on at least a portion of the surface, as required by the design of the image.

According to the present invention, textile fabrics may include wool, silk, cotton, linen, hemp, ramie, jute, acetate fabric, acrylic fabric, LASTEX™, nylon, polyester, rayon, viscose, spandex, metallic composite, carbon or carbonized composite, and any combination thereof. According to some embodiments, the substrate onto which the image in printed on is a garment made of a textile fabric, and according to other embodiments it is comprised substantially of cotton.

The surface described above may form a part of an object that is made of the same material or, alternatively, of an object that includes one or more additional stretchable and/or flexible layers such as, for example, a paper layer, a foam layer, a textile fabric layer, a natural or synthetic rubber layer, a metal foil layer, a resin layer and the likes, and any combination thereof.

In general the surface can be of all materials and combinations of various materials, which are designed for a variety of applications, including printed commercial objects, sales promotion items, printed textiles, T-shirts, accessories, knitted, woven and non-woven materials, apparel, home furnishings, gaming table covers, flags and banners, soft signage, and trade show displays.

The process, according to some embodiments of the present invention, is suitable for inkjet printing a color image on a surface of any color or shade within the color range. In general, a conventional inkjet printing on any surface involves the visual blending of colorants in a form of a particular mix of different colorants on the printed surface. In the jargon of the art, a "process colorant" is substantially transparent and a "spot colorant" is substantially opaque. Spot colorant can be jetted like process colorants, and are typically used on top of process colorants in order to afford highlights and emphases over the image usually in pre-defined coloration.

As further discussed hereinabove, ink-jet printing of high-quality and high-resolution is based on placing very small dots of several basic colors in proximity so as to create a spectrum of colors from the visual (perceived) mixing of these basic colors. Each location of the image may be a unique blend of basic colorants constituting a unique color. Thus, the transparency of the ink is crucial for creating the spectrum as incident and substantially "white light" is filtered through the basic colors mix and reflected as a colored light back to the observer. The reflection of the light depends on the absorption of the background surface, hence on its color, and therefore non-white surfaces do not reflect all colors and as a result the ink or ink mixes forming the printed image are not perceived in their intended colors.

Thus, the key limitation in printing substantially transparent liquid ink compositions on any non-white surface, and especially on darkly colored or transparent surfaces, stems from the inability of the non-white surface to reflect white light from the surface back through the applied transparent ink and to the eye of the observer, which renders the image dull, dark and color-skewed. Therefore presently known printing technologies are limited when applied on darkly colored or otherwise non-white surfaces.

In cases where the surface is a dark surface, the process may employ the use of a third part of the ink composition such that can form a lightly colored or white opaque underbase (background) for the colored image. The third part is applied (jetted) from at least one printhead referred to as a third printhead, designated to apply the opaque and lightly-colored pigment.

As in the case of the second part of the ink composition (the colored part), the third part (the white opaque underbase part or the opaque underbase part), is applied as a silhouette of the image, not extending outside its outline, unless a particular part of the image is defined as white.

The second part (colored part), which typically includes 4 process colors and spot colors, is formulated to have a lower ratio of stretchability since it is typically applied on-top of a white (lightly-colored) substrate or over the white (lightly-colored) opaque underbase layer.

According to some embodiments of the present invention, the application of each of the parts of the ink composition is effected concomitantly; as exact simultaneous application is not possible (only one printhead can be positioned over any given point of the substrate at any given point in time). However, in typical inkjet machines, and particularly in wide-format inkjet printers, the image is formed in a series of passes, or strips, applied in a predetermined sequence so as to optimize the time it takes to cover the entire printed area at a minimal time and number of passes.

Hence, according to some embodiments of the present invention, the application of the first (immobilization) part precedes the application of each of the second and third parts. According to other embodiments, since the immobilization part is effective also when applied shortly after the other parts, the application of the third part may precede the application the first and second parts. According to yet other embodiments, where a third (underbase) part is not used, for instance on a white substrate, the application of the first and second parts can be substantially concomitant, namely there is no significant difference in the final result if one of the first or second parts reaches the surface before the other at a minute time difference ranging from 0 to 1 seconds. This is also the case when the first and third parts are relevant, namely as long as the top layer is the colored part is applied on top of layers of either the first or the third part, the final result is the same desirable result.

According to some embodiments of the present invention, the first part is applied concomitantly with both the third and the second parts, namely the first and third parts (immobilization part and opaque underbase part respectively) are applied in the first pass, followed shortly thereafter, in less than a second, with a pass wherein the first part is applied concomitantly with the second part (immobilization and colored parts). According to these embodiments, the immobilization part is applied in both passes, once concomitantly with the white background, and again concomitantly with the process colors.

Alternatively, the printing process is effected by applying two complete layers, namely one layer comprising the opaque underbase part, which is printed in its entirety before the following layer of the colored part of the ink composition (comprising CMYK colorants and the likes) which is applied thereon. In these embodiments the immobilization part is applied concomitantly with the (white) opaque underbase part, and then an additional portion of the immobilization part may be applied concomitantly with the colored (CMYK) part of the ink composition.

As in typical inkjet process, the colors are jetted in amounts which correlate to the type of substrate, its color and the desired color intensity and coverage in each given segment of the image. Increasing color intensity can be afforded by increasing the drop density per unit area. The drop density output of a given printhead (namely without changing the type of printhead) per unit area, can be increased by increasing the number of passes of the printhead(s) over the area and/or increasing the number of printheads jetting the same fluid. In order to provide an effective underbase for color images printed on darkly-colored substrates, the jetted amount of the underbase part is typically larger than the jetted amount of the colored part(s) of the ink composition, as high as 5-fold respectively. However, as presented hereinbelow, the amount of the underbase part needed to be applied on a dark stretchable substrate can be reduced dramatically if pre-wetted with simple tap water or another wetting solution and then wiped with a squeegee prior to applying the underbase part, as described in U.S. Provisional Patent Application No. 61/245,333, filed Sep. 24, 2009, and in a U.S. Patent Application by the present assignee, titled "A DIGITAL PRINTING DEVICE WITH IMPROVED PRE-PRINTING TEXTILE SURFACE TREATMENT", which is co-filed with the instant application and incorporated in its entirety as fully set forth herein.

Since all the parts of the multi-part ink composition can be applied on the substrate by means of printheads which jet very small droplets of liquids at a controllable rate, one of the advantages of the process presented herein, is a considerable reduction in the total amount of applied liquids which are required to form a vivid and durable image of the substrate, a factor that translates directly into reduced drying and curing times, leading to a great reduction in energy costs.

Specifically, the process presented herein greatly reduces by at least one order of magnitude the jetted amount of the first part (immobilization part) of the ink composition, which is somewhat comparable to the wetting composition discussed hereinabove. The reduction in the amount of the applied immobilization part and the reduction in the duration of the process also reduced the overall cost of ink-ingredients, and afforded a process which is less hazardous to the environment and more suitable for use in inkjet technology. This is particularly effective in the use of the immobilization part of the ink composition, which can now be used sparingly, avoiding staining of the garment around the image and saving primarily on drying energy and time.

It was further found that the relative low volume application of the immobilization part of the ink composition is sometimes advantageous if the printing mode is, for example, a "one pass" mode, such as in "roll to roll" print. In such mode the immobilization part is applied continuously at short a distance ahead of the color print front. In such embodiments, massive spray of the immobilization part is non-feasible due to the risk of clogging, the volumes which are evaporated thereafter and other ill effects.

Hence, according to some embodiments of the present invention, the amount of the first part of the ink composition, which is jetted in the process presented herein in order to achieve over 100% coverage of the surface, ranges from about 0.005 grams per square inch (g/in$^2$) to about 0.040 grams per square inch. In comparison, the wetting composition, disclosed in IL Patent No. 162231 and WO 2005/115089, is applied in an amount of about 0.07-13 grams per square inch, and preferably of about 0.7-4 grams per square inch.

Another advantage of lowering the amount of the immobilization part needed to exert the desired immobilization effect, is the ability to apply more of the second (colored) part of the ink composition, compared to the amount of the second part which can be applied in other processes, such as processes using a wetting composition. The optional increase in amounts of the colored part is enabled by increase in resolution or optional multi-pass of the printheads as the ratio of colored part to immobilization part is kept substantially constant. The ability to apply more of the colored part has a remarkable positive effect on the overall quality of the resulting image in terms of color depth and vividness.

Hence, according to some embodiments of the present invention, the amount of the second part of the ink composition, which is jetted in the process presented herein in order to achieve about 100% coverage of the surface, ranges from about 0.015 grams per square inch (g/int) to about 0.085 grams per square inch. In comparison, the maximal amount of the colored part which could be applied on top of the wetting composition, disclosed in IL Patent No. 162231 and WO 2005/115089, was only about 0.030 grams per square inch.

It is noted herein that the fourth part of the ink composition, which is an opaque and colored ink part, providing "spot colorant" inks to various regions of the image, is regarded and treated similarly as the second part of the ink composition, except for the appearance of each, the second part contains transparent ingredients and the fourth part contains opaque ingredients. Hence throughout the discussion of the process of printing, the second part and the fourth part are synonymous in terms of amounts and order of jetting with respect to the first part (immobilization part) of the ink composition.

The third part (the opaque and typically white underbase layer) is applied in an amount that would reflect the uneven (non-flat), and hence greater surface area of some of the substrates for which the present invention is provided for. For example, the surface of a fabric exhibits ridges and grooves, and the white layer should fill these textural features in order to provide an evenly filled, continuous and stretchable layer for the colored part which will be applied thereon. Hence the amounts of the third part are typically higher than, and mostly double the amounts of the colored part.

The opaque (white) underbase part of the ink composition can be jetted by a plurality of printheads (3-4 printheads) so as to achieve a total coverage of up to than 400% on the surface by applying about 0.08-0.15 grams per square inch of the underbase opaque part. For comparison, each printhead which applies one of the CMYK colorants of the colored part of the ink composition can apply about 0.024 (100%) grams per square inch, therefore assuming a total coverage of 140% by all four CMYK colors over the underbase opaque part, the total amount jetted of the colored transparent parts of the ink composition is about 0.032 grams per square inch.

According to some embodiments of the present invention, the jetted amount of the third (underbase) part ranges from about 0.07 grams per square inch to about 0.15 grams per square inch.

For another example, in cases where an underbase opaque part is used, the immobilization part of the ink composition can be applied in two passes, one at a rate of about 0.032 grams per square inch concomitantly with the underbase opaque part, and at a rate of about 0.007 grams per square inch concomitantly with the colored part of the ink composition. Alternatively, the opaque white underbase part of the ink composition (the third part) that masks a darkly colored surface of a substrate with a white background, can be applied at 100% intensity by 3-4 designated printheads which jet a total of 0.15 grams of the third part per square inch concomitantly with the application of the first (immobilization) part which is jetted by one or two designated printheads at a rate of about 0.02-0.04 grams per square inch, prior to the application of the colored part which is also applied concomitantly with the first part, both at a rate of about 0.01-0.02 grams per square inch, thereby forming an image on a darkly colored substrate.

According to some embodiments, the jetted amount of any of the parts of the ink composition can be selected to achieve less than 100% coverage, and be proportional to the required intensity of each of the process colors composing any given point of the computerized graphic image, namely proportional to the CMYK demand per pixel or per unit of information which depicts a point in the image. As discussed hereinabove, the flatness and smoothness of the surface, particularly that of a stretchable fabric substrate, is one of the main contributors to the quality of the resulting ink-jetted image applied thereon. This is fundamentally different that applying a similar image on intrinsically smooth surfaces, such as paper. The grooves, valleys and ridges formed by the threads, even in non-woven fabrics, and the protruding fibers, affect the image adversely.

While the immobilization reaction substantially prevents the absorption of the jetted droplets, the typically non-planar surface of the garment fabric poses a problem of relatively very large area coverage, as the fabric surface contains valleys and ridges in order of magnitude much greater then the jetted droplets.

This uneven microscopic surface of a fabric-like substrate leads to uneven coverage thereof by the microscopic droplets which experience relative dramatic variations in the slope angles upon impact, at various locations of the surface. The uneven surface of a fabric-like substrate poses a particular problem when the fabric is non-white and the image is printed using an ink composition having a third opaque underbase part. If applied on an uneven surface, the underbase part must be applied in such amount that would fill-in and practically flatten the uneven surface; hence the underbase part must be applied on uneven surfaces at large amounts, leading to excessive usage of ink, energy and time.

While reducing the present invention to practice, it was observed that temporary flattening or planarization of the surface of the substrate with respect to the jetted droplets can be achieved by spraying the fabric with tap water, which allows faultless coverage of the surface on the sprayed areas with a layer of the multi-parts ink having an opaque or colored part which are immobilized concomitantly with an immobilization part on the watered/sprayed areas.

As presented hereinbelow, wetting of the substrate with tap water, thus forming a temporary planar surface, dramatically reduces the amounts of the opaque underbase part to be applied. Therefore the amount of sprayed tap water depends on the smoothness and microscopic planarity of the receiving substrate. The amount of the opaque underbase part may then be about from about 0.01 grams per square inch to 0.09 grams per square inch, and the immobilization part also decreases from about 0.01 grams per square inch to about 0.03 grams per square inch.

While further reducing the present invention to practice, it was observed that in order to improve the smoothness of the wetted substrate's surface, and particularly substrates having protruding fibers as an intrinsic feature of their substance and making, a mechanical device such as a squeegee, "air knife" or any other form of a flat strip-shaped, blade-shaped or roller-shaped mechanical object may be passed across the wetted surface so that apply pressure on the wetted substrate, thereby flattening these fibers and other protruding features therein that may cause uneven capturing of the ink droplets.

U.S. Provisional Patent Application No. 61/245,333, filed Sep. 24, 2009, and in a U.S. Patent Application by the present assignee, titled "A DIGITAL PRINTING DEVICE WITH IMPROVED PRE-PRINTING TEXTILE SURFACE TREATMENT", which is co-filed with the instant application and incorporated in its entirety as fully set forth herein, teaches a digital printing machine for printing textiles, such as fabric woven within a plane and comprising fibers extending outwardly from that plane. The machine according to this application, includes a wetting unit for wetting the fabric to be printed prior to the digital inkjet printing, a printing head for inkjet printing on the substrate, and a flattening unit for exerting pressure on the surface of the substrate in order to flatten any outwardly extending (protruding) fibers to the surface after wetting and before printing. This flattening device and action thereby causes the protruding fibers to stick to the surface of the substrate and to no-longer protrude, and thereby smoothing the substrate for inkjet printing.

Using the aforementioned fiber-flattening device can be effected by spraying and wetting the substrate with plain tap water or another wetting composition, as disclosed therein. Tap water leave no stains or cause no color migration, leaching or fading, and hence can be used in some relative excess with respect to the parts of the multi-part ink composition provided herein. The application of the water need not be accurate with respect to the area covered by the image and can exceed it if necessary. Thus, according to some embodiments of the present invention, the mount of tap water sprayed over the substrate is from about 0.4 to about 2 grams per square inch. The resulting image, according to the present invention is unique in the sense that it combines qualities which are absent or lacking in images which are printed by using presently known ink compositions and printing processes. The image afforded by the ink compositions provided herein, utilized in the process and devices provided herein can be distinguished from other images ink-jet printed on stretchable dark or white substrates.

Therefore, according to another aspect of the present invention there is provided a substrate having an image printed on a stretchable and/or flexible surface thereon which is prepared by the printing process as described hereinabove using a multi-part ink composition as described hereinabove.

The image, according to this aspect of the present invention is characterized by an unusual and unique durability, resistance to mechanical, physical and chemical stresses, high wash-fastness, flexibility, stretchability and a pleasant hand-feel, and further characterized by high color definition and depth, high resolution photorealistic qualities, even when applied to absorptive surfaces such as lightly- or darkly-colored textile fabrics.

Reference is now made to FIG. 1 which is a schematic diagram illustrating a digital printing machine with a flattening unit according to embodiments of the present invention.

According to embodiments of the present invention, there is provided a digital printing machine 100 for printing textiles. The textiles may comprise garments or other textile items made of fabric knitted and/or woven within a plane, the fabric itself comprising fibers extending outwardly from the plain. The fabric may be based on any conventional or unconventional textile material. The fabric may for example comprise felt, leather, fibrous materials, porous materials, materials having high surface tension with the ink liquid, weaves of natural and synthetic fibers, weaves of mixtures of natural and synthetic fibers, natural fibers including wool, cotton, linen and synthetic fibers including nylon or suede. The fabric is essentially planar with smaller fibers, hairs, extending outwardly from the plane. The machine comprises a wetting unit 101 for wetting an item to be printed prior to printing. Wetting is performed for ink drop immobilization, thus limiting the penetration of the ink into the depth of the fabric, which may cause dull coloring of the garment, mixing of colors and blurring.

A printing head 103 prints on the item to be printed. A printing head comprises at least one inkjet nozzle (not shown). The printing head can be any conventional printing head, such as those marketed by Spectra, Inc., New Hampshire, USA, and others known in the industry.

When using conventional ink-jet type printing on textile without the use of the present embodiments, the outwardly extending fibers intercept the drops from the nozzle before they arrive at their intended destinations, as discussed above.

Pressing or flattening unit 102 may be located between wetting unit 101 and printing head 103, though other locations are possible. Pressing or flattening unit 102 exerts mechanical pressure on the item to be printed to flatten the outwardly extending fibers to the fabric after wetting and before printing. Flattening unit 102 may employ static pressure. Flattening unit 102 may be disengaged from the item to be printed (not shown) after flattening has been completed. The pressure of flattening unit 102 on the fabric, after wetting and before printing, causes the extending fibers or hairs to bend back towards the fabric before printing. The water from the wetting unit provides the fabric and the fibers with enough liquid to keep the outwardly extending fibers to temporarily remain stuck to the fabric. The fibers sticking to the fabric render the fabric as a smoother surface for printing without any interference of outwardly extending fibers.

Flattening unit 102 may be any construction that mechanically presses the fibers to the fabric as the fabric passes the unit. Flattening unit 102 may be implemented using for example a downwardly pressing curtain such as a PVC curtain, a mechanical roller such as a metal or polymeric roller, an Air knife, a squeegee, including for example a polymeric squeegee such as PVC or Natural or artificial rubber, silicon and, a thin flexible metal squeegee, a brushing strip and the like. Flattening unit 102 may replace the ironing unit (not shown), since there may be no need to iron the fabric. Flattening unit 102 may be adjusted before flattening for achieving a desired level of pressure. For example, different types of fabric or different levels of wetting may require different levels of pressure. Such pressure adjustment may be performed by using a counter balance (not shown), adjustable mechanical spring (not shown) or by pneumatic pressure adjustment (not shown).

The item to be printed (not shown) may be a garment or any other fabric, such as leather or suede.

Printing head 103 comprises an array of inkjet nozzles for performing digital printing. The inkjet nozzles may comprise a drop-on-demand piezoelectric inkjet nozzle or a continuous piezoelectric inkjet nozzle. Additional heads may provide post-printing and may comprise, a curing unit for curing ink, an ironing unit for ironing the item to be printed, or a heat press. The curing unit may be an infrared curing unit, a hot air blowing curing unit or a microwave-curing unit. Printing machine 100 may comprise an external head for stencil printing.

Printing machine 100 may comprise a printing table (not shown) for holding the items to be printed. Printing machine 100 may be a carousel, a matrix, or any other printing machine, as will be discussed in greater detail below.

Machine 100 may comprise additional printing heads and/or additional flatting units and/or additional wetting units.

Machine 100 may comprise a controller for coordinating relative motion between the table assembly (not shown) and the flattening unit 102.

FIG. 2A is a schematic diagram of an exemplary printing machine with a roller-flattening unit. Printing machine 200 comprises a wetting unit 201, a flattening unit 202, and a printing head 203. Flattening unit 202, according to the exemplary diagram, is a roller, which is capable of exerting pressure on the item to be printed to flatten outwardly extending fibers to the fabric after wetting and before printing. In the exemplary diagram, the flattening unit is located before the printing head and after the wetting unit, though the units may be arranged in a different order.

FIG. 2B is a schematic diagram of an exemplary printing machine with a polymeric or metal curtain-flattening unit. Digital printing machine 300 comprises a wetting unit 301, a flattening unit 302 and a printing head 303. Flattening unit 302 comprises a polymeric, silicone, polyethylene or metal curtain, which mechanically pushes downward on passing fabrics, thus exerting mechanical pressure on the item to be printed to flatten outwardly extending fibers to the fabric after wetting and before printing. In the exemplary diagram, the flattening unit is located before the printing head and after the wetting unit, though the units may be arranged in a different order.

Reference is now made to FIG. 3, which is a schematic diagram of a carousel-printing machine 46 in which one of the stations 47 is a wetting and flattening unit which includes a flattening unit 50 according to an embodiment of the present invention. The garment printing apparatus 46 comprises other stations such as a stencil-printing station 24, and digital printing station 25. A combination of stencil printing and digital printing may be used for printing a background color on the garment before performing the digital printing.

The wetting apparatus, which is part of digital printing station 47, comprises a wetting unit 48 comprising sprinklers and a tank part 49. The wetting unit may spray a wetting and immobilizing solution onto the textile or garment.

In use, a garment is placed on one of a series of printing trays, which go around the carousel and stop at stations as needed. At each station, the printing trays go through the process being offered at that station. In the case of wetting and flattening unit 47, the garment undergoes wetting, and then is flattened using flattening unit 50 and then the tray is moved onwards to digital printing station 25 for printing while still wet and with the fibers still adhering.

In an embodiment, for each printed garment, the stencil printing, if executed, is executed first, flash cured if required (not shown), then the wetting, then the flattening and then the digital printing. The execution of the stencil printing is optional and may be used for printing background colors or standard images.

The digital printing can be performed at any application stage, while following the digital unit a flash cure unit may be used to dry the digitally printed image.

FIG. 4 is a schematic drawing of a matrix-printing machine using a flattening unit, according to an embodiment of the present invention Matrix 600 is a matrix of printing stations set out in linear manner so that a garment is placed on a tray and passes down a row of stations to be treated with a series of pre-printing, printing and post-printing functions. The matrix 600 features rail 601 which bears function head 623 and function head 622, rail 602 which bears function head 621 and function head 620, rail 603 which bears function head 619 and function head 618, rail 604 which bears function head 617 and function head 616, rail 605 which bears function head 615 and function head 614 and rail 606 which bears function head 612 and function head 613. Matrix 600 also features rail 608 which bears printing table (tray) 627, rail 609 which bears printing table (tray) 626, rail 610 which bears printing table (tray) 625, and rail 611 which bears printing table (tray) 624.

In the exemplary diagram, function head 622 is a wetting head and function head 620 is a printing head. Flattening unit 628 is located between wetting head 622 and printing head 620 underneath rail 601. In alternative embodiments, the units may be arranged in a different order.

Printing table 624, in the exemplary diagram, is first fed under wetting unit 622 for wetting the garment and then is fed under flattening unit 628 while the garment is still wet, thereby causing the fibers to stick due to surface tension. The table then passes to printing head 620, where digital printing takes place.

In the matrix, unit 622 could alternatively be a screen-printing station, in which case the wetting and digital printing units would be moved one station further along.

Reference is now made to FIG. 5, which is a schematic diagram showing a view from the side of a textile-printing machine according to the present embodiments. Printing machine 500 comprises a wetting unit 501, a roller type flattening unit 502, and a printing head 503. A garment first passes the wetting unit 501, then is pressed when wet by the roller type flattening unit 502 and finally is printed under the printing unit 503, while the area being printed is still wet from the wetting unit and the fibers around the textile material still adhere to the underlying fabric.

FIG. 6 is a simplified flow chart illustrating an exemplary printing process for printing on a dark textile, using digital printing machine with a flattening unit according to the present embodiments.

As discussed above, when printing on a dark garment, a white undercoat may be printed on the garment prior to printing the image. In such a case, extensive wetting may be needed before printing the white undercoat. Thus, when printing an opaque layer, extensive wetting of the garment is performed before printing the white undercoat. Referring now to the drawing of FIG. 6, a process 700 of wetting, flattening and printing is shown which is suitable for dark colored backgrounds. In box 701, the garment is extensively wetted by a wetting unit in order to limit absorption of the ink by the fiber. In box 702, a flattening unit exerts pressure on the item to be printed in order to flatten outwardly extending fibers to the fabric after wetting and before printing. In box 703, the opaque undercoat is printed. In box 704, digital printing of the image on the wetted opaque layer is carried out by expelling drops of ink from nozzles of the printing head to desired points on the fabric, for example using the CMYK color system. Since the fibers of the fabric have been flattened and are clinging to the fabric surface, the fibers no longer intercept the ink drops and the drops thus land where intended on the fabric, leading to sharper printing.

FIG. 7 is a schematic side view showing in greater detail an exemplary digital printing machine comprising an exemplary flattening unit in operative state. Digital printing machine 700 comprises chassis 704, scan axis 703 and flattening assembly 706. Scan axis 703 comprises a rail which is placed on chassis 704 and provides the rail for bearing tray 705. Tray 705 is used for holding an item to be printed (not shown). The enlargement 706 shows in greater detail the assembly of the flattening unit. The exemplary flattening assembly comprises rigid arm 707 which applies a constant pressure in the on state, elastic flattening unit 701 which may be made of rubber, wetting unit 702, as counterweight 708, which is here shown as a variable counterbalance to the weight applied by the rigid arm 707 to regulate the applied pressure, and the reversible attachment unit 711 that attaches or separates the flattening unit from the printing substrate.

Construction 710 holds the wetting spray units 702. Rigid arm 707 is attached to counterweight 708 which is here embodied as a variable counterbalance. Regulated counterbalance 708 imposes a required level of flattening pressure on flattening unit 701. Reversible attachment unit 711 comprises a piston that brings the flattening 701 squeegee into contact with the printing substrate and detaches it after flattening. Counterbalance 708 regulates the pressure on the flattening unit to press against tray 705 for flattening and detaches the flattening unit from tray 705 after flattening and before printing. Arm 707 of the flattening unit is hinged in order to allow pressure regulation unit 708 to regulate the weight applied to the garment. Attachment detachment unit 711 may transfer the pressure to the flattening unit when switched on. Adjusting the pressure on flattening unit 701 may be done for achieving a desired level of pressure. For example, different types of fabric or different levels of wetting may require different levels of pressure. Wetting unit 702 is used for wetting the item to be printed (not shown) before flattening. Wetting may be done, for example, by using water or acid solution optionally composed with wetting additive. Flattening unit 701 is shown in operative mode flattening the item to be printed (not shown) after wetting and before printing.

The item to be printed then passes under printing unit 709 to be printed while the fibers still adhere to the fabric.

FIG. 8 is a schematic side view of an exemplary digital printing machine comprising the exemplary flattening unit of FIG. 7 in non-operating state. FIG. 8 comprises the same units that are described in FIG. 7. By means of 711 piston the tension from counterweight 708 is released and flattening unit 701 and arm 707 are withdrawn from tray 705, and thus from the item to be printed (not shown). The garment etc is able to travel to the printing unit 709 to print on the item to be printed after wetting and flattening.

FIG. 9 is a view of an exemplary flattening unit in operative state. All units shown in FIG. 9 are shown and described in FIG. 7. Flattening unit 701 is operated by reversible attachment unit 711, for example a pneumatic piston (on/off) that either attaches or separates 701 flattening unit from the printed object, in order to press on the item to be printed with the desired flattening pressure and to release as required.

FIG. 10 is a schematic view of the exemplary flattening unit of FIG. 9 in non-operative state. All units shown in FIG. 10 are as shown and described in FIG. 9. Flattening unit 701 and arm 707 are horizontal to the tray (not shown) and are detached from the tray in order to enable the printing unit (not shown) to print on the item to be printed after wetting and flattening.

FIG. 11 is a close up view of the exemplary digital printing machine of FIGS. 9 and 10 comprising an exemplary flattening unit in operative state. Flattening unit 701 presses down on the item to be printed. FIG. 11 shows also sprinklers 702 being used for wetting before flattening.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions; illustrate the invention in a non limiting fashion.

General Printing Procedure:

The Examples below were executed on a "STORM" digital printing machine, manufactured by Kornit Digital Ltd., Israel, and equipped with a battery of printheads, as described hereinabove, and a "squeegee" device as described herein.

Printing frequency (the rate at which the digital data signals, 0 for close or 1 for open, are transmitted to the printhead) of 10-20 KHz at resolution range of 363-727× 363-727 dots per inch (dpi).

At these settings, one full printhead wide strip is printed in 4-8 passes in order to obtain high resolution and over-coverage of the substrate. The distance between nozzles line in two adjacent printheads is 25 mm, and 100 mm for two most distant printheads. At this configuration the time between a pass applying one part of the ink composition and the time another part is jetted is about 0.02 seconds for two adjacent printheads printing at 15 KHz and at 363 dpi, to 0.72 seconds printing at 10 KHz and 727 dpi for the most remote positioned printheads.

While reducing some of the embodiments of the present invention to practice, it was observed that the time taking for an aqueous based ink composition or a part thereof, such as the immobilization part, to soak into the fabric after jetting, is well over 60 seconds. The soaking time for an aqueous opaque white part of the ink composition is the shortest, as compared to the immobilization part and the colored parts, which is about 20 seconds. Twenty seconds is the approximate minimal soaking time of ink droplets which was measured on white cotton fabrics treated differently by various suppliers.

These observations are considered for the time of reaction between any two parts of the ink composition, which is almost instantaneous, is shorter by more then an order of magnitude then the time of soaking of the liquids into the substrate, ensuring that the immobilization of the droplets is achieved before capillary action takes place.

The applied amount of each part of the ink composition should be such that a clear and vivid image is formed, without excess ink which leads to smearing, prolonged drying and curing time and costly waste.

The amount of the part which is jetted first (not necessarily the "first part") should flatten the protruding fibers in case of untreated textile. This effect will ensure that the next parts of the jetted ink composition that reach the substrate do not encounter perpendicular fibers that prevent the jetted droplet from reaching the surface of the substrate, and may be visible after drying over and around the outline of the image and obscure or fuzz the printed image.

In an exemplary printing procedure, the opaque white underbase part of the ink composition is jetted by 3-4 printheads at a total amount of about 0.15 grams per square inch. Each of the CMYK pigments is jetted by separate printheads, each printhead applying about 0.024 grams per square inch, and assuming coverage of 140% by total 4 colors, the amount of jetted colored part is about 0.032 grams per square inch. The immobilization part of the ink composition is applied at a rate of about 0.032 grams per square inch when immobilizing the opaque white underbase layer, and 0.007 grams per square inch when immobilizing the colored part layers.

At the same time that the printed image is cured on the fabric by heat-activated catalysts (80-160° C.) which activate crosslinking agents that bind to functional groups in the substrate, all the carriers should be evaporated from the substrate, preferably before the crosslinking reaction begins. According to embodiments of the present invention, the timing and duration of the curing stage can be easily optimized due to the reduced total amount of applied ink composition in terms of total liquids to be evaporated, which shortens the final drying time, as compared to other printing techniques and particularly as compared to the amount of liquids applied in other processes using a wetting composition with or without a property-adjusting or property-sensitive agent(s). The reduced amount of applied liquids opens the possibility of using reagents of a lower evaporation rate. This also realizes a great saving and cost reduction of drying equipment and energy.

It is noted herein that elevated-temperature curing is optional when the polymerization reaction can occur under 80° C. due to particular selection of certain ingredients such as polymerization initiators/catalysts, monomers/oligomers and/or crosslinking agents, such as photo-curable or radiation-curable ingredients.

Printing was typically performed on the surface of an untreated 100% white or black cotton T-shirt. Similar results were obtained when images were printed on a surface of 50% cotton and 50% polyester.

Untreated fabrics are fabrics which are used "as is" in the exact state at which they are provided by the manufacturer. Specifically, when the term "untreated" is used herein to describe fabrics and other substrates, it is meant to describe substrates for which no chemical preparation step was taken in order to render them ready for inkjet printing other than placing the substrate in the printing machine.

It was also found that when printing on 100% polyester fabric, non-woven materials, soft signage and other non-fibrous materials, the immobilization part of the ink composition can be devoid of a binder since the problem of protruding fibers does not exist.

Unless otherwise stated, the test printing was performed on a 100% cotton white T-shirts purchased from Anvil Ltd. or on a 100% cotton black T-shirts (Beefy-T) purchased from Hanes. The T-shirts were used "as is", or ironed for 5 seconds at 160° C. using an automatic press. All measurements of optical densities were performed on images which were printed on identical shirts (same production batch), printed at different pretreatment modes.

The merits of the resulting multicolor image was assessed both qualitative (visually inspected) and quantitative (numerically parameterized). An exemplary multicolor standard-testing image was printed for a qualitative and quantitative assessment of the printing process and the resulting image.

The printing tests presented herein were conducted using a printing machine equipped with a wetting apparatus and a fiber-flattening device, as disclosed in U.S. Provisional Patent Application No. 61/245,333, filed Sep. 24, 2009, and in a U.S. Patent Application by the present assignee, titled "A DIGITAL PRINTING DEVICE WITH IMPROVED PRE-PRINTING TEXTILE SURFACE TREATMENT", which is co-filed with the instant application. This machine allows for the wetting of the surface of the substrate, which is thereafter gently pressed by a "squeegee" or a flattening device, causing any protruding fibers to stick to the surface, and also temporarily fills grooves and dimples in the surface with a small amount of water or another wetting solution, thereby affording a temporarily flattened and even substrate surface.

The white underbase part on black fabric was printed either directly on dark shirt without spraying the substrate with water, or on black fabric sprayed with tap water and flattened with a squeegee. When the fabric was sprayed with tap water, the amount of the white underbase part of the ink composition required to reach a complete coverage of the designated area, was remarkably smaller than for print tasks of identical images and identical substrates but without the water and squeegee treatments.

The standard-testing image included a pattern of squares, each square represents a different combination of CMYK pigments (column-wise) and different pigment dilution (row-wise), printed at a basic resolution of 545×545 dpi, wherein the rows represent colored pigment dilution going from 100% (undiluted) down to 10% in equal intervals of 10% plus a row representing dilution of the colored pigment to 5%, and further having three rows representing binary mixtures of Y+M, Y+C; C+M printed simultaneously.

All prints were cured in hot air drier unit prior to analysis. Curing cycle was effected for 160 seconds at 140-160° C.

Example 1

The effect of the concomitant application of an immobilizing part and an opaque white underbase part of an ink composition, using the process according to some embodiments of the present invention, was demonstrated by printing a layer of an opaque white pigment directly on a black T-shirt made of 100% cotton. Three tests were run, comparing the results of a single part white ink composition, a white ink composition printed on a black cloth after being wetted with a wetting composition as disclosed in WO 2005/115089, and a two-part ink composition having an immobilization part and a white colored part.

The formulation and attributes of the first part of the ink composition (the immobilization part which contains the property-adjusting agent) is presented below in Table 1, the wetting composition in Table 2 and the white colored part in Table 3.

TABLE 1

| Immobilization Part | |
|---|---|
| Property-adjusting lactic acid | 9% |
| Ammonia (for buffering the acid) | 3% |
| A mixture of propylene glycol, diethylene glycol, glycerin and/or other polyols (as humectants) | 50% |
| Benzotriazole (as anti cupper corrosion agent) | 0.40% |
| Sodium nitrate (as anti corrosion agent for ferrous metals) | 0.20% |
| Acrylic emulsion (film-forming binder) Appretan E 6200 (Tg −20° C.) | 35% |
| Deionized water | to 100% |
| Viscosity at 34° C. | 10 cp |
| pH | 4.7 |
| Surface tension | 37 N/m |

TABLE 2

| Wetting composition (Prior Art Formulation) | |
|---|---|
| Acetic acid (as a transitory organic acid) | 2.5% |
| BYK 348 (as a wetting agent) | 0.15% |
| Tap water | to 100% |
| Viscosity at 34° C. | 1-2 cp |
| pH | 2.5 |
| Surface tension | 31 N/m |

TABLE 3

| Opaque white underbase part | |
|---|---|
| Property sensitive film-forming acrylic emulsion (Appretan E 6200, Tg −20° C.) | 37% |
| Titania (as an opaque white pigment and second metal oxide) | 18% |
| A mixture of propylene glycol, diethylene glycol and glycerin (as humectants) | 37% |
| TEGO 750 (dispersant) | 3.2% |
| BYK 024 (as an anti-foaming agent) | 0.2% |
| Diethanolamine (as a buffering agent) | 0.2% |
| BYK 348 (as a wetting agent/surfactant) | 0.1% |
| Cymel 303 (amino resin crosslinking agent) | 3% |
| Nacure 2448 (a blocked acidic catalyst) | 0.5% |
| Acticide MBS (as a bacteriocide/fungicide) | 0.1% |
| Deionized water | to 100% |
| Viscosity at 34° C. (at shear force of 4000 sec$^{-1}$) | 13 cp |
| pH | 8.5 |
| Surface tension | 34 N/m |

FIGS. 12A-12B present color photographs of three untreated black 100% cotton textile pieces having a white opaque pigment part of an ink composition printed thereon by an inkjet printer. The printhead batter was fitted with three dedicated printheads for white to ensure complete coverage and opacity on the black fabric, compared to a single printhead which is typically assigned for each of the CMYK pigments. The printheads were operated at a drop size of 75-85 picoliter, applied at 0.335 grams per square inch and dada frequency of 12-20 KHz. The white ink composition was printed in a pattern of 6 stripes each representing a different drop-density levels going from 100% to 50% in equal intervals of 10%.

FIG. 12A shows the results of printing the white pigment ink composition printed at a resolution of 636×636 dpi without any attempt to immobilize the ink before curing, demonstrating unacceptable coverage of the surface due to wicking of the white ink into the fabric before it had cured. FIG. 12B shows the results of printing the white pigment ink composition at the same resolution after spraying the cloth with a wetting composition based on acetic acid, demonstrating near acceptable results which require additional applications of white ink in order to become acceptable. FIG. 12C shows the results of printing the ink composition, as an immobilization part (the first part) applied concomitantly with the opaque white pigment part (the third part) at a ratio of 1:3 respectively and a resolution of 727×1000 dpi, demonstrating the superb results obtained when using the process presented herein by an exemplary embodiment thereof.

As can be seen in Table 4 below, it has been observed that the amount of an immobilization formulation required to afford an acceptable white underbase suitable for color printing thereon can be decreased sharply, as compared to the amount of the comparable wetting composition.

Table 4 presents the amount in grams of either a sprayed wetting composition or a printed immobilization formulation, needed to afford comparable immobilization of the colored ink on a black or white textile piece, covering an area of 240×156 mm or 9.45×6.16 inches.

TABLE 4

| Formulation | Black textile | White textile | White Signage |
|---|---|---|---|
| Wetting composition | 29 grams | 9 grams | 5.4 grams |
| Immobilization part | 3.7 grams | 0.46 grams | 0.32 grams |

As can be seen in Table 4, the amount needed to immobilize colored ink on a fabric with the immobilization part is 13% of the amount of the wetting composition needed to stabilize the ink on black textile (about 8-fold reduction in amount) and 5% of the amount on white textile (about 20-fold reduction in amount). As can further be seen in Table 4, when printing on white soft signage (for more details on the substrate, see Example 4 below), which is impregnable to liquids, the amount of the required immobilization part is about 16-fold smaller that the corresponding amount of wetting composition. Furthermore, since the wetting composition is sprayed on an area larger than the area of the image, and the immobilization part is printed exactly under the image as its silhouette, the actual difference in the applied amount is actually much greater, leaving no marks on the exposed (uncovered) substrate near the outline of the image.

Example 2

The effect of the concomitant application of an immobilizing part, an opaque white underbase part and a colored part of an ink composition, using the process described in Example 1 hereinabove, was demonstrated on a black T-shirt made of 100% cotton.

The formulations of the immobilization and underbase parts were the same as presented in Example 1 hereinabove. The formulation of the colored part is presented in Table 5 below.

TABLE 5

| Colored (CMYK) part | |
|---|---|
| Cabbojet 260 series (20% pigment in water and property-sensitive dispersant) | 12% |
| Dispex A40 (as property-sensitive proto-elastomeric film-forming acrylic dispersant) | 1-2% |

TABLE 5-continued

| Colored (CMYK) part | |
|---|---|
| Acticide MBS (as bacteriocide/fungicide) | 0.10% |
| Propylene glycol, diethylene glycol, glycerine and mono-ethylene glycol (humectant) | 35% |
| Cymel 303 (Melamine, amino resin crosslinking agent) | 3% |
| Nacure X49-110 (blocked acid catalyst) | 1% |
| Diethanolamine (buffering agent) | 0.40% |
| BYK 031 (defoamer) | 0.2% |
| Proprietary acrylic emulsion (as property-sensitive proto-elastomeric film-forming binder) | 25% |
| BYK 348 (surfactant) | 0.10% |
| Deionized water | to 100% |
| Viscosity at 34° C. (shear force at 4000 sec$^{-1}$) | 10-13 cp |
| pH | 8-8.5 |
| Surface tension | 32-36 N/m |

FIGS. 13A-13B present color photographs of two untreated black 100% cotton textile pieces having colored (cyan, magenta, yellow and black, or CMYK process pigments) ink compositions printed thereon in a pattern of squares. Each square in the pattern represents a different combination of CMYK pigments (column-wise) and different drop-density (row-wise), printed at a basic resolution of 545×545 dpi on a white underbase.

FIG. 13A shows the results when the colored pigments were printed on a layer of white ink applied at a rate of 0.32 grams per square inch, 636×636 dpi resolution, 75-85 pL drop size and 12-15 KHz, after spraying the cloth with a wetting composition (as disclosed in WO 2005/115089) based on 2% acetic acid in tap water, showing an ordinary display of color depth which is less than acceptable.

FIG. 13B shows the results obtained when using the process described herein, where an immobilization part (first part) is printed concomitantly with the colored pigments (second part), and less than a second after an immobilization part (first part) was applied at a rate of 0.32 grams per square inch, 636×636 dpi resolution, 75-85 pL drop size and 12-15 KHz, concomitantly with an opaque white pigment (third part) using a third of the amount of white ink (0.11 grams per square inch) to accomplish the acceptable results, demonstrating the superb results obtained when using the inkjet printing process described herein.

Example 3

The effect of the concomitant application of an immobilizing part, an opaque white underbase part and a colored part of an ink composition, using the process described herein, was demonstrated on a white T-shirt made of 100% cotton.

The formulations of the immobilization, colored and underbase parts were the same as presented in Examples 1 and 2 hereinabove.

FIGS. 14A-14C present color photographs of three untreated white 100% cotton textile pieces having colored pattern as printed on a black fabric presented in Example 2 hereinabove.

Figures 14A, 14B, 14C:
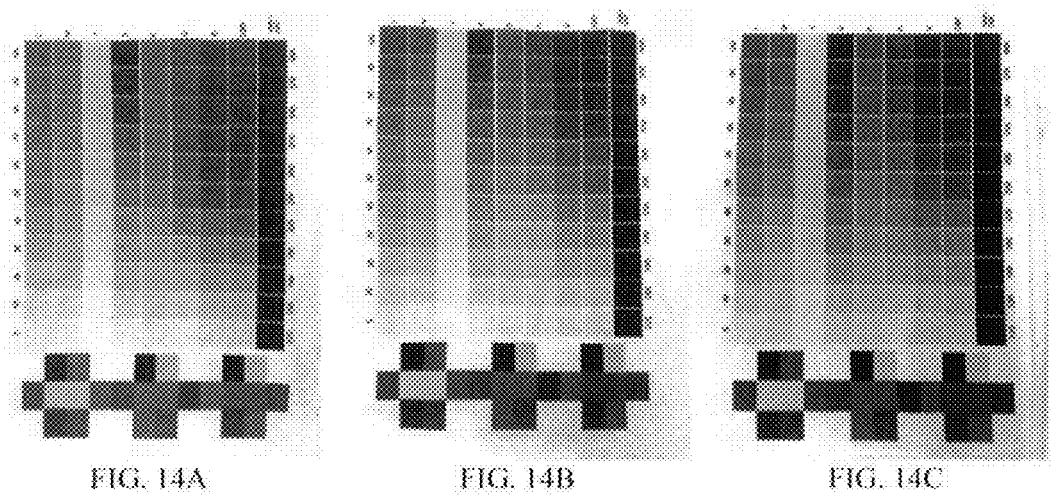
FIG. 14A shows the results when the colored pigments were printed on the white fabric without any attempt to immobilize the ink before curing, showing a poor image with dull colors.
FIG. 14B shows the results when the colored pigments were printed after spraying the cloth with a wetting composition (as disclosed in WO 2005/115089) based on 2% acetic acid and 0.1% BYK 348 (used as a wetting agent) in tap water, showing mediocre results.

FIG. 14C shows the results obtained when using a process as described herein, where an immobilization part (first part) is printed concomitantly with the colored pigments (second part), demonstrating the superb results obtained when using the inkjet printing process presented herein.

Example 4

Soft signage is a term used by artisans of the field to refer to printed signs, banners, table covers, flags, trade show displays and the likes, wherein the printed media is made from fabric-reinforced synthetic polymeric substrate. This term is therefore widely used to refer to the media itself, namely soft and flexible plastic sheets that are reinforced with a network of fibers of loose mesh (gauze-like cloth). Soft signage substrates are typically impregnable to liquids and exhibit a non-smooth texture imparted by the imbedded cloth, resembling that of "duct tape".

Inkjet printing of soft signage poses a challenge due to the tendency of the ink composition to smear and flow over the surface, particularly when used in excess on extensive areas, as required to overcome the dimpled surface texture and when printing large signs and banners. The process described herein (in Example 1 hereinabove) was used successfully to print in color on media used for soft signage, as presented in FIGS. 15A-15C.

Figure 1:
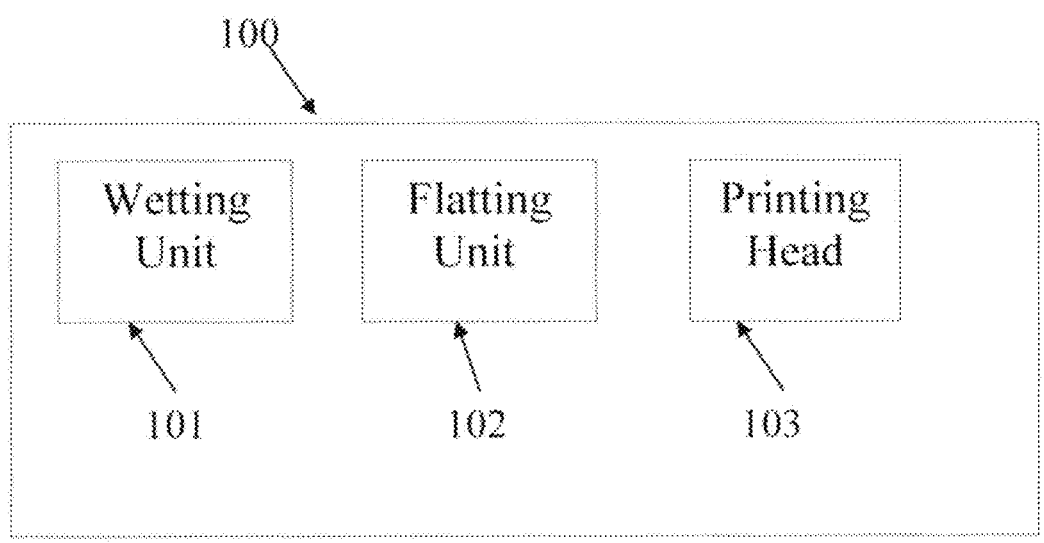
Figure 2A:
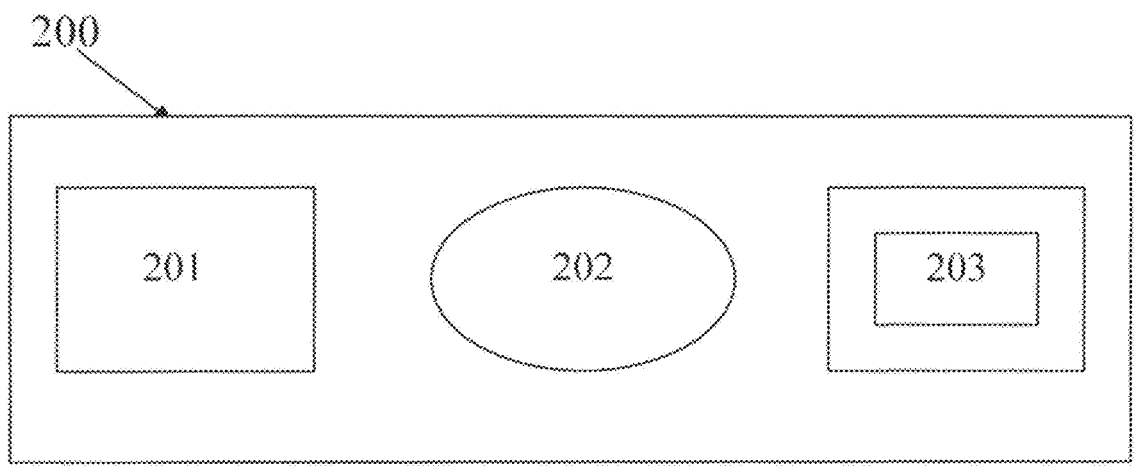
Figure 2B:
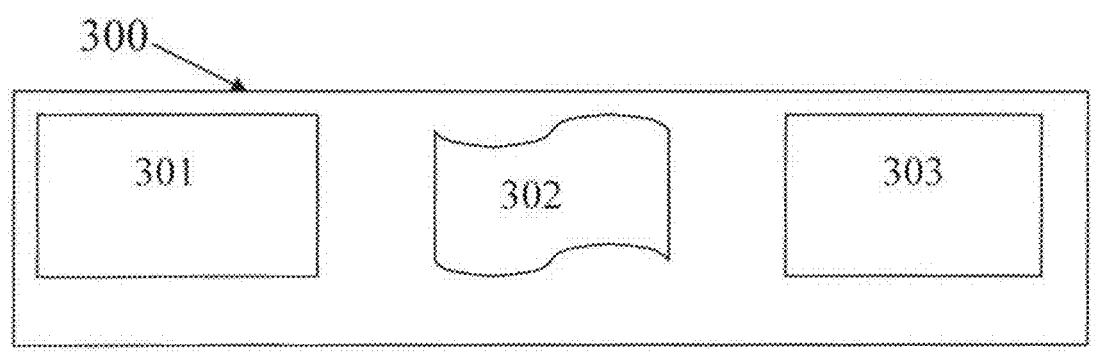
Figure 3:
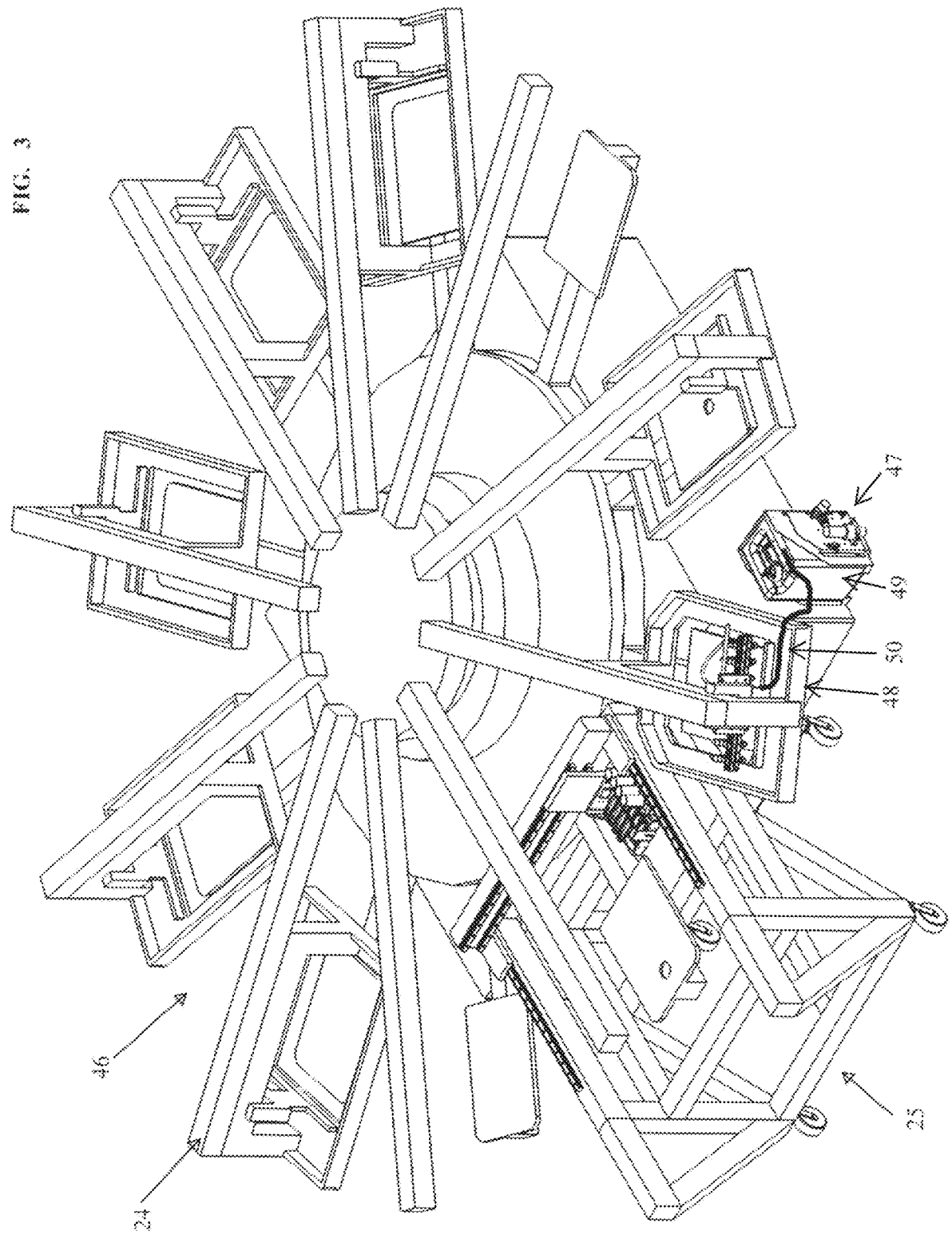
Figure 4:
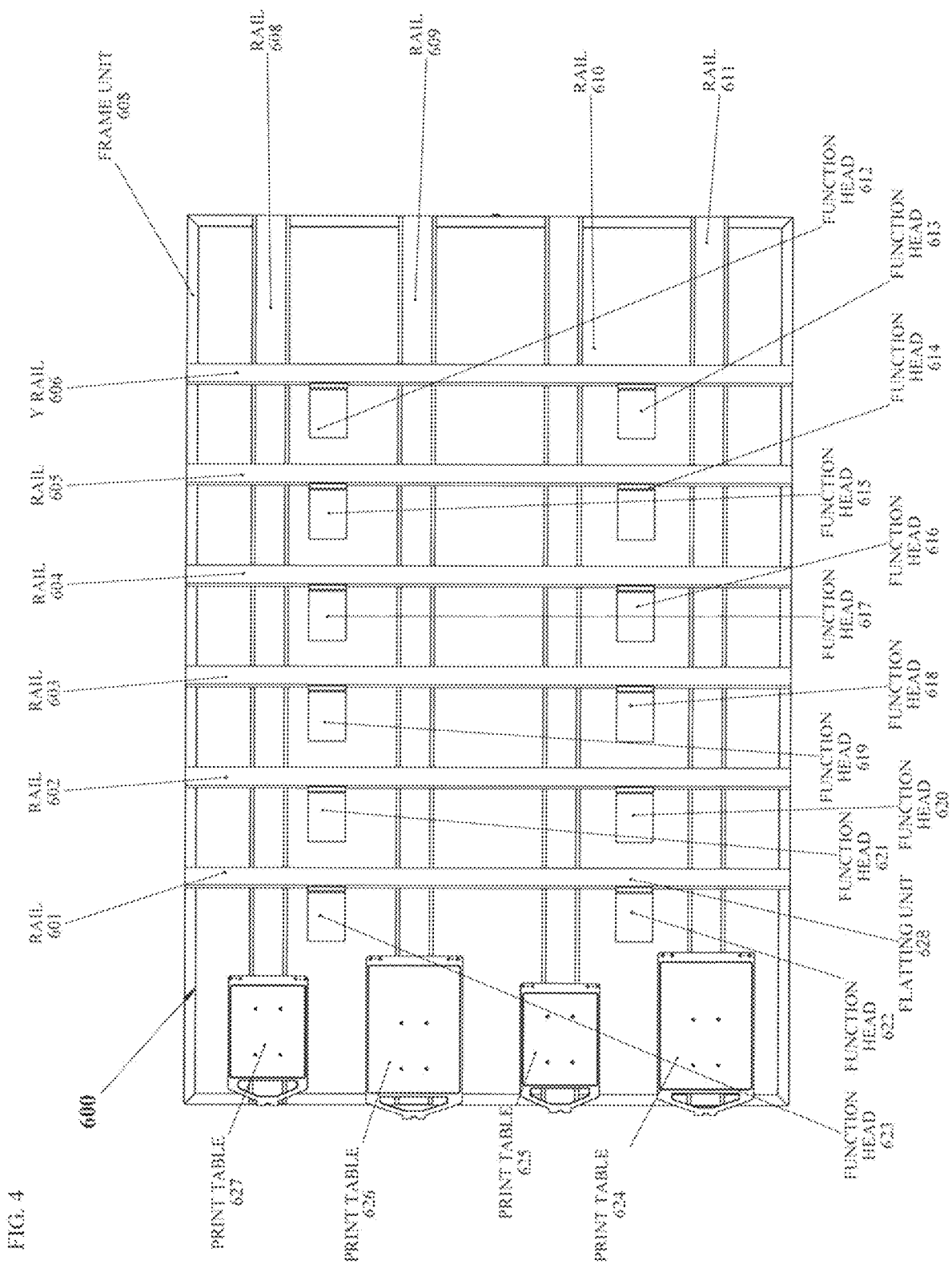
Figure 5:
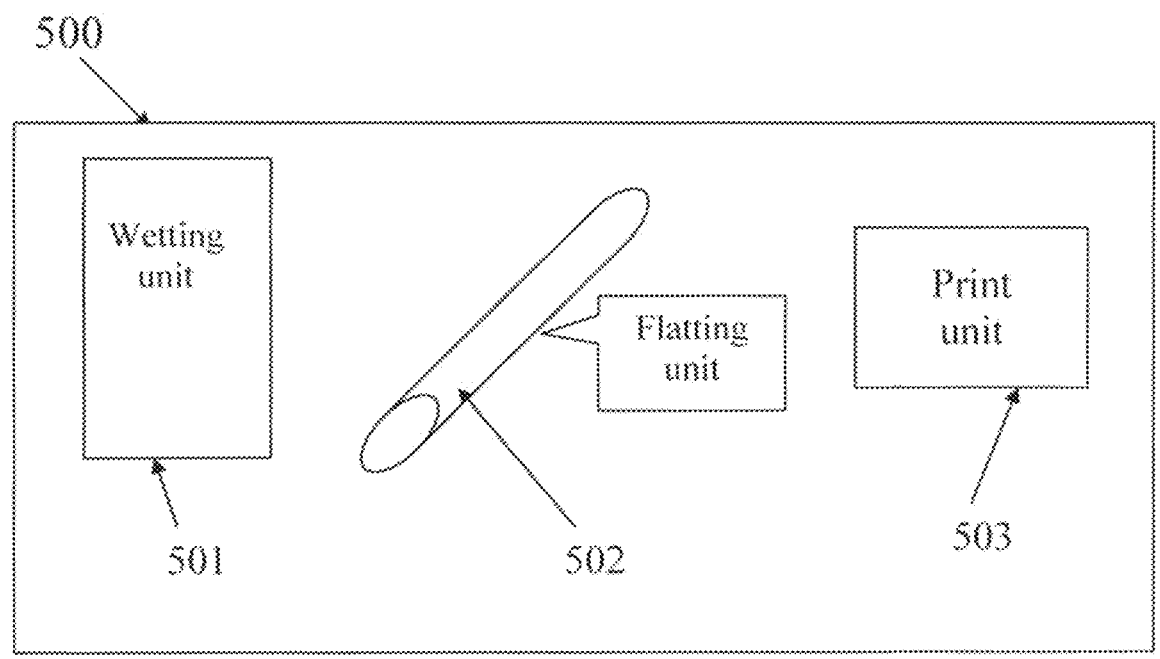
Figure 6:
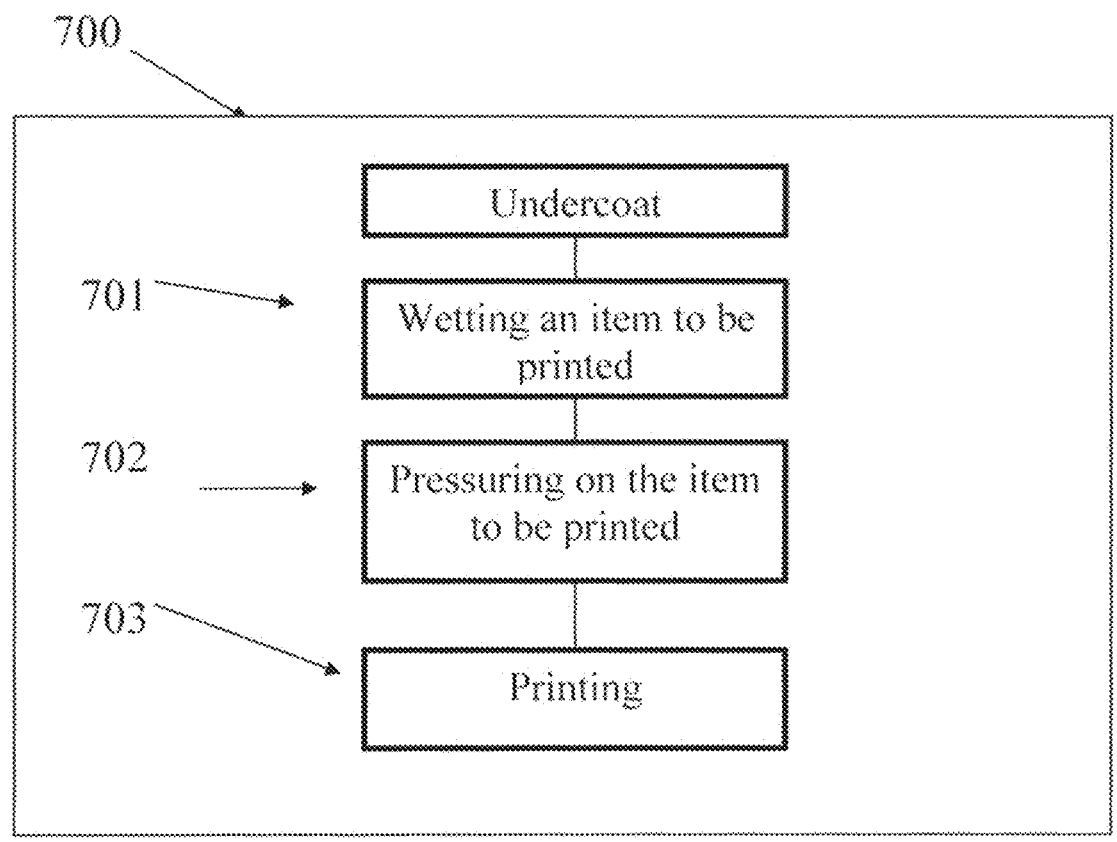
Figure 7:
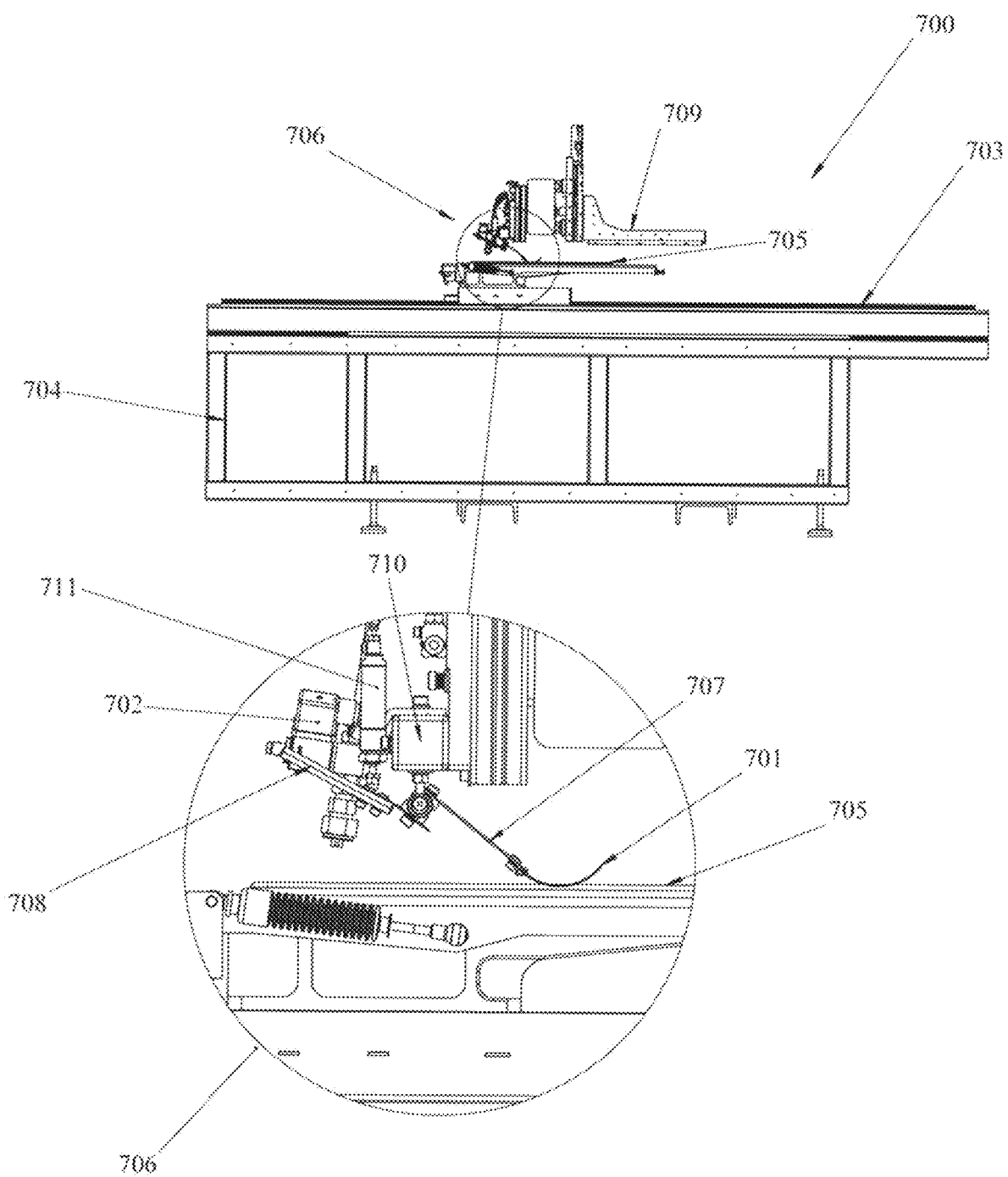
Figure 8:
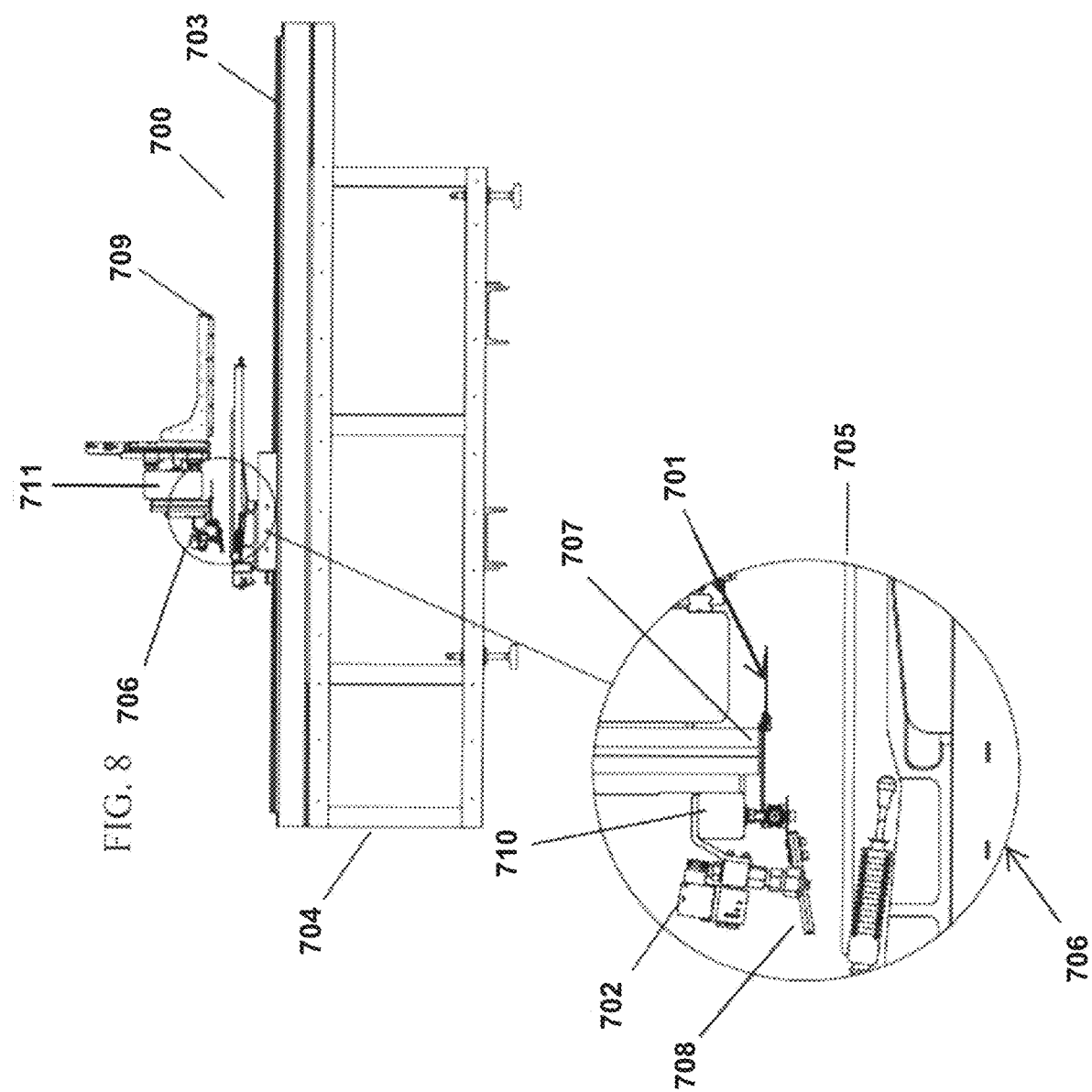
Figure 9:
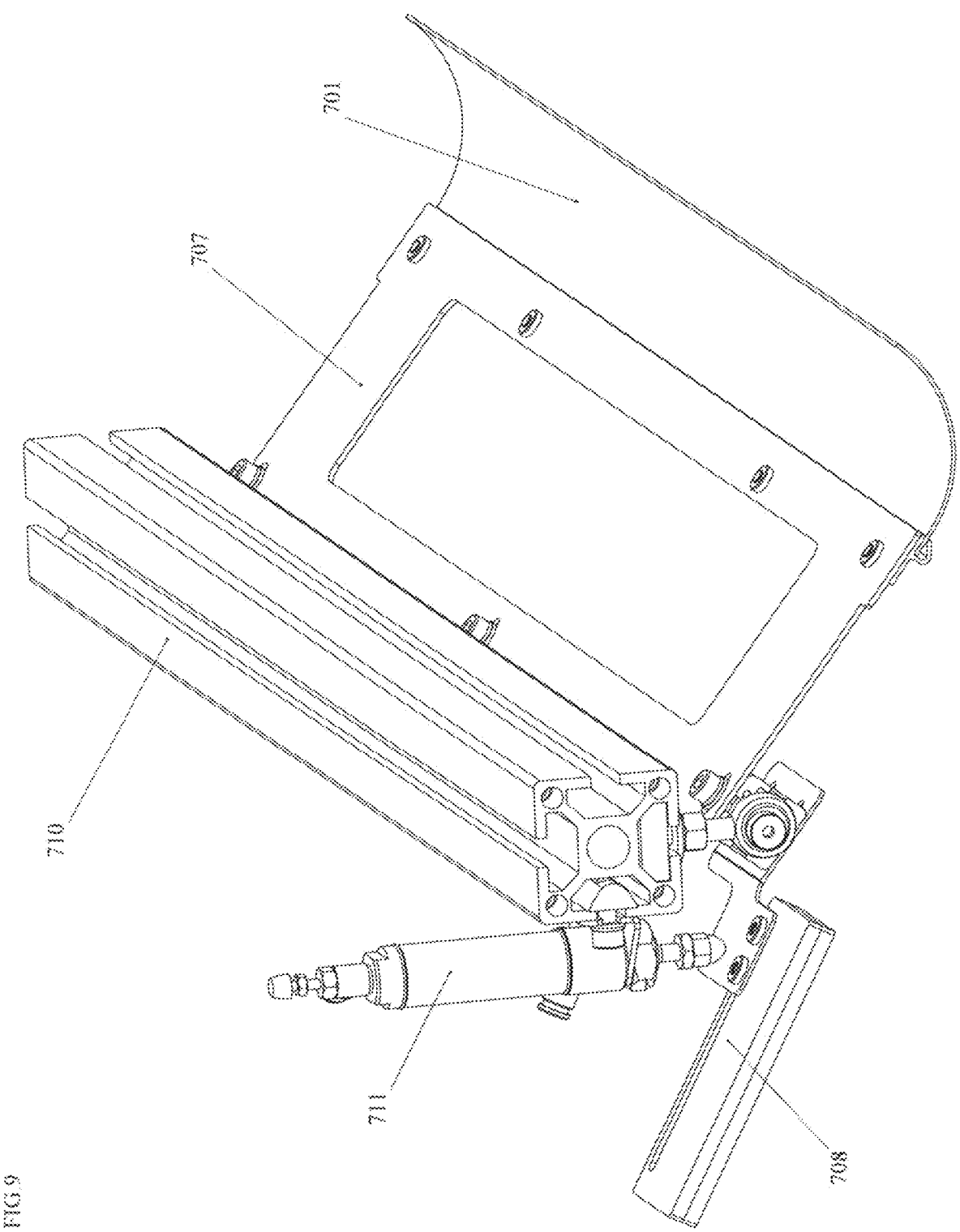
Figure 10:
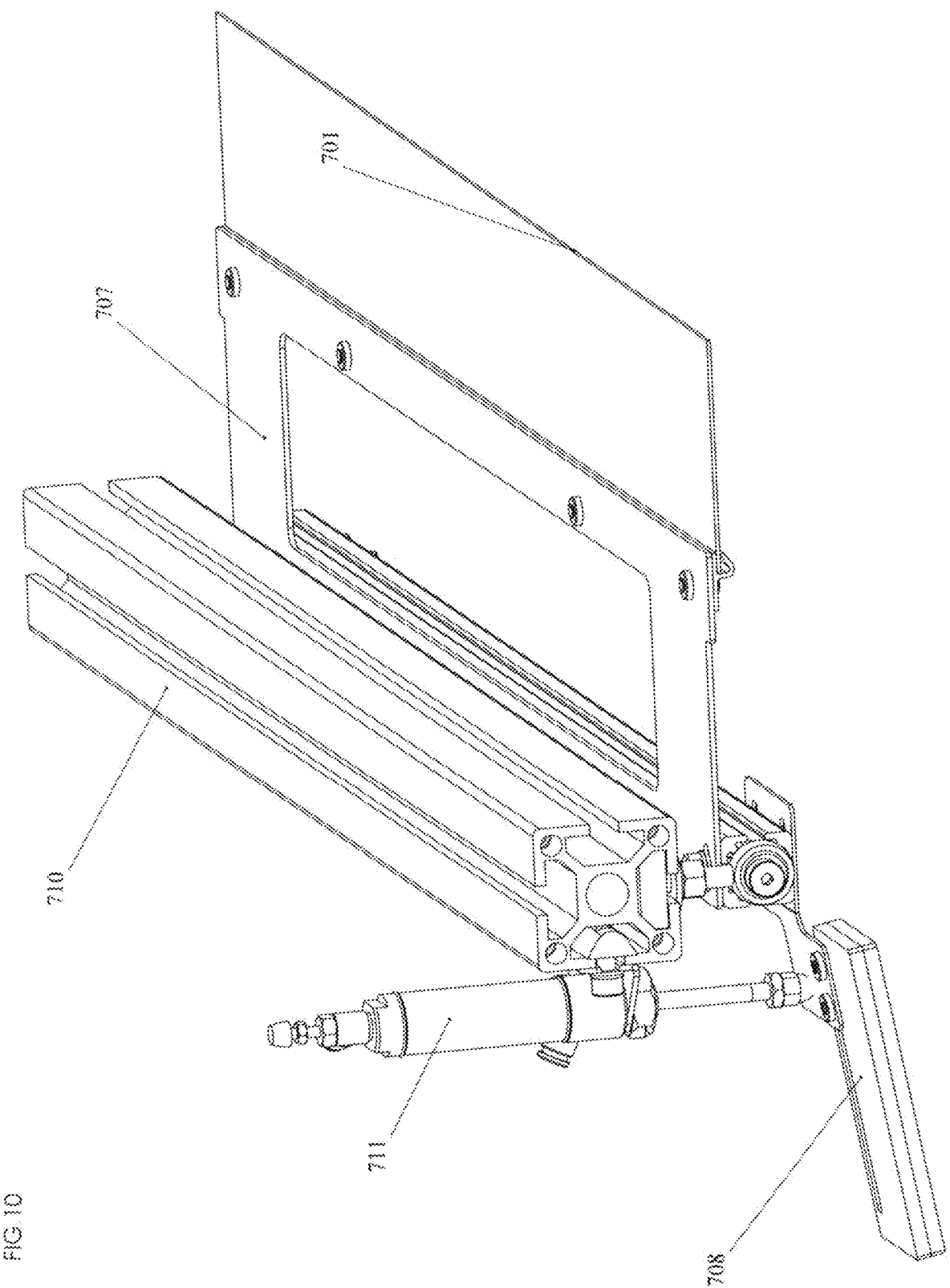
Figure 11:
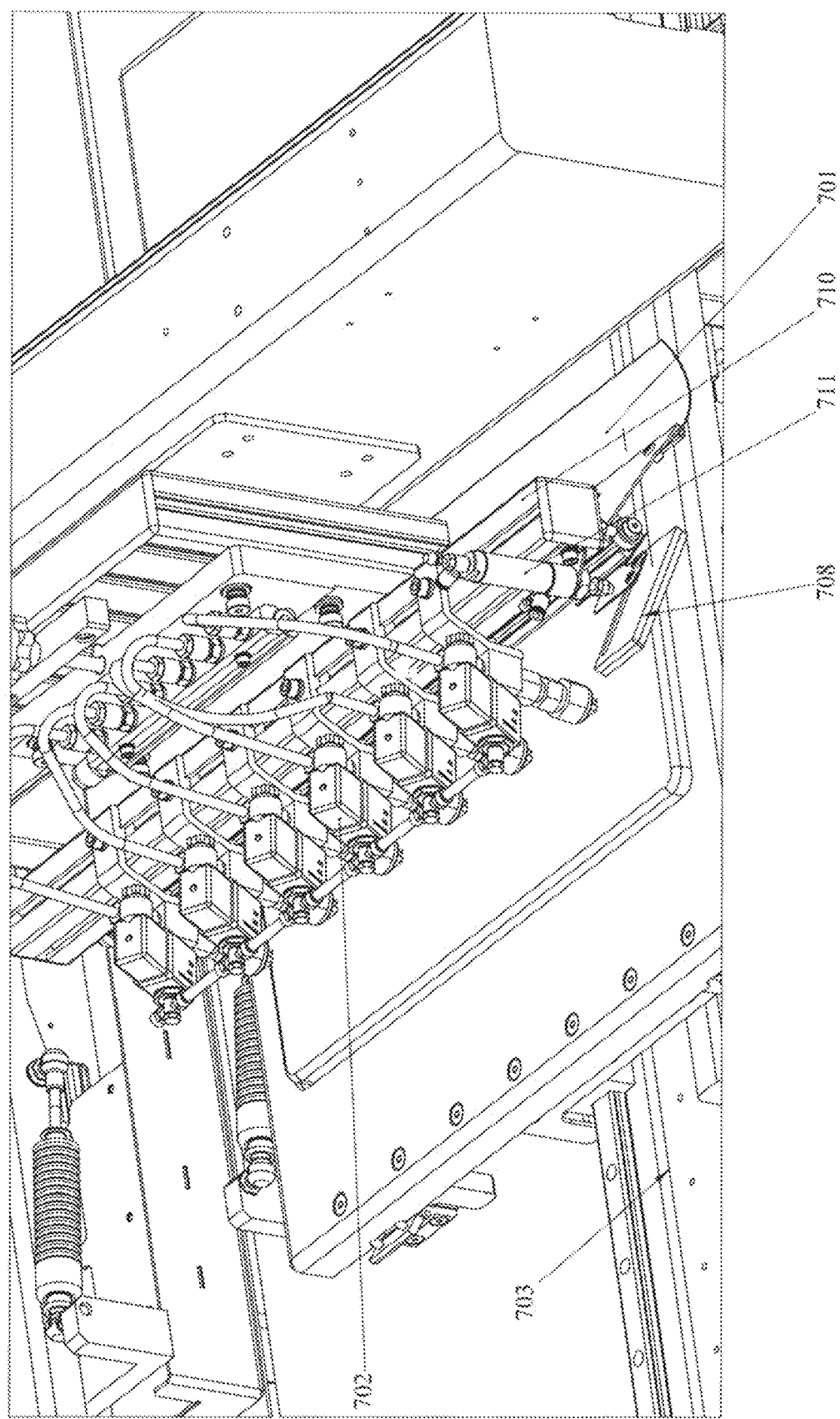
Figures 12A, 12B, 12C:
Figures 13A, 13B:
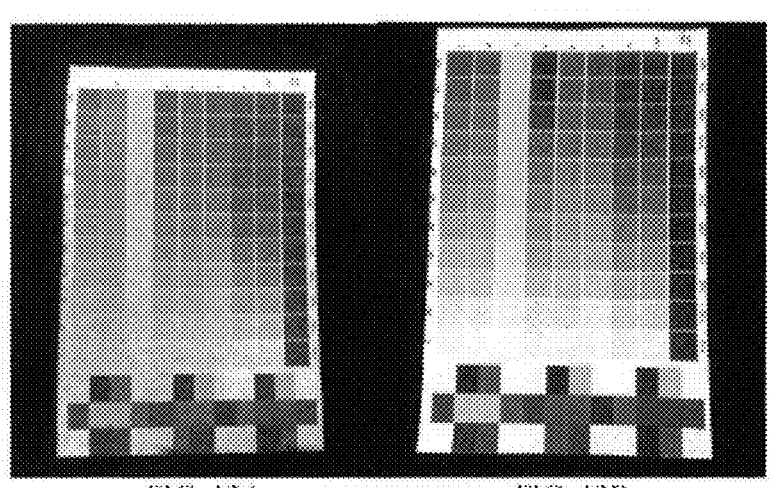
Figures 15A, 15B, 15C:
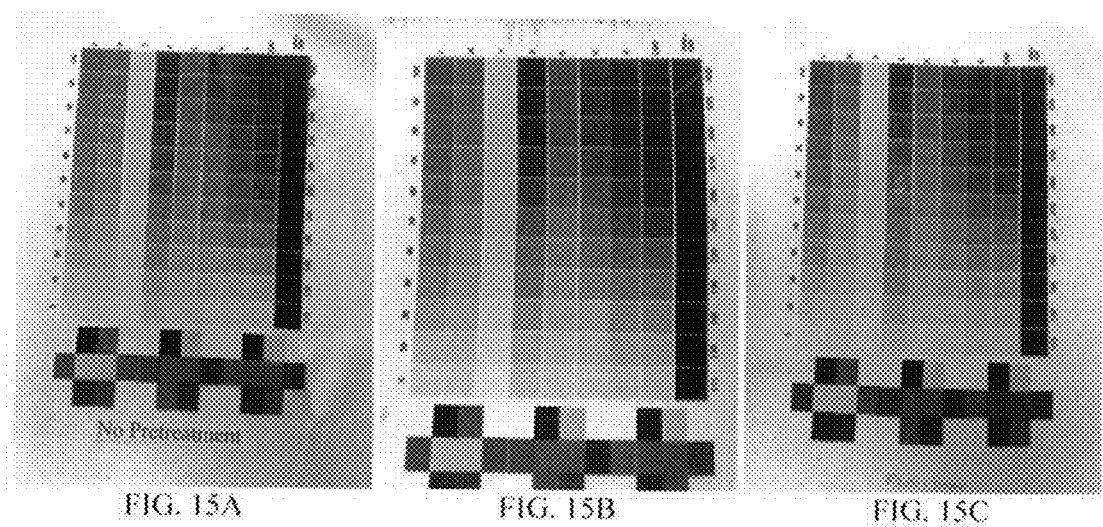

FIGS. 15A-15C present color photographs of three white synthetic pieces that serve as media for soft signage, namely a substrate for white format prints. The figures show an image of a colored pattern (as shown in FIG. 13 hereinabove) printed thereon. FIG. 15A shows the color image printed on the white soft signage media without any attempt to immobilize the ink before curing, FIG. 15B shows the color image printed after spraying the cloth with a wetting composition (as disclosed in WO 2005/115089) based on 2% acetic acid and 0.1% wetting agent (BYK 348) in tap water, and FIG. 15C shows the color image obtain when using a process as presented herein, wherein the first part (the immobilization part) is applied concomitantly with the second part (colored part), demonstrating the superb results obtained when using the inkjet printing process presented herein.

Since laminated, plasticized and other composite substrates such as soft signage do not suffer from loose and protruding fibers, the immobilization part of the ink composition can be prepared without the acrylic emulsion binder, as presented in Table 6 below.

TABLE 6

| Immobilization Part | |
|---|---|
| Lactic acid (property-adjusting agent) | 9% |
| Ammonia (for buffering the acid) | 3% |
| A mixture of propylene glycol, diethylene glycol and glycerin (as humectants) | 50% |
| Benzotriazole (as anti cupper corrosion agent) | 0.40% |
| Sodium nitrate (as anti corrosion agent for ferrous metals) | 0.20% |
| Deionized water | to 100% |
| Viscosity at 34° C. | 10 cp |
| pH | 4.7 |
| Surface tension | 37 N/m |

Example 5

The contribution of the immobilization part to the final image quality was evaluated by measuring the printed color intensity on white fabric, and comparing the optical density of the resulting color image to the same design printed without the immobilization part.

Optical density (OD) is a logarithmic scale of relative light reflectance from a defined surface. Optical density is used in the printing industry to measure quantities of ink deposits of printed materials. Since OD is determined with respect to a reference color, the units of OD are absolute numbers.

Optical density values were measured using a color analyzing COLOR PRINT 415 device BY Shamrock instruments Ltd to analyze the images obtained in Example 2 and 3 described hereinabove.

Table 7 presents optical density values as measured for pure CMYK colors in a color image printed on a white and a dark fabric at a resolution of 545 dpi on a solid fully covered square (100% surface coverage), in three different printing processes, namely without any attempt to immobilize the colored part, using a wetting composition (as disclosed in WO 2005/115089) based on 2% acetic acid in tap water, and using an immobilization part applied at 33% of the drop-density of the CMYK colored part applying a process as described in Example 1 hereinabove.

TABLE 7

| | Optical density | | |
|---|---|---|---|
| Colored part | No immobilization | Wetting composition | Immobilization part |
| On white textile (CMYK at 545 dpi) | | | |
| C | 1.10 | 1.27 | 1.45 |
| M | 1.00 | 1.17 | 1.14 |
| Y | 0.96 | 1.00 | 1.45 |
| K | 1.17 | 1.29 | 1.53 |
| On dark textile with a white underbase part (CMYK at 545 dpi) | | | |
| C | not measurable | 1.46 | 1.60 |
| M | not measurable | 1.22 | 1.56 |
| Y | not measurable | 1.10 | 1.37 |
| K | not measurable | 1.41 | 1.75 |
| Soft signage (CMYK at 454 dpi) | | | |
| C | 1.20 | 1.62 | 1.65 |
| M | 1.02 | 1.40 | 1.50 |
| Y | 0.78 | 0.80 | 0.80 |
| K | 1.21 | 1.64 | 1.70 |

As can be seen in Table 7, the optical density values, which are at their lowest values on both the untreated fabrics, increases when the fabrics were sprayed with a wetting composition, but afforded their highest values when the second (colored) part(s) where applied concomitantly with the first (immobilization) part of the ink composition, according to the process presented herein.

Example 6

To demonstrate the effect of using proto-elastomeric film-forming ingredients in the ink composition, the contribution of the elasticity of the film constituting the finished image printed on a highly stretchable substrate is illustrated.

The proto-elastomeric film-forming acrylic emulsions which are used in the ink compositions described herein, serve to bestow flexibility and stretchability to the underbase and colored parts of the inks, and more so with respect to the opaque underbase layer when applied on a dark (black) stretchable garment. If the underbase is not visually continuous at all conformation of the garment, relaxed or stretched, the dark color of the garment will be partially visible through the image, thereby degrading its appearance and color intensity.

The same requirements of the film are present when the stretchable garment under the film is lighter in color than the image, namely the stretchability of the image should coincide with the stretchability of garment so as not to allow the garment to be seen under the stretched image.

Since the stretchability of the underbase part is required, the concentration of the emulsified proto-elastomeric film-forming agent (acrylic resin) that is used is more then double compared to the amount thereof used in the colored part of the ink. In order to demonstrate the results of using other multi-part ink compositions known in the art on stretchable substrate, an identical image was printed on an identical highly stretchable black fabric substrate (black Lycra™) using identical machinery and process routines. The difference between the images was in the formulation of the opaque white underbase part of an ink composition, which was prepared similarly to that of the opaque white underbase part presented herein, all but to the different acrylic binder exhibiting a Tg of over 85° C. The colored and immobilization parts used for all images were identical, except the acrylic binder in the formulation of the opaque white underbase as presented in Table 3 hereinabove, which was replaced with JONCRYL™ acrylate having a high Tg over 20° C.

Figure 16A:
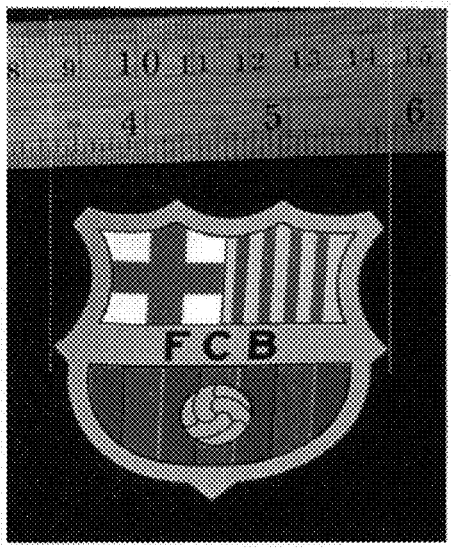
Figure 16B:
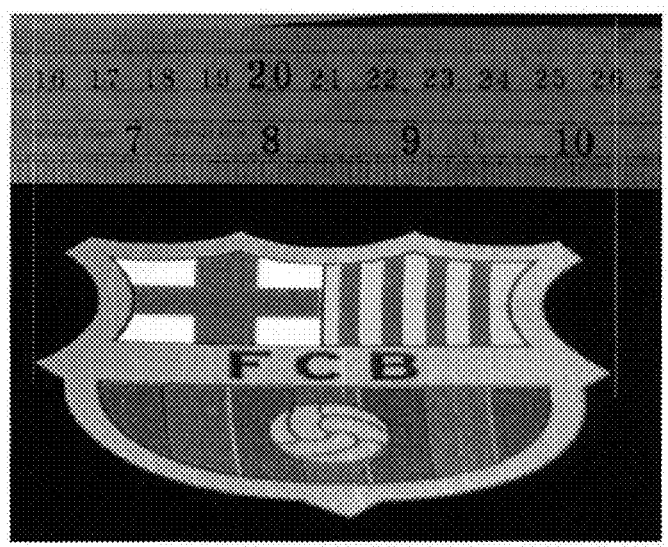

FIGS. 16A-16B present color photographs of one color image printed on a highly stretchable black fabric (Lycra™), which was printed using an exemplary ink composition based on proto-elastomeric film-forming agents having Tg lower than 0° C., as presently disclosed, and printed using an exemplary process as presently disclosed, wherein FIG. 16A shows the image on the relaxed fabric which spans about 6 cm, and FIG. 16B shows the same image in the same piece of fabric, stretched to about 10.5 cm without shown any degradation to the image due to stretching.

As can be seen in FIGS. 16A-16B, the colored image appears the same when the fabric is relaxed or when it is stretched by about 2-fold of its relaxed conformation, demonstrating the successful ink-jet printing of a colored image on a highly stretchable black fabric using the ink compositions and processes presented herein.

Figure 17A:
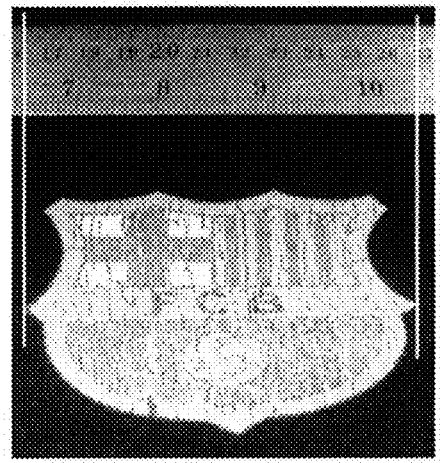
Figure 17B:
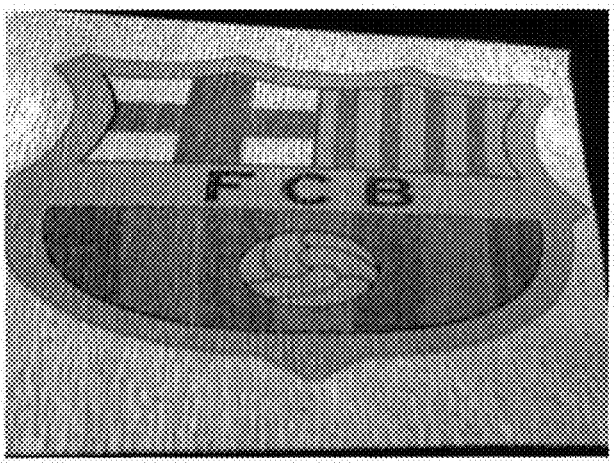

FIGS. 17A-17B present color photographs of two similar color images printed on a highly stretchable black fabric (Lycra™), which were printed using an ink composition with film-forming agents having Tg higher than 85° C., and applied using an exemplary process as presently disclosed, wherein FIG. 17A shows a similar image as presented in FIG. 16 hereinabove on the same type of fabric as shown in FIG. 16, stretched to about 10.5 cm, showing the cracks and the damaging effect of stretching the non-elastic image, and FIG. 17B where another image was printed with an extended opaque white underbase, showing the cracks and extensive degradation of the image due to stretching, as compared to the stretched image in FIG. 16B.

Example 7

Following are some general ink-part formulations comprising ink compositions according to embodiments of the present invention, that are immobilized independently of the dispersed pigments.

Suitable silicon dioxide examples based on treated and untreated fumed silica (first metal oxide class), are available as AEROSIL® and AERODISP® series from Evonik, or CAB-O-SIL® nano-sized silica series from the Cabot Corporation.

Nanoparticles of titania are available from Evonik as VP Disp W2730X, 740X, VP Titania P90 based on 25 nm titanium dioxide particles.

Alumina nanoparticles are available from Evonik as VP Disp W440W, VP AEROPERL® P25/20, from Cabot Corporation as SPECTR-Al® fumed alumina series from BYK chemie, or from Nanophase Technologies Corp. (Romeoville, Ill.) and BYK-Chemie (Wesel, Germany) under the trade names NANOBYK-3600™ and NANOBYK-3601™.

Formulations of exemplary second parts, containing pre-ground positively charged fumed silica particles, such as the commercially available AERODISP® from Evonik, acting as a first metal oxide to enable immobilization thereof by an organic acid are presented in Table 8 below.

TABLE 8

| Fumed silica based second part | |
|---|---|
| CMYK ground dispersed pigment | 10-15% |
| Acrylic low Tg emulsion | 10-25% |
| Positively charged fumed silica | 15-20% |
| Humectants - Glycols | 25-40% |
| Wetting agent | 0.1-2% |
| Defoamer | 0.2-0.6% |
| Bactericide/Fungicide | 0.2-0.5% |
| A crosslinking agent | 3-4% |
| A polymerization catalyst | 0.5-0.75% |
| Deionized water to | 100% |

Formulations of exemplary second parts, containing nano-sized titanium dioxide particles, about 25 nm in size such as commercially available from Evonik, incorporated as a first metal oxide to enable immobilization thereof by an organic acid, are presented in Table 9 below.

TABLE 9

| Nanoparticle titania based second part | |
|---|---|
| CMYK ground dispersed pigment | 10-15% |
| Acrylic low Tg emulsion | 10-25% |
| Nano titania ~25 nm | 15-20% |
| Humectants - Glycols | 25-40% |
| Wetting agent | 0.1-2% |
| Defoamer | 0.2-0.6% |
| Bactericide/Fungicide | 0.2-0.5% |
| A crosslinking agent | 3-4% |
| A polymerization catalyst | 0.5-0.75% |
| Deionized water to | 100% |

As discussed hereinabove, while the immobilization of the second part requires a drop of the pH level below 7 in some cases, using alumina as a property-adjusting agent causes instantaneous congelation of the second part upon contact regardless any change of the pH level.

The colored part (second part) which is intended for immobilization effected by alumina contain only the ink related components, while the immobilization part contains nano-sized dispersed alumina, as presented in Table 10 below.

TABLE 10

| CMYK inks to be immobilized by alumina | |
|---|---|
| CMYK ground dispersed pigment | 10-15% |
| Property-sensitive film forming acrylic emulsion having a low Tg | 10-20% |
| Humectants - Glycols | 25-40% |
| Wetting agent | 0.1-2% |
| Defoamer | 0.2-0.6% |
| Bactericide/Fungicide | 0.2-0.5% |
| A crosslinking agent | 3-4% |
| A polymerization catalyst | 0.5-0.75% |
| Deionized water to | 100% |

The immobilization part (first part) corresponding to the colored part presented in Table 10 above, is presented in Table 11 below.

TABLE 11

| Alumina based immobilization part | |
|---|---|
| Property-adjusting nano-sized $Al_2O_3$ particles dispersion | 10-15% |
| Humectants - Glycols | 25-40% |
| Wetting agent | 0.1-2% |
| Defoamer | 0.2-0.6% |
| Bactericide/Fungicide | 0.2-0.5% |
| Deionized water to | 100% |

An exemplary fourth part ("spot colorant" part) which is typically used to emphasize some areas of the image with brighter opaque colors, is presented in Table 12 below.

TABLE 12

| Opaque colored fourth part | |
|---|---|
| AZUL/BLUE ORGAPLAST A-16500/1; or MARRON/BROWN INORPINT FeO-300; or NARANJA/ORANGE INORPLAST CD-10807/5; or other commercially available spot colors pigments | 2-8% |
| Property-sensitive film forming acrylic emulsion having a low Tg | |
| Tego 750 W (dispersant) | 0.5-2% |
| BYK 307 (wetting agent) | 0.5-2% |
| BYK 017 (defomer) | 0.5-2% |
| Humectants - Glycols | 15-20% |
| Wetting agent | 0.1-2% |
| Defoamer | 0.2-0.6% |
| Bactericide/Fungicide | 0.2-0.5% |
| Deionized water to | 100% |

Example 8

Following are some general ink compositions, according to some embodiments of the present invention, which comprise formaldehyde-free crosslinking agents.

Table 13 presents an exemplary second (colored) part of an ink composition, using glyoxal, which is completely soluble in water, as an exemplary formaldehyde-free crosslinking agent, according to some embodiments of the present invention.

TABLE 13

| Colored (CMYK) part comprising glyoxal | |
|---|---|
| A colorant mixture | 10-20% |
| Property-sensitive proto-elastomeric film forming agent | 25-30% |
| A first metal oxide (optional if using a third metal oxide) | 10-20% |
| Humectants (glycol mixture) | 20-40% |
| Glyoxal 40 (as a dialdehyde crosslinking agent) | 5-10% |
| Bactericide/Fungicide | 0.1-1% |
| Blocked acid catalyst | 0-1.5% |
| Neutralizing/buffering agent | 0.2-0.6% |
| Defoamer | 0.1 0.6% |
| Wetting agent/surfactant | 0.1-2% |
| Organic solvent | 0-5% |
| Other additives | 0-2% |
| Deionized water To | 100% |
| Tg of the film-forming agent | −35 to 0° C. |
| Viscosity at 34° C. | 10-13 cp |
| pH | 8-8.5 |
| Surface tension | 25-36 N/m |

Table 14 presents an exemplary third (underbase) part of an ink composition, using glyoxal as an exemplary formaldehyde-free crosslinking agent, according to some embodiments of the present invention.

TABLE 14

| Opaque white (underbase) part comprising glyoxal | |
|---|---|
| A second metal oxide (acting also as colorant) | 15-20% |
| Property-sensitive proto-elastomeric film forming agent | 25-45% |
| An optional proto-elastomeric film forming agent | 15-20% |
| Humectants | 30-45% |
| Dispersant | 1-6% |
| Glyoxal 40 (as a dialdehyde crosslinking agent) | 5-10% |
| Bactericide/Fungicide | 0.1-0.5% |
| Blocked acid catalyst | 0-1.5% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water To | 100% |
| Tg of the film-forming agent | −35 to 0° C. |
| Viscosity at 34° C. | 12-14 cp |
| pH | 8-8.5 |
| Surface tension | 25-36 N/m |

Table 15 presents an exemplary third (underbase) part of an ink composition, using a carbamate-based crosslinking agent as an exemplary formaldehyde-free crosslinking agent, according to some embodiments of the present invention.

As heteroaryl polycarbamate-based crosslinking agents are less insoluble in water, but readily dissolve in alcohols and/or glycols, the organic solvents mixture component of this part of the ink composition has been adjusted with more polar humectants in order to introduce the crosslinker into the aqueous media. Otherwise, these formulations are rather similar to formulation presented the former example.

TABLE 15

| Opaque white (underbase) part comprising | |
|---|---|
| A second metal oxide (acting also as colorant) | 15-20% |
| Property-sensitive proto-elastomeric film forming agent | 25-45% |
| An optional proto-elastomeric film forming agent | 15-20% |
| Polar humectants (glycerin, propylene glycol, monoethylene glycol) | 30-45% |
| Dispersant | 1-6% |
| CYLINK ®2000 (as a carbamate-based crosslinking agent) | 0.5-1.5% |
| Bactericide/Fungicide | 0.1-0.5% |
| Blocked acid catalyst | 0-0.75% |
| Neutralizing/buffering agent | 0.1-0.2% |
| Defoamer | 0.2-0.4% |
| Wetting agent/surfactant | 0.1-0.5% |
| Organic solvent | 0-5% |

TABLE 15-continued

| Opaque white (underbase) part comprising | |
|---|---|
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Table 16 presents an exemplary second (colored) part of an ink composition, using diacetone acrylamide (DAAM) and hydrazine as an exemplary formaldehyde-free crosslinking agent, according to some embodiments of the present invention.

The mixture of diacetone acrylamide (DAAM) and hydrazine reacts in situ when the composition is dried or cured, and serves as crosslinking agent for acrylic emulsions that serve as a binder to the fabric.

TABLE 16

| Colored (CMYK) part comprising DAAM/hydrazine | |
|---|---|
| A colorant mixture | 10-20% |
| Property-sensitive proto-elastomeric film forming agent | 25-30% |
| A first metal oxide (optional if using a third metal oxide) | 10-20% |
| Humectants (glycol mixture) | 20-40% |
| DAAM | 0.8-1.5% |
| Hydrazine | 0.9-2% |
| Bactericide/Fungicide | 0.1-1% |
| Blocked acid catalyst | 0-1.5% |
| Neutralizing/buffering agent | 0.2-0.6% |
| Defoamer | 0.1-0.6% |
| Wetting agent/surfactant | 0.1-2% |
| Organic solvent | 0-5% |
| Other additives | 0-2% |
| Deionized water | To 100% |
| Tg of the film-forming agent | −35 to 0° C. |
| Viscosity at 34° C. | 10-13 cp |
| pH | 8-8.5 |
| Surface tension | 25-36 N/m |

Table 17 presents an exemplary third (underbase) part of an ink composition, using diacetone acrylamide (DAAM) and hydrazine as an exemplary formaldehyde-free crosslinking agent, according to some embodiments of the present invention.

TABLE 17

| Opaque white (underbase) part comprising DAAM/hydrazine | |
|---|---|
| A second metal oxide (acting also as colorant) | 15-20% |
| Property-sensitive proto-elastomeric film forming agent | 25-45% |
| An optional proto-elastomeric film forming agent | 15-20% |
| Humectants | 30-45% |
| Dispersant | 1-6% |
| DAAM | 0.8-1.5% |
| Hydrazine | 0.9-2% |
| Bactericide/Fungicide | 0.1-0.5% |
| Blocked acid catalyst | 0-1.5% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Experimental Conclusions

The use of proto-elastomeric film-forming agents to constitute an inkjet formulation, which overcomes smearing, bleeding and wicking, was demonstrated herein. The images formed by the compositions and processes disclosed herein exhibit the highest values of quality criteria, and maintain these criteria even when the substrate they are printed on are dark and/or highly stretchable.

Methodologies using immobilization compositions to assist in preventing colored ink compositions from wicking into the substrate have been described in the art. As the immobilization part causes gelation (at least partial solidification) of the ink composition, any contact between the immobilization ink and the color ink will be destructive to the printheads that are the most sensitive and expensive part of the printing system.

Practicing the process presented herein has shown that the reservoirs, vacuum generators, tubing and printheads carrying and delivering the immobilization part of the ink composition must be physically separated from the systems carrying the colored parts of the ink composition so as to prevent any contact therebetween prior to both reaching the substrate.

For example, if the property-adjusting agent is highly volatile, it is practically impossible to control its spread by vapor diffusion over time. The present inventors have found after numerous trials with different organic acids that lactic is highly suitable due to its transitoriness and lack of odor.

The immobilization part ingredients must be compatible with the printhead construction materials, the adhesives ingredients, the ferrous and nonferrous metal conductors and the other electronic components, particularly in cases where the property-adjusting agent is an acid. In these cases the pH of the immobilization part must be kept buffered between 4 and 10, and preferably between 4.5 and 8. The organic components must be compatible with epoxy and polyurethane adhesives which are typically used in the makeup of the printing machine, and anti-corrosion agents must be considered in order to protect the metals.

The immobilization part should include component that will stick/attach the very thin fibers that protrude up to few millimeters over the surface of textile substrates so as to prevent the fibers from obstructing the fine jetted drops from reaching the surface of the fabric, and after drying, to prevent the fibers from partly restricting the sharpness of the printed image. When printing on non-fibrous substrates, the immobilization part of the ink composition can be devoid of a binder.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An inkjet composition comprising a proto-elastomeric film-forming agent or binder, a dispersed pigment, a property-sensitive agent and a carrier, wherein said property-sensitive agent is sensitive to an acidic pH such that upon contacting said acidic pH the inkjet composition congeals and subsequently forms a fully-cured elastic film upon drying/curing which is characterized by high wash-fastness, and an elongation percentage that ranges from 30% to 300%.

2. The inkjet composition of claim 1, being for forming an image in a form of said elastic film attached to a surface of a stretchable and/or flexible substrate.

3. The inkjet composition of claim 1, wherein said film-forming agent or binder is selected from the group consisting of an alkyl-acrylic polymer and/or an emulsion thereof, acrylic-styrene copolymer and/or an emulsion thereof, an alkyl-acrylic copolymer and/or an emulsion thereof, a urethane polymer and/or an emulsion thereof, and any combination thereof.

4. The inkjet composition of claim 1, wherein said dispersant is a property-sensitive polymerizable dispersant.

5. The inkjet composition of claim 4, wherein said dispersant is selected from the group consisting of an acrylate, an acrylic acid salt, an acrylic polymer salt and any combination thereof.

6. The inkjet composition of claim 1, wherein said carrier is an aqueous carrier.

7. The inkjet composition of claim 1, further comprising at least one agent selected from the group consisting of a polymerization catalyst, a crosslinking agent, an amine stabilizer, an alcohol stabilizer, a softener/plasticizer, a surface active agent, a surface tension modifying agent, a viscosity modifying agent, a thickener agent, an anticorrosion agent and any combination thereof.

8. The inkjet composition of claim 7, wherein said crosslinking agent is a formaldehyde-free crosslinking agent.

9. A multi-part inkjet composition, obtainable by contacting the inkjet composition of claim 1 with an immobilization composition, wherein said immobilization composition comprises a carrier and an acid.

10. An image in a form of a fully cured elastic film characterized by high wash-fastness, and an elongation percentage that ranges from 30% to 300% when attached to a surface of a stretchable and/or flexible substrate, obtainable by contacting, on the substrate, the inkjet composition of claim 1 with an immobilization composition, and optionally with a property-sensitive opaque underbase composition and/or optionally with a property-sensitive spot color composition, wherein said immobilization composition comprises a carrier and an acid.

11. A process of printing an image on a substrate, the process comprising concomitantly applying by means of an inkjet printing machine onto at least a portion of a surface of the substrate, an immobilization composition that comprises an acid, and the inkjet composition of claim 1, and subsequently fully curing said inkjet composition on the substrate, wherein said immobilization composition and the inkjet composition are each applied by a separate and discrete component of said printing machine, thereby forming said image, and said image is in a form of an elastic film characterized by high wash-fastness, and an elongation percentage that ranges from 30% to 300%.

12. The process of claim 11, wherein said applying is effected by spraying using a nozzle or by inkjet printing using a printhead.

13. The process of claim 11, wherein a time interval between an application of said immobilization composition and an application of said inkjet composition is less than 10 second.

14. The process of claim 13, wherein said surface is substantially a dark surface.

\* \* \* \* \*